United States Patent [19]

Ohta et al.

[11] Patent Number: 6,070,118
[45] Date of Patent: *May 30, 2000

[54] TRANSMISSION CONTROL SYSTEM USING ROAD DATA TO CONTROL THE TRANSMISSION

[75] Inventors: Takashi Ohta; Kunihiro Iwatsuki; Kagenori Fukumura, all of Toyota, Japan

[73] Assignee: Toyota Jidosha Kabushiki Kaisha, Toyota, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/810,472

[22] Filed: Mar. 4, 1997

[30] Foreign Application Priority Data

| Mar. 15, 1996 | [JP] | Japan | 8-087208 |
| Mar. 15, 1996 | [JP] | Japan | 8-087209 |
| Jan. 13, 1997 | [JP] | Japan | 9-015880 |

[51] Int. Cl.$^7$ .................................. F16H 61/02
[52] U.S. Cl. .................... 701/65; 701/56; 477/97
[58] Field of Search .................. 701/55, 56, 65, 701/59, 208; 477/97, 34, 78

[56] References Cited

U.S. PATENT DOCUMENTS

| 5,157,609 | 10/1992 | Stehle et al. | 364/424.1 |
| 5,315,295 | 5/1994 | Fujii | 340/936 |
| 5,361,207 | 11/1994 | Hayafune | 364/424.1 |
| 5,506,578 | 4/1996 | Kishi et al. | 340/996 |
| 5,514,050 | 5/1996 | Bauerle et al. | 479/118 |
| 5,661,650 | 8/1997 | Sekine et al. | 364/424.027 |
| 5,716,301 | 2/1998 | Wild et al. | 477/97 |
| 5,832,400 | 11/1998 | Takahashi et al. | 701/53 |

FOREIGN PATENT DOCUMENTS

| 752548 A2 | 1/1997 | European Pat. Off. . |
| 766024 A2 | 4/1997 | European Pat. Off. . |
| 43 37 163 | 5/1994 | Germany . |
| 195 28 625 | 2/1997 | Germany . |
| 4-285364 | 10/1992 | Japan . |
| 5-322591 | 12/1993 | Japan . |
| 6-135349 | 5/1994 | Japan . |
| 6-58141 | 8/1994 | Japan . |
| 6-272753 | 9/1994 | Japan . |
| 7-85392 | 3/1995 | Japan . |
| 7-192194 | 7/1995 | Japan . |
| 8-72591 | 3/1996 | Japan . |
| 8-82365 | 3/1996 | Japan . |

OTHER PUBLICATIONS

Patent Abstracts of Japan, vol. 12, No. 182 (M–702), May 27, 1988, JP 62–292947, Dec. 19, 1987.

A. Bastian, et al., Proceedings of the International Conference on Fuzzy Systems, International Joint Conference of the 4$^{th}$ International IEEE Conference on Fuzzy Systems and the 2$^{nd}$ International Fuzzy Engineering Symposium, vol. 2, pp. 1063–1070, Mar. 20, 1995, "System Overview and Special Features of Fate: Fuzzy Logic Automatic Transmission Expert System".

Andreas Bastian, Vehicle System Dynamics, vol. 24, No. 4/05, pp. 389–400, Jun. 1, 1995, "Fuzzy Logic in Automatic Transmission Control".

Patent Abstracts of Japan, vol. 18, No. 135 (P–1705), Mar. 7, 1994, JP 5–322591, Dec. 7, 1993.

Patent Abstracts of Japan, vol. 95, No. 10, Nov. 30, 1995, JP 7–192194, Jul. 28, 1995.

*Primary Examiner*—Michael J. Zanelli
*Attorney, Agent, or Firm*—Oblon, Spivak, McClelland, Maier & Neustadt, P.C.

[57] ABSTRACT

A control system for a transmission, comprises a shift control function to output a shift instruction signal on the basis of a predetermined shift pattern and a road data detecting function to detect the road data of a route to be followed by a vehicle. This control system further comprises a start detecting function to detect the start of the vehicle; and a shift pattern control function to set a shift pattern for a curve, as having a control content for making it liable to set a larger gear ratio, as the shift pattern when the vehicle start is detected by the start detecting function and when a curved road is detected in the route to be followed, by the road data detecting function.

18 Claims, 34 Drawing Sheets

TRANSMISSION CONTROL SYSTEM USING ROAD DATA TO CONTROL THE TRANSMISSION

BACKGROUND OF THE INVENTION

1. Field of the Invention

The present invention relates to a control system for controlling a transmission of a vehicle on the basis of road data of a route to be followed.

2. Related Art

In recent years, there is mounted on an ordinary vehicle a navigation system. This navigation system is constructed such that a map is held as electronic data in a memory medium such as CD-ROM whereas the position of the vehicle is located by the GPS (Global Positioning System) using an artificial satellite or the self-contained navigation (or dead reckoning method). These data are combined to output the present position or moving locus of the vehicle or a route to be followed, visually in a display unit such as the CRT, and to guide the running direction in voices.

The electronic map to be used in the navigation system can be stored not only the data such as the layout of roads, the public facilities or the rivers but also the slopes of roads or the legal regulations on road traffics and further a variety of road data such as the coefficients of friction of road surfaces, as achieved by the actual runs. As a result, the data to be obtained by the navigation system can be used not only to guide the vehicle to a destination but also to control the engine, the transmission, the brake system and the body suspension system while the vehicle is running.

One example is disclosed in JP-B-6-58141. The system, as disclosed, is constructed to change the shift pattern of the automatic transmission on the basis of the road data of a route to be followed, as achieved by the navigation system. For example: the shift is inhibited when a curve is detected ahead of the vehicle; the overdrive stage is inhibited when a mountainous region is detected; and a predetermined downshift is inhibited when the so-called "low-$\mu$ road" having a low coefficient of road surface friction is detected.

In JP-A-5-322591, on the other hand, there is disclosed a system which is constructed to change a shift pattern of an automatic transmission in accordance with a road slope, as detected by the navigation system. Specifically, the control system for an automatic transmission, as disclosed in the Laid-Open, comprises: running state detecting means for detecting the running state of a vehicle; a navigation system for detecting the data of a road ahead of the vehicle, the running azimuth of the vehicle and the present position of the vehicle; and control means for changing the shift pattern (or the shift diagram) of the automatic transmission into such one for a slope as is adapted for the slope of the road.

According to the system thus disclosed, therefore, when the vehicle is to run toward a road different from the ordinary flat road such as an upslope, a downslope, a curve road or a low-$\mu$ road, the gear stage, as suited for the road, is set in advance. As a result, the frequency of manual shifts by the driver can be lowered, and the delay in the control can be avoided to improve the drivability.

In the prior art, however, the system is constructed, as described above, such that the vehicle is controlled according to the individual road data on the route to be followed, as detected by the navigation system. As a result, if the road data requiring the so-called "special control" for changing the shift pattern for the upslope/downslope or the curved road are frequently detected, the hunting may occur to repeat the shift, and still the worse the drivability may be deteriorated. In the prior art, on the other hand, the shift pattern may be changed according to the actual running state, or the running control characteristics may be set to predetermined ones by the manual operations. However, the prior art has taken no consideration into the control of the case in which that control interferes with the control based on the data obtained by the navigation system. As a result, the power performance of the vehicle may become different from the intention of the driver to cause a discomfort.

SUMMARY OF THE INVENTION

A main object of the present invention is to improve the drivability by controlling a transmission with a variety of combined road data.

Another object of the present invention is to provide a control system capable of improving the drivability by controlling the transmission in association with the various controls of the vehicle.

According to a control system having a construction of a first feature of the present invention, if a curved road is detected on the basis of the road data, a shift pattern for setting a higher gear ratio easily is adopted for the shift control when the vehicle starts the curved road. This shift pattern is exemplified by one in which a gear stage region having a high gear ratio is wide. As a result, when the vehicle is started from the curved road, a higher gear ratio is liable to set thereby to make it reluctant to make a shift to a lower gear ratio even if the output is lowered after the start by returning the accelerator pedal or the like. In other words, the run is continued at a relatively high gear ratio so that a driving force for the curved road having a high running resistance can be sufficiently retained. This makes it possible to prevent the frequent downshifts or upshifts, as might otherwise be caused by depressing or releasing the accelerator pedal. As a result, the riding comfort and the drivability are improved.

According to the control system having the construction of a second feature of the present invention, if a curved road is detected in a route to be followed and if the vehicle is braked just before the curved road, a shift pattern for setting a higher gear ratio easily is adopted for the shift control. Therefore, if the curved road has such a large curvature that it is entered or passed by effecting the braking operation, the high gear ratio is liable to set. As a result, the engine brake is effective for the deceleration, and a sufficient driving force against the running resistance can be generated for an acceleration.

According to the control system having the construction of a third feature of the present invention, if a freeway is detected in the route to be followed, an advancing shift pattern having a control content, in which a higher gear ratio is liable to set as the shift pattern, is adopted for the shift control. As a result, when the vehicle is to run to the freeway, the higher gear ratio is liable to set thereby to improve the accelerability. As a result, it is possible to smooth the entrance into the freeway and the merge into the traffic flow.

According to the control system having the construction of a fourth feature of the present invention, if it is detected that the route to be followed is one having a low coefficient of road surface friction, the shift pattern for the low-$\mu$ road having a control content, in which a gear ratio lower than the highest one is liable to set, is adopted for the shift control. Even if the output is augmented by depressing the accelerator pedal when the vehicle is to run on the so-called "low-$\mu$ road", the gear ratio is hard to rise to the maximum so that the wheels can be prevented from slipping by suppressing the drive force to be generated by the wheels. As a result, the running stability of the vehicle can be retained even if the road surface friction coefficient is low.

According to the control system having the construction of a fifth feature of the present invention, if it is detected that the route to be followed belongs to urban areas, the shift pattern having a control content, in which a smaller gear ratio is liable to set, is adopted for the shift control. As a result, when the vehicle is to run in urban areas, the gear ratio is set to a relatively low value. As a result, the number of revolutions of a power source such as the engine can be suppressed to keep the quietness and to improve the fuel economy.

According to the control system having the construction of a sixth feature of the present invention, when the vehicle is to run on a downslope, the shift control is effected by the shift pattern for setting a higher gear ratio easily, and a reference value for deciding whether or not the road belongs to a downslope is changed by detecting a curved road. When this curved road is detected, for example, the reference value is so changed to decide the downslope so that a shift pattern for setting a higher gear ratio easily may be adopted, even if the gradient is small. As a result, when the vehicle is to run on a downslope, the shift pattern is changed just before the downslope so that the higher gear ratio is liable to set. In other words, the run for effecting the engine braking is easily effected without any manual operation. Moreover, if the road is downslope and curved, the reference value for deciding the downslope, for example, is changed to decide the downslope even having a small gradient so that a higher gear ratio is liable to set. As a result, the vehicle runs on the curved downslope while effecting the engine braking so that the frequency of the manual shifting operations and the braking operations are reduced to improve the drivability.

According to the control system having the construction of a seventh feature of the present invention, if the route to be followed is curved and if it is detected that the vehicle is braked just before the curved road, the shift is inhibited. If it is detected that the curved road terminates, on the other hand, the shift inhibition is released. Therefore, if the road is curved so that the vehicle has to run while being braked, the change in the driving force, as accompanying the shift, is prevented, and the drop in the engine braking force, as caused by an upshift, can be prevented to keep the stability at the time of running on the curved road. When the termination of the curved road is detected, on the other hand, a shift can be done so that a downshift can be effected by depressing the accelerator pedal, for example, to achieve a sufficient accelerability. Alternatively, an upshift is effected to lower the RPM of a power source or the engine so that the quietness and the fuel economy are improved.

According to the control system having the construction of an eighth feature of the present invention, if a straight road between curved roads, as is followed by a shift pattern for setting a high gear ratio, is short or passed for a short time, a shift pattern for easily setting a gear ratio higher than that to be ordinarily set for a straight road is adopted for the shift control. While the vehicle is running on a curved road while controlling the shift on the basis of the shift pattern for setting a higher gear ratio easily, this higher gear ratio is liable to set on the basis of the shift pattern for an intermediate straight road if the straight road between the curved roads is short or passed for a short time. As a result, the shift pattern is reluctant to change between the curved roads so that the so-called "hunting" or "busy shifting" for causing the shifts frequently is prevented. Moreover, when the vehicle enters again the curved road after having passed the intermediate straight road, it runs at a relatively higher gear ratio so that a sufficient driving force can be generated for the curved road having a high running resistance. As a result, the riding comfort and the drivability are improved.

According to the control system having the construction of a ninth feature of the present invention, if a flat road between upslopes/downslopes or an upslope/downslope between flat roads is short or passed for a short time, the shift control is executed by the shift pattern just before. Specifically, if the flat road is short, the shift pattern, which is liable to set a higher gear ratio for the upslope/downslope control, is used for the shift control. If the flat road is long or if the upslope/downslope is short, on the contrary, the basic shift pattern to be used for an ordinary flat road is adopted for the shift control. As a result, if the shift pattern is changed and if it is decided that the running distance or time for the changed shift pattern is short, the shift pattern is not changed. As a result, the shifting frequency, as accompanying the change in the shift pattern, is lowered to improve the drivability.

According to the control system having the construction of a tenth feature of the present invention, the shift control, as based on the road data, and the shift control, as based on the data obtained on the basis of the actual run, are selected according to the result of comparing the gear ratios obtained from the individual shift controls. Specifically, the gear ratio conforming to the decision reference is selected from the gear ratio, as determined on the basis of the road data of the route to be followed, and the gear ratio, as determined on the basis of the actual running state or the road situations, and is outputted as a shift instructing signal. By adopting the decision reference for taking preference of a higher gear ratio, therefore, the accelerability is improved by increasing the driving force. By adopting the decision reference for taking preference of a lower gear ratio, on the other hand, the vehicle is enabled to run with the improved quietness and fuel economy.

According to the control system having the construction of an eleventh feature of the present invention, moreover, the control content of the gear ratio is corrected on the basis of the driving tendency of the driver. The way and taste of the driver are reflected on the shift control so that the characteristics of the entire vehicle such as the shift timing, the driving force or the braking characteristics are coincident or approximate to those expected by the driver so that the riding comfort and the drivability are improved.

The above and further objects and novel features of the present invention will more fully appear from the following detailed description when the same is read with reference to the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Figure 1:
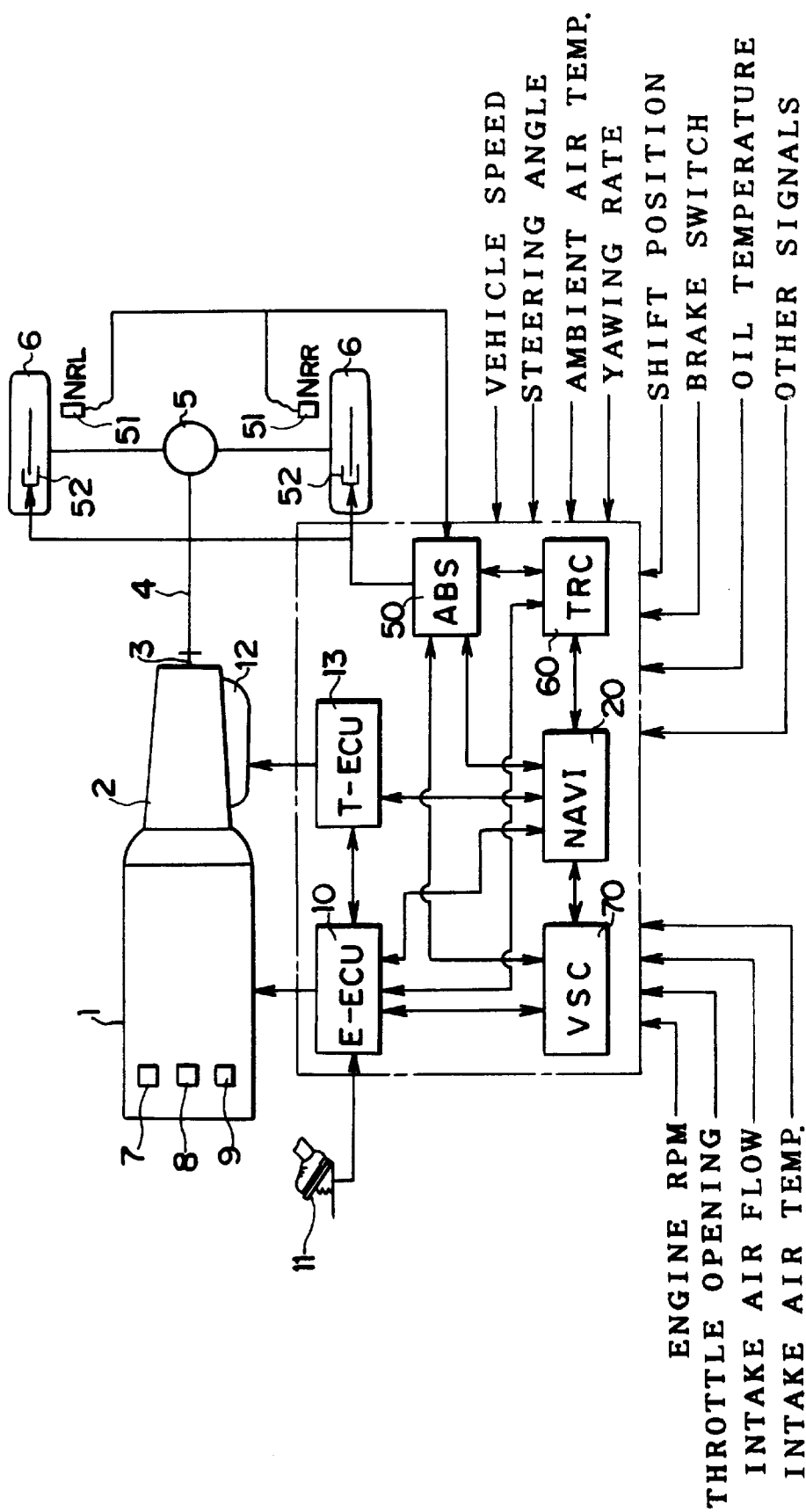
FIG. 1 is a block diagram showing a vehicular control system to which is applied the present invention.

The present invention will be described more specifically with reference to the accompanying drawings. First of all, here will be described the summary of a vehicle to which is directed the present embodiment. In FIG. 1, there is connected to the output side of an engine 1 acting as a power source an automatic transmission 2 which is exemplified by a transmission having gear stages. The output shaft 3 of the automatic transmission 2 is connected through a propeller shaft 4 and a differential 5 to wheels 6.

The engine 1 is provided with an electronic throttle valve 7, a fuel injection unit 8 and an ignition timing adjusting unit 9 composed of a distributor and an igniter, and further with an engine electronic control unit (E-ECU) 10 for controlling those units. To the engine 1, there are attached sensors including an engine RPM sensor, a throttle opening sensor, an air flow meter for detecting the intake air flow, and an intake air temperature sensor, although not shown.

The aforementioned electronic control unit 10 is a unit which is constructed mainly of a microcomputer composed mainly of a processor (e.g., MPU or CPU), a memory unit (e.g., RAM and ROM) and an input/output interface, and is fed with a variety of data such as the depression of an accelerator pedal 11. The output is adjusted by changing the opening of the electronic throttle valve 7 in accordance with the depression of the accelerator pedal 11, for example, and the control characteristics of the opening of the electronic throttle valve 7 relative to the depression of the accelerator pedal 11 is changed on the basis of the running state of the vehicle and the driving tendency of the driver. In order to improve the fuel economy, moreover, the fuel injection is interrupted if the engine RPM at a coasting time exceeds a predetermined reference value. In order to improve the shift shock, still moreover, the angular delay control of the ignition timing is executed at a shifting time of the automatic transmission 2, to lower the engine torque temporarily.

The automatic transmission 2 is a transmission having the well-known construction which is constructed mainly of a torque converter having a lockup clutch, a gear speed change mechanism composed mainly of a plurality of sets of planetary gear mechanisms, and a frictional engagement unit composed of a plurality of clutches and brakes for executing a speed change by changing the torque transmitting routes in the gear speed change mechanism. The lockup clutch and the friction engagement unit are actuated by the oil pressure, which is controlled by a hydraulic control unit 12.

The hydraulic control unit 12 is composed of a regulator valve for regulating the pressure, a shift valve for applying/releasing the lockup clutch or executing the speed change, and a plurality of solenoid valves (although not shown) for outputting signal pressures to those valves. There is further provided an automatic transmission electronic control unit (T-ECU) 13 for controlling the automatic transmission 2 indirectly by outputting electric signals to those solenoid valves. To the automatic transmission 2, moreover, there are attached sensors including a sensor for detecting the input RPM of the transmission, a sensor for detecting an output shaft RPM, and a sensor for detecting the oil temperature, although not especially shown.

The aforementioned electronic control unit 13 is constructed, like the foregoing engine electronic control unit 10, mainly of a microcomputer for deciding the gear stage on the basis of not only the input signals of a throttle opening, a vehicle speed, an oil temperature, a shift position, a shift pattern, a driving tendency, a road slope and a brake signal but also a shift pattern or a shift diagram stored in advance. Moreover, the electronic control unit 13 controls the lockup clutch, in accordance with the running state judged from the data inputted, and the line pressure in accordance with the throttle opening. Incidentally, those individual electronic control units 10 and 13 are connected to communicate with each other while exchanging the data. As a result, the data necessary for the controls are inputted from a predetermined sensor to the electronic control units 10 and 13 and are transmitted from one electronic control unit 10 (or 13) to the other 13 (or 10).

This automatic transmission electronic control unit 13 is further provided with a function to decide the driving tendency of the driver through a neural network thereby to select the shift pattern on the basis of an answer of the decision. Specifically, the depression (or the accelerator opening) of the accelerator pedal 11, the engine RPM, the vehicle speed, the gear stage, and the deceleration by the braking operation are fetched as the data to decide whether the drive belongs to the so-called "sporty drive" stressing the accelerably or the economic drive for improving the mileage.

Here will be described the shift patterns to be executed by the automatic transmission 2. This automatic transmission 2 controls the speed change on the basis of the shift diagram (or the shift map) in which the individual gear stage regions of forward stages are set by adopting the vehicle speed and the throttle opening, for example, as parameters. This shift diagram includes: a shift diagram for a basic shift pattern (or a normal pattern) to be used for an ordinary drive; a shift diagram for a power pattern to be used when a high driving force is demanded; a shift diagram for an economy pattern to be used when a shift stressing the fuel economy is executed; a shift diagram for a snow mode to be used when the coefficient of friction of a road surface having pressed snow is small; a shift diagram for a traffic jam mode to be used when a low-speed forward run and a stop are repeated; and a shift diagram for a low-speed range to be used in an engine braking range when the engine braking is effected at a low gear stage while inhibiting a higher gear stage.

In the shift diagram for the power pattern, the shift line is set to a higher speed side than that of the shift diagram for the basic shift pattern so that the lower gear stage can be easily used by extending the lower gear stage region to a higher speed side. In the power pattern, therefore, the accelerability is improved. In the shift diagram for the economy pattern, on the contrary, the shift line is set to a lower speed side than that for the basic shift pattern so that the higher speed region is extended to the lower speed side to effect the run at a lower engine RPM thereby to improve the fuel economy.

In the shift diagram for the snow mode, the gear stage region is so set that the lowest gear stage may take a lower gear ratio than that of the maximum such as that of the 2nd speed. As a result, the driving force for the start can be reduced to smooth the start on the so-called "low-$\mu$ road". In the shift diagram for the traffic jam mode, the 2nd speed having an effective engine braking is set to the lowest gear stage so that the forward run at a minute or low speed and the stop can be effected without any serious shock. In the shift diagram for the low-speed range, the regions of the higher gear stages are cut according to the individual ranges.

Figure 2:
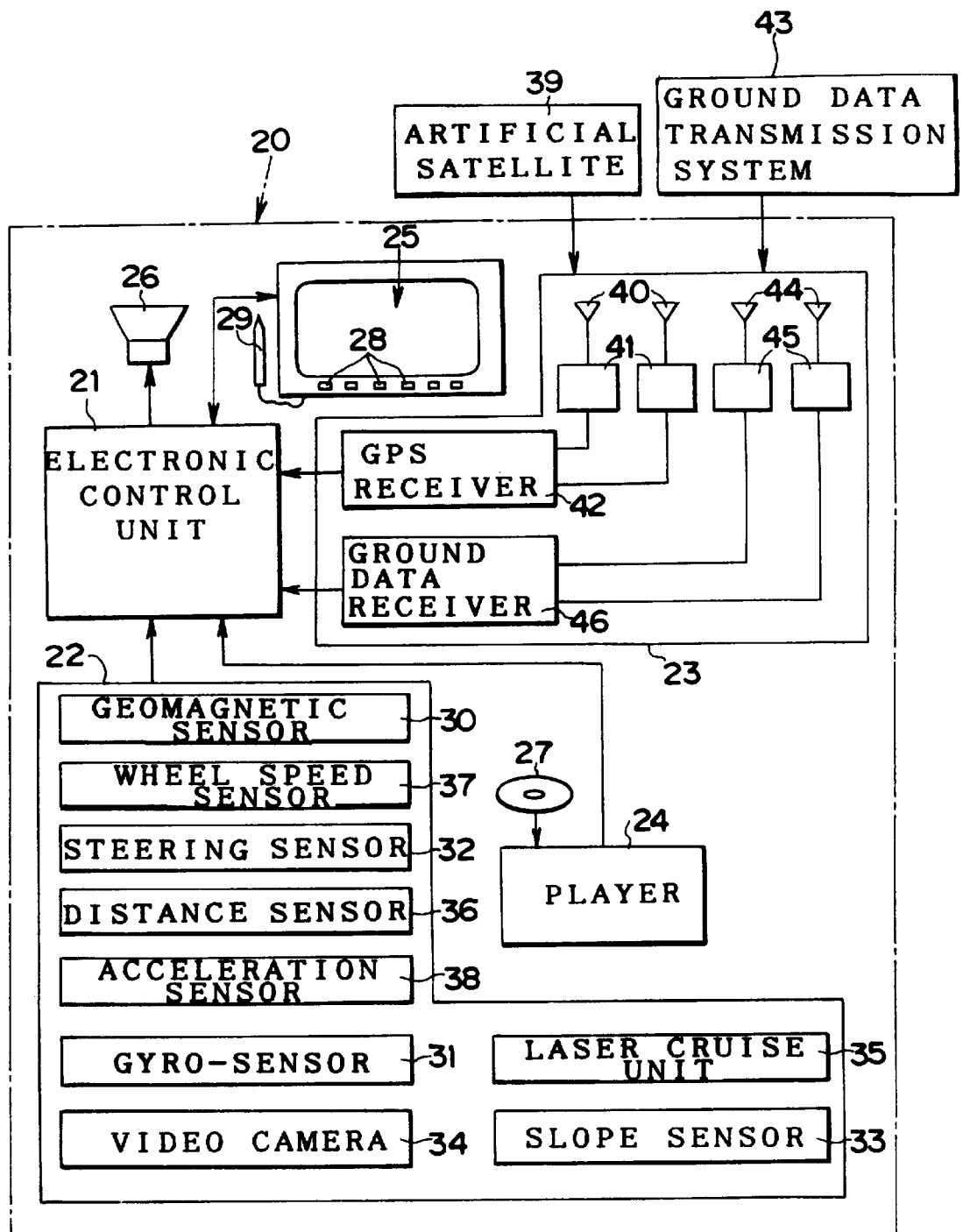
FIG. 2 is a block diagram showing an example of the construction of a navigation system.

The following system is provided for improving the stability, drivability and power performance of the vehicle by feeding the data and the instruction signals to the aforementioned individual electronic control units 10 and 13. Specifically, there is provided a navigation system 20 which has a basic function to guide its carrying vehicle to a predetermined target. This navigation system 20 is equipped, as shown in FIG. 2, with an electronic control unit 21, a first data detecting unit 22, a second data detecting unit 23, a player 24, a display 25 and a speaker 26.

The electronic control unit 21 is a microcomputer composed mainly of a processor (MPU or CPI), a memory unit (RAM and ROM) and an input/output interface. The player 24 is used for reading out data which is stored in a data recording medium 27 such as an optical disk or a magnetic disk.

This data recording medium 27 is stored not only the data necessary for driving the vehicle such as maps, place names, roads or main buildings along the roads but also specific road situations such as straight roads, curves, upslopes, downslopes, gravel roads, sand beaches, riverbeds, urban areas, mountainous regions, ordinary roads, expressways and road signs.

These road data are digitized and stored in the data recording medium 27. Specifically, the road map is divided in a mesh shape, and each mesh is composed as its unit of nodes and links joining the nodes. The stored contents are the attributes of the links joining the nodes, such as the latitudes and longitudes of roads, road numbers, road widths, distances of straight roads, road slopes and radii of curves.

The aforementioned first data detecting unit 22 is used to detect the present position of its carrying vehicle, the road situations and the distances from other vehicles by the self-contained navigation, and is composed of a geomagnetic sensor 30 for detecting the azimuth for driving the vehicle, a gyrocompass 31, and a steering sensor 32 for detecting the steering angle of the steering wheel.

The first data detecting unit 22 is further equipped with a slope sensor 33 for detecting the slopes of roads, a video camera 34 for recognizing a front vehicle and detecting the distance therefrom, a laser cruise unit 35, a distance sensor 36, a wheel speed sensor 37 for detecting the rotational speeds of the individual wheels separately, and an acceleration sensor 38 for detecting the acceleration of the vehicle. Here, the laser cruise unit 35 controls the throttle opening to keep a set vehicle speed when the front vehicle is not detected by the laser radar or when the distance from the front vehicle is sufficiently large.

Moreover, the fist data detecting unit 22 and the electronic control unit 21 are connected to transmit the data so that the data, as detected by the first data detecting unit 22, are transferred to the electronic control unit 21.

On the other hand, the second data detecting unit 23 detects the present position of its carrying vehicle, the road situations, the other vehicles, the blocks and the weather, and is composed of a GPS antenna 40 for receiving radio waves from an artificial satellite 39, an amplifier 41 connected with the GPS antenna 40, and a GPS receiver 42 connected with the amplifier 41.

The second data detecting unit 23 is further equipped with an antenna 44 for receiving radio waves from a ground data transmission system 43 such as a transmitter carried on another vehicle, a beacon or sign post disposed on the road side, a VICS vehicle Information & Communication System) or an SSVS (Super Smart Vehicle System), an amplifier 45 connected with the antenna 44, and a ground data receiver 46 connected with the amplifier 45.

Moreover, the GPS receiver 42 and the ground data receiver 46 are so connected with the electronic control unit 21 as to effect the data communications so that the data, as detected by the second data detecting unit, are transferred to the electronic control unit 21.

On the other hand, the display 25 is made of a liquid crystal or a cathode ray tube (CRT) and is given functions: to display the data graphically such as the roads to follow to the destination, the road situations of the followed roads, the present position of its carrying vehicle, the presences and locations of other vehicles, or the presences and locations of blocks; and to display the running modes corresponding to the predetermined sections of the road situations and the shift diagrams to be used for controlling the automatic transmission 2 on the basis of the datas stored in the data recording medium 27 or first and second data detecting unit 22 and 23. Incidentally, the various data are displayed in the display 25 and outputted as voices from the speaker 26.

With the display 25, there are connected a variety of switches 28 and an external input pen 29, which can be operated to control the first data detecting unit 22 or the second data detecting unit 23, to set the destination and the roads to be followed, to set the predetermined sections in the followed roads, to display and set the running modes suited for the road situations of the predetermined sections, and display and change the shift diagram to be applied for controlling the automatic transmission 2.

In the navigation system 20 described above, the data of the roads to be followed, as detected by the first data detecting unit 22, the data of the roads to be followed, as detected by the second data detecting unit 23, and the map data, as stored in the data recording medium 27, are synthetically compared or evaluated to decide the road situations of or around the present position of the vehicle on the route being followed.

Here, detection errors may be caused in the individual sensors when the present position is to be decided on the basis of the data to be detected by the first data detecting unit 22. Therefore, controls are performed to absorb the errors by the map matching method. This map matching method is a control to correct the present position of the vehicle by comparing the running locus of the vehicle, as detected from the signals of the various sensors, and the map data as stored in the data recording medium 27.

There is further provided an anti-lock brake system (ABS) 50. This system performs a control to keep the gripping forces of the wheels on a low-$\mu$ road by detecting the slip of the wheels at the braking time thereby to increase/decrease the braking force. Specifically, the vehicle body speed is detected on the basis of an input signal coming from a sensor 51 for detecting the RPM of the wheels 6. When a lower wheel speed than that indicating the vehicle body speed is detected, the oil pressure of a brake 52 for the wheel having the lower speed is temporarily lowered to restore the gripping force of that wheel 6. Thanks to this anti-lock brake system 50, the wheels 6 can be individually braked, and this braking is used for the deceleration at the instant when the vehicle speed is controlled by the aforementioned laser cruise unit 35.

On the other hand, the anti-lock brake system 50 can control the driving forces of the individual wheels 6. With this system 50, therefore, there are connected for the data communications a traction control system (TRC) 60 and a vehicle stability control system (VSC) 70. Of these, the traction control system 60 is provided for preventing the drive wheels from idly rotating at the starting time on the low-$\mu$ road or the like. When the idle rotation of the drive wheels is detected at the starting time by comparing the RPMs of the drive wheels and other wheels, the traction control system 60 outputs a signal to the engine electronic control unit 10 to reduce the throttle opening and an oil pressure to the brake 52 of the drive wheels to prevent the idle rotations of the drive wheels.

On the other hand, the vehicle stability control system 70 is provided for retaining the stability of the turning motions of the vehicle. This system 70 generates a moment for a stable steering tendency by braking predetermined wheels a front wheel on the turning outer side or the right and left rear wheels thereby to lower their torques. Thus, this vehicle stability control system 70 is fed with signals such as the RPMs of the individual wheels, the throttle opening and the yawing rate.

The control system having the construction thus far described controls the automatic transmission 2 on the basis of the road data, as obtained from the aforementioned navigation system 20 or by detecting the actual running states. Here will be described examples of the control.

Figure 3:
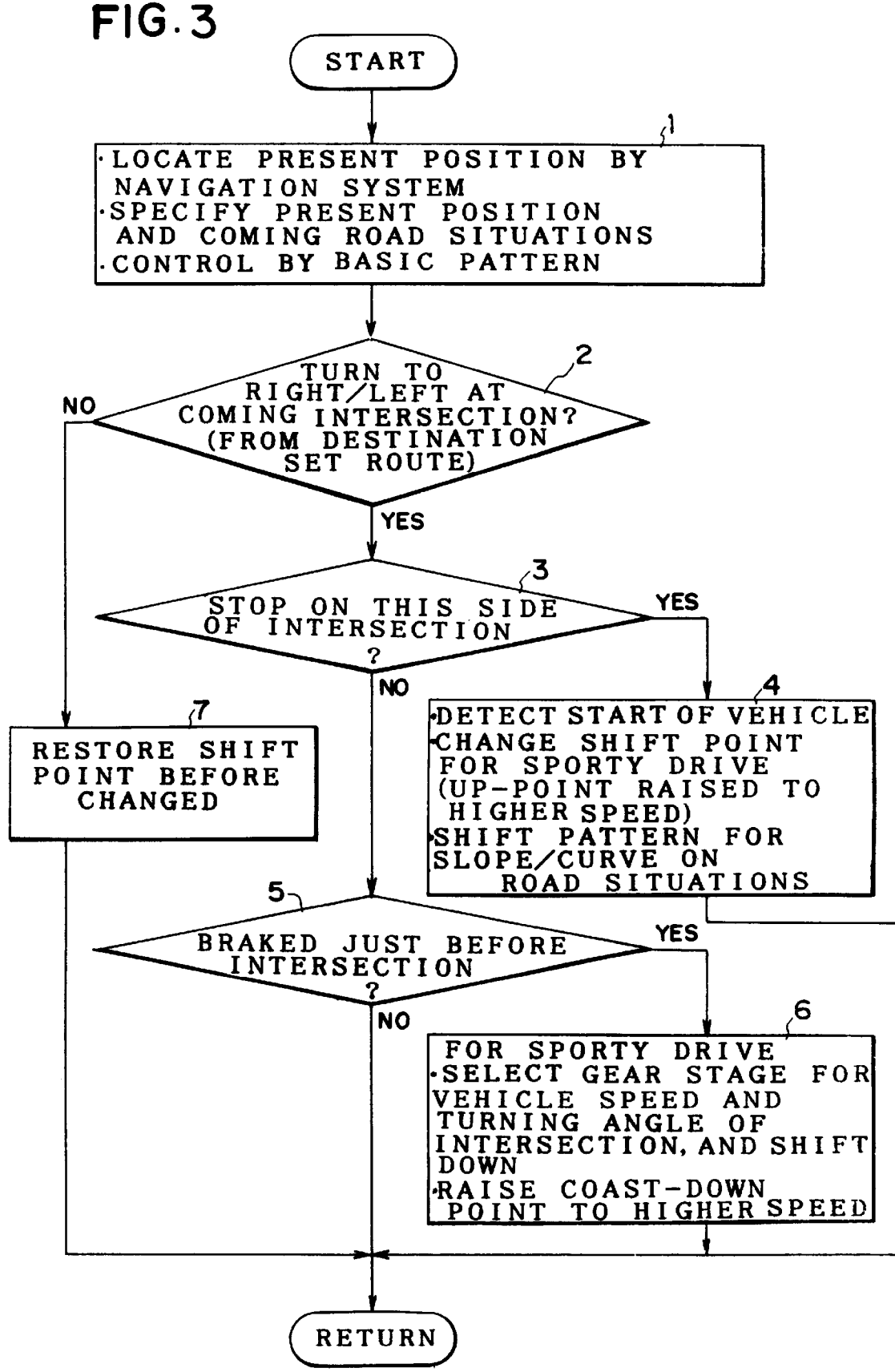
FIG. 3 is a flow chart showing an example of the control to be executed by the control system of the present invention.

FIG. 3 shows an example of the control at the starting time on a curved road. At first Step 1: the present position of the vehicle is located by the navigation system 20; the present position and the coming road situations are specified; and the control of the automatic transmission 2 is executed by the basic pattern. Here, the present position of the vehicle can be located, as customary, by the aforementioned dead reckoning navigation or GPS. Moreover, the road situations can be specified on the basis of the data, as stored in the navigation system 20, and the data as obtained from the aforementioned ground data transmission system 43. Incidentally, the road ahead of the present position can be specified by inputting the destination to set the route to be followed. Alternatively, the coming road can be judged from either the route followed just before or the map data. Moreover, the basic shift pattern can be executed as the shift patter by reading the pattern stored as the shift diagram, for example.

While the vehicle is running, it is decided (at Step 2) whether or not a curve of the road ahead of the vehicle is in the route to be followed. The curve, as defined in the present invention, includes the case, in which the road itself is curved, and the situation in which the road is not curved but to be curved on the basis of the route to be followed. Also included is the case in which the road is curved although it is not discriminated from a portion such as a riverbed other than the road.

In this curved situation, generally speaking, the road itself is curved or turned to the right or left at an intersection. In the control example of FIG. 3, there is detected the situation in which the vehicle is turned to the right or left at the intersection. Incidentally, it is also decided in this case whether or not the intersection is sloped. If the answer of Step 2 is "YES", it is decided (at Step 3) whether or not the vehicle has been stopped on the read signal on this side of the intersection. This decision can be made by a suitable control unit such as the automatic transmission electronic control unit 13 on the basis of the vehicle speed.

If the answer of Step 3 is "YES", the start of the vehicle is detected by the automatic transmission electronic control unit 13, and the basic shift pattern is changed to one for the curve or the slope/curve (at Step 4). In other words, the shift pattern is changed to one for the curve, if it is detected that the intersection is flat, and one for the slope/curve if it is detected that the intersection is sloped.

In the shift pattern for the curve, a lower gear stage than that of the basic shift pattern is liable to use. Specifically, the upshift point is set to a higher speed side. This changing control of the shift pattern may be done if the driving tendency is sporty, or only if a specific drive mode such as a sport mode is selected. When the vehicle is to turn to the right or left at an intersection, the automatic transmission 2 is controlled on the basis of the curve shift pattern or the slope/curve shift pattern, and the control routine is returned. Incidentally, the sport mode is a shift mode in which a gear stage is set in response to a shift signal based upon the manual operation, and is set by the not-shown select switch. In this sport mode, moreover, all the forward gear stages are set in the state for effecting the engine braking.

If the answer of Step 3 is "NO", on the other hand, it is decided (at Step 5) whether or not the braking operation has been effected just before the intersection. If the answer of Step 5 is "YES", the basic shift pattern is changed to one for the curve (at Step 6) if the driving tendency is sporty or if the drive mode of the vehicle is the sport mode. In this curve shift pattern, a gear stage on a lower speed side than that of the basic shift pattern is liable to use according to the vehicle speed and the curvature of the intersection, and the coastdown point is set to a higher speed side than that of the basic shift pattern. Incidentally, at Step 6, too, the basic shift pattern can be changed to one for the slope/curve. After this, when the vehicle turns at the intersection, the automatic transmission 2 is controlled on the basis of the curve shift pattern or the slope/curve shift pattern, and the control routine is returned.

Incidentally, the control routine is returned if the answer of Step 5 is "NO", and the basic shift pattern before changed is restored (at Step 7) if the answer of Step 2 is "NO". The aforementioned Step 1 corresponds to shift control means and road data detecting means of the invention of claim 1, and Step 4 corresponds to the shift control means, start detecting means and shift pattern control means.

Thus, according to the control example of FIG. 3, if it is detected that the vehicle is to turn to the right or left at a flat intersection, the automatic transmission 2 is controlled by the curve shift pattern which is liable to use the gear stage on the lower speed side than that of the basic shift pattern. As a result, a sufficient driving force according to the running resistance when the vehicle is to turn to the right or left at the intersection can be achieved, and the acceleration performance after the end of the right or left turn at the intersection can be enhanced to improve the riding comfort and the drivability.

According to the control example of FIG. 3, moreover, if it is detected that the vehicle has once stopped just before an intersection and then has started, the basic shift pattern is changed to one for the curve. As a result, even if the accelerator pedal is returned upon turning the intersection to the right or left, the upshift can be suppressed, and the acceleration after the rightward or leftward turn is effected at the gear stage which was used at the turn. Thus, the troublesome repetition (or the hunting or busy shifting) of the shifts is prevented to improve the riding comfort and the drivability better.

According to the control example of FIG. 3, still moreover, if the intersection is sloped, the basic shift pattern is changed to one for the slope/curve so that a sufficient driving force for the gradient resistance of the slope can be achieved. If the vehicle runs down on a slope, on the other hand, a just enough engine braking can be achieved to improve the riding comfort and the drivability better.

Figure 4:
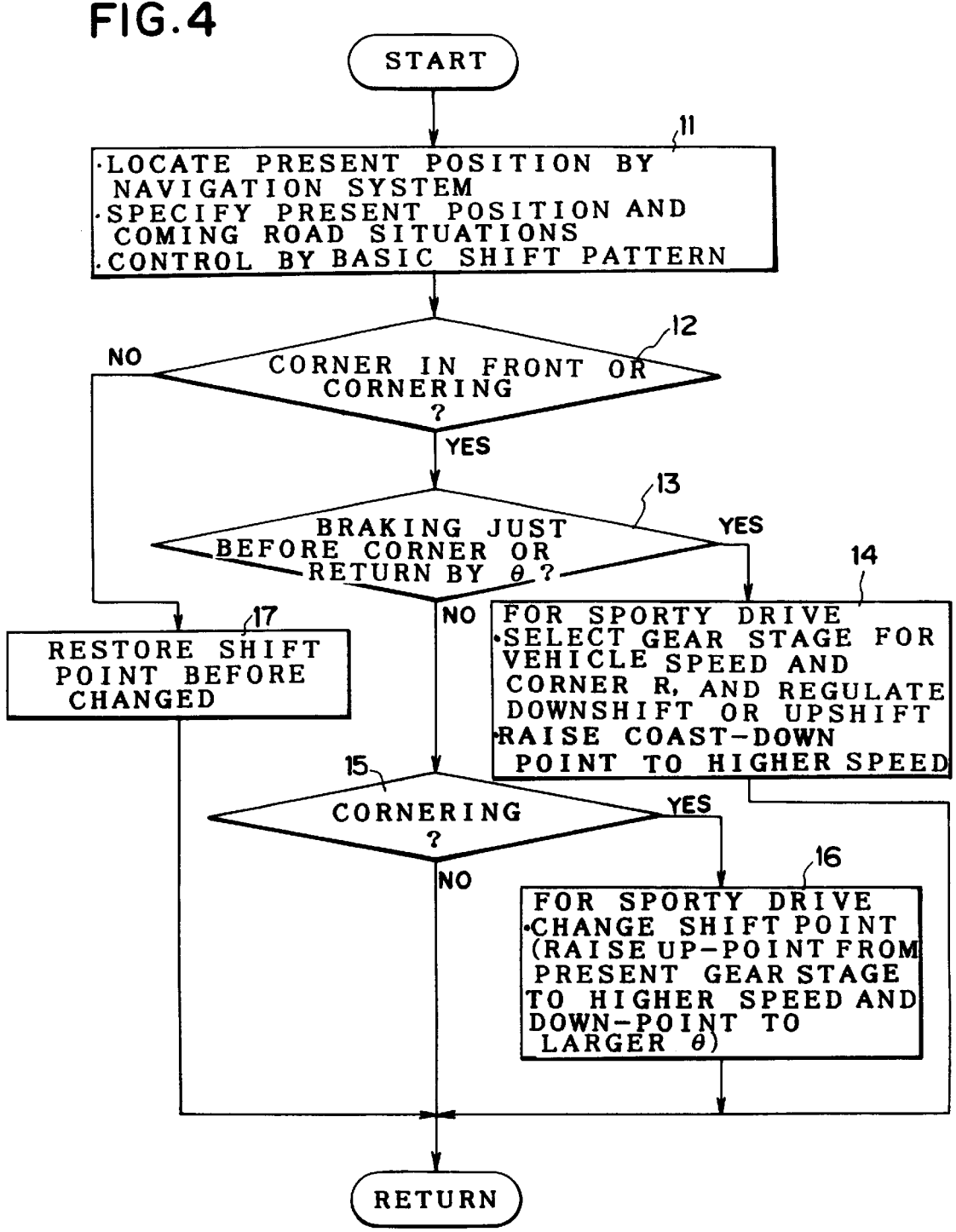
FIG. 4 is a flow chart showing an example of the control to be executed by the control system of the present invention.

Here will be described an example of the control in which the vehicle is braked on a curved road. This control example is shown in FIG. 4. At first, the location of the present position, the specification of the coming road situations, and the control by the basic shift pattern are executed (at Step 11) as at Step 1 in the aforementioned control of FIG. 3. It is then decided (at Step 12) from the road data of the navigation system 20 whether or not a corner is in front of the vehicle, or whether or not the vehicle is cornering. Simultaneously with this, the radius of the corner is detected. If the answer of Step 12 is "YES", it is decided (at Step 13) whether or not the braking operation has been conducted just before the corner, or whether or not the accelerator pedal is returned during the cornering. These decisions can be executed by the predetermined control unit such as the automatic transmission electronic control unit 13. Incidentally, at this Step 13, the magnitude of the braking force at the braking time is also detected. This detection can be decided on the basis of the changing rate of the vehicle speed, that is, the deceleration.

If the answer of Step 13 is "YES", that is, if the corner is so sharp that the vehicle cannot pass smoothly, the basic shift pattern is changed to one for the curve (at Step 14). In this curve shift pattern, a lower gear stage than that of the basic shift pattern is liable to use. As the coast-down point is set to the higher speed side, and as the corner has the smaller radius, or as the braking force is the higher, that is, as the vehicle speed after the braking is the lower, the lower gear stage is easily used.

This control of changing the shift pattern can be executed only when the driving tendency is sporty or when a specific running mode such as the sport mode is selected. And, the cornering is executed with the curve shift pattern, and the control routine is returned.

If the answer of Step 13 is "NO", on the other hand, it is decided (at Step 15) whether or not the vehicle is cornering. This decision can be executed on the basis of the signal inputted from the steering sensor or the signal inputted from the yawing rate sensor. If the answer of Step 15 is "YES", the basic shift pattern is changed to one for the curve (at Step 16). This curve shift pattern has a control content, in which a lower gear stage than that of the basic shift pattern is liable to use. For example, an upshift point from the present gear stage is set to a higher speed side, or a downshift point is set to a larger throttle opening side. This changing control of the shift pattern can also be executed when the driving tendency is sporty or when a specific running mode such as the sport mode is selected.

Incidentally, the curve shift pattern to be set at Step 16 has a control content in which a gear stage on a higher speed side than that of the curve shift pattern to be set at Step 14 is liable to use. This is because the curve shift pattern to be set at Step 14 matches the road situations in which the braking or accelerator pedal is returned just before a corner, and demands a lower speed and a higher driving force.

After this, the cornering is executed with the curve shift pattern, and the control routine is returned. Incidentally, if the answer of Step 15 is "NO", the control routine is returned. If the answer of Step 12 is "NO", the basic shift pattern is set (at Step 17) and the control routine is returned. The aforementioned Step 11 corresponds to shift control means and road data detecting means; Step 12 corresponds to road data detecting means; and Step 13 corresponds to brake detecting means; and Step 14 corresponds to shift control means and shift pattern control means.

Thus, according to the control example of FIG. 4, effects similar to those of the control example of FIG. 3 can be attained. In addition, when the corner is so sharp that the vehicle cannot smoothly turn without being decelerated by a brake unit 14, the basic shift pattern is changed to one for the curve so that the vehicle can run while being braked by the engine and that the accelerability at the instant leaving the corner can be enhanced. On the other hand, if the vehicle advances to such a gentle corner that it can smoothly turn while keeping the speed without operating the brake unit, that is, if the routine advances to Step 16, the engine RPM can be made lower than that of Step 14 to improve the quietness and fuel economy and accordingly the riding comfort and the drivability better.

According to the control example of FIG. 4, moreover, as the corner has the smaller radius or as the braking force is the higher, the shift pattern is changed to one for the curve, in which the gear stage at a lower speed is liable to use. As the cover is so sharp that the vehicle cannot smoothly turn without being decelerated by the higher braking force, the lower gear stage is liable to use so that the driving force is increased for the increased running resistance to improve the riding comfort and the drivability better.

Figure 5:
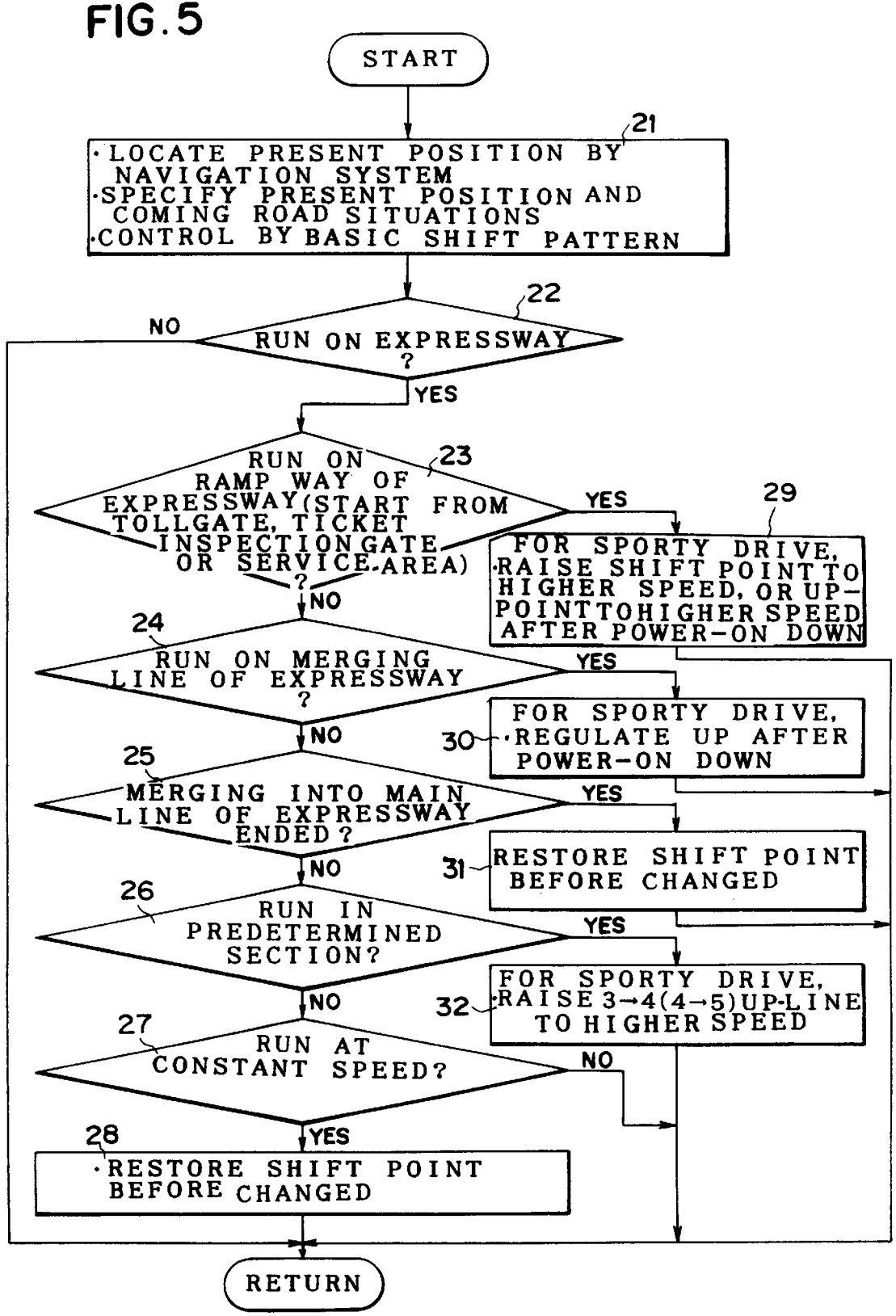
FIG. 5 is a flow chart showing an example of the control to be executed by the control system of the present invention.

Here will be described the control for an automobile dedicated road. FIG. 5 shows an example of the control, in which a control similar to that of Step 1 of FIG. 3 is executed (at Step 21). Next, it is decided (at Step 22) whether or not the vehicle enters an expressway. If the answer of Step 22 is "YES", it is decided (at Step 23) whether or not the vehicle is to start from the ramp way of the expressway such as the tollgate, the ticket inspection gate or the service area. These decisions can be executed by the navigation system 20.

If the answer of Step 23 is "NO", it is decided (at Step 24) whether or not the vehicle is running on a merging lane of the expressway. If the answer of Step 24 is "NO", it is decided (at Step 25) whether or not the merging into the main line of the expressway has been ended. If the answer of Step 25 is "NO", it is decided (at Step 26) whether or not the vehicle is running in a predetermined section such as a curve or slope. If the answer of Step 26 is "NO", it is decided (at Step 27) whether or not the vehicle is running at a constant speed. If the answer of Step 27 is "YES", the shift pattern before changed is restored (at Step 28), and the control routine is returned.

If the answer of Step 23 is "YES", on the other hand, the accelerability is demanded so that the basic shift pattern is changed to one for a specific section (at Step 29). This shift pattern for the specific section has a control content in which a gear stage at a lower speed than that of the basic shift pattern is liable to use. For example, the shift point is set to a higher speed side, or the upshift point after the downshift of the automatic transmission 2 by the power-ON of the engine 1 is set to a higher speed side. This changing control of the shift pattern could be effected when the driving tendency is sporty or when a specific running mode such as the sport mode is selected. Incidentally, the control routine is returned after the operation of Step 29.

If the answer of Step 24 is "YES", on the other hand, the accelerability for smoothly merging into the traffic flow is demanded so that the basic shift pattern is changed to one for the specific section (at Step 30). This shift pattern for the specific section has a control content in which a gear stage at a lower speed than that of the basic shift pattern is liable to use thereby to regulate the upshift after the downshift of the automatic transmission 2 by the power-ON of the engine 1. This changing control of the shift pattern could be executed only when the driving tendency is sporty or when a specific running mode such as the sport mode is selected. Incidentally, after the operation of Step 30 or if the answer of Step 22 is "NO", the control routine is returned.

Moreover, if the answer of Step 25 is "YES", it is sufficient that a constant speed is kept. Thus, a control for restoring the basic shift pattern is executed (at Step 31), and the control routine is then returned. If the answer of Step 26 is "YES", on the other hand, it is demanded to increase the accelerability and the driving force, and the basic shift pattern is changed to one for the specific section (at Step 32).

In this shift pattern for the specific section, a gear stage at a lower speed than that of the basic shift pattern is liable to use, and an upshift point from 3rd to 4th speeds or 4th to 5th speeds is set to a higher speed side. This changing control of the shift pattern could be executed only when the driving tendency is sporty or when a specific running mode such as the sport mode is selected. Incidentally, the control routine is returned after the operation of Step 32.

Moreover, if the answer of Step 27 is "NO", it is necessary to decide the road situations newly and to set the shift pattern according to the road situations, and the control routine is returned. The aforementioned Step 21 corresponds to shift control means and road data detecting means of claim 3; Step 22 corresponds to road data detecting means; and Step 29 corresponds to shift pattern control means.

Thus, according to the control example of FIG. 5, when the vehicle-dedicated road of the expressway, the ramp way of the expressway, the merging line, the curve or the slope is detected, the shift pattern is changed to one for the specific section, in which a gear stage at a lower speed, i.e., at a higher gear ratio than that of the basic shift pattern is liable to use. As a result, a driving force, an accelerability and an engine braking force sufficient for the vehicle to run in the specific section are enhanced to realize a smooth start, a smooth merging into the main line, a smooth passing or a smooth curve turn thereby to improve the riding comfort and the drivability.

Figure 6:
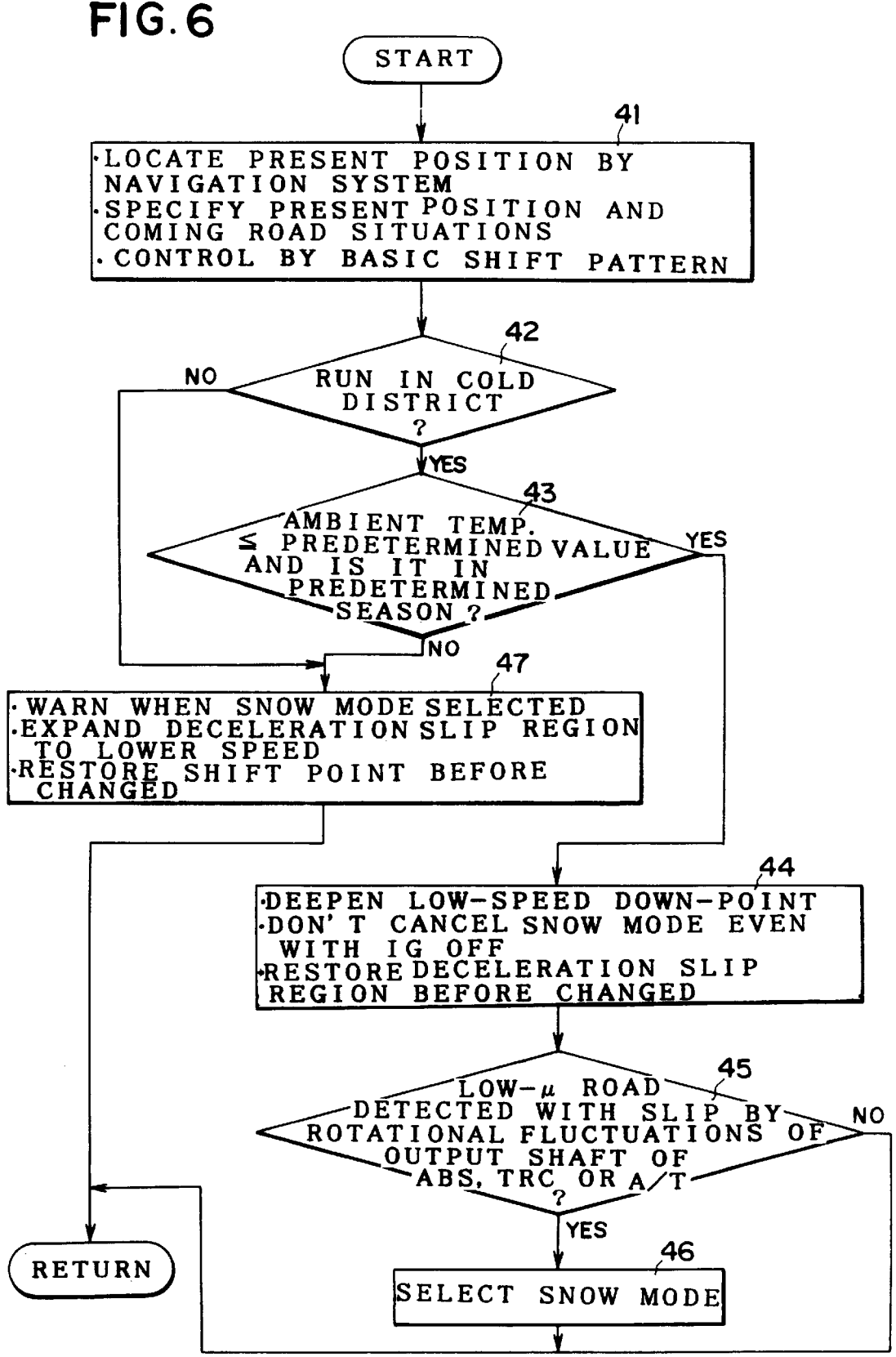
FIG. 6 is a flow chart showing an example of the control to be executed by the control system of the present invention.

Next, a control example, in which the coefficient of friction of the road surface is small, will be described with reference to FIG. 6. In FIG. 6, controls similar to those of Step 1 of FIG. 3 are executed at Step 41. By the navigation system 20, moreover, it is decided (at Step 42) from the set content of a destination whether or not the vehicle is running in a cold zone. If the answer of Step 42 is "YES", it is decided (at Step 43) whether or not the ambient temperature is no more than a predetermined value stored in advance, and it is decided on the basis of a calendar stored as electronic data whether or not it is in winter.

If it is detected at Step 43 that the ambient temperature is no more than the predetermined value and that it is in winter, the basic shift pattern is changed to one for the cold zone (at Step 44). In this cold zone shift pattern, the downshift point is set at a lower speed than that of the basic shift pattern. As a result, the gear stage on a higher speed side, i.e., at a lower gear ratio than that of the basic shift pattern is liable to use so that the driving force can be suppressed to prevent the slip of the wheels.

At this Step 44, on the other hand, the snow mode is selected at the previous running time. After this, even if the ignition key is once turned OFF and then ON again for the present run, the automatic transmission 2 is automatically controlled in the snow mode. As a result, it is possible to supplement the situation in which the driver has forgotten the selection of the snow mode at the second running time. Moreover, the deceleration slip region of the lockup clutch of the automatic transmission 2 could be returned to the vehicle speed before changed.

It is then decided (at Step 45) whether or not the road has a low coefficient of friction, that is, a frozen state. This decision can be made on the basis of the data stored in advance in the navigation system 20, or the renewable data, or by the anti-lock brake system 50 or the vehicle stability control system 70. If the answer of Step 45 is "YES", the shift pattern for the cold zone is changed to one for the snow mode (or the shift pattern for the low-friction coefficient road) (at Step 46). Incidentally, if it is detected at Step 45 that the road is not the low-friction coefficient road, the control is made as it is with the cold zone shift pattern, and the control routine is returned.

If the answer of Step 42 is "NO" or if the answer of Step 43 is "NO", it is warned in voice or by lamp that the snow mode is not suited for the present road situations. If this snow mode is selected, the pattern is forcibly changed to the basic shift pattern. In addition, the deceleration slip region of the lockup clutch is expanded to a lower speed side (at Step 47). Since the deceleration slip region is expanded to the lower speed side, the engine RPM is kept at a relatively high value till the low vehicle speed so that the time period for cutting the fuel is elongated to improve the fuel economy.

The aforementioned Step 41 corresponds to shift control means and road data detecting means of claim 4; Step 42 corresponds to road data detecting means; and Step 44 and Step 46 correspond to shift pattern control means. Thus, according to the control example of FIG. 6, if the low-friction coefficient road is detected, the basic shift pattern is changed to one for the snow mode, in which a gear stage at a lower gear ratio than that of the lowest gear stage is liable to use. As a result, the driving force at the start or during the running of the vehicle is suppressed to prevent the slip of the wheels thereby to improve the riding comfort, the drivability and the behavior stability of the vehicle.

Figure 7:
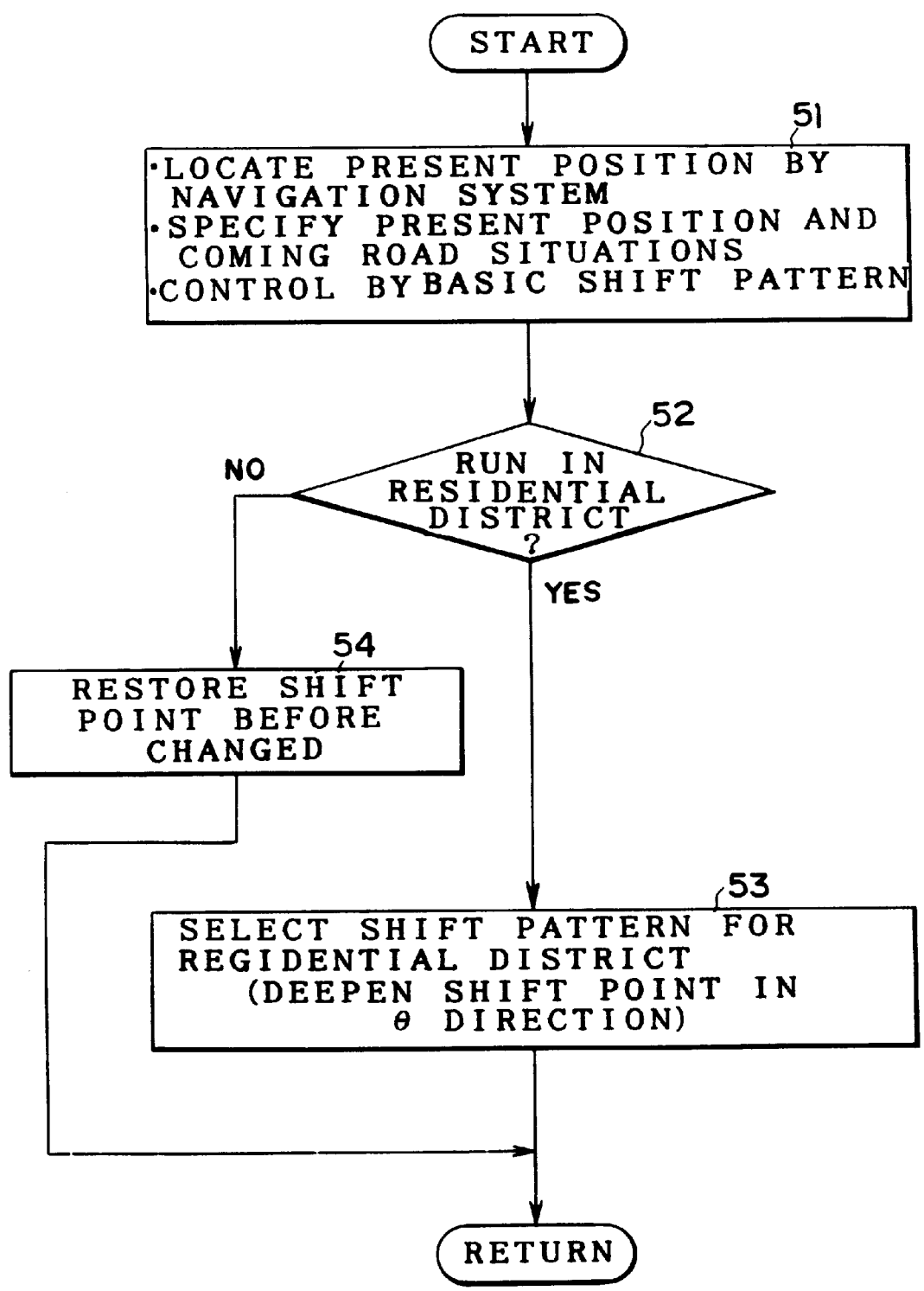
FIG. 7 is a flow chart showing an example of the control to be executed by the control system of the present invention.

A control example for the vehicle to run in a urban area will be described with reference to FIG. 7. In FIG. 7, at first, controls similar to those of Step 1 of FIG. 3 are executed at Step 51. Next, it is decided (at Step 52) whether or not the vehicle runs in the urban area or whether or not the vehicle has already been running in the urban areas (or residential district). This decision can be executed on the basis of either the detection result of the present position by the navigation system 20 or the road data. If this answer of Step 52 is "YES", the basic shift pattern is changed to one for the urban area, by which the automatic transmission 2 is controlled (at Step 53), and then the control routine is returned. Here, the shift pattern for the urban area is one, in which the region of the gear stage on a higher speed side having a low gear ratio is expanded to a lower speed side to a larger throttle opening θ side.

Incidentally, if the answer of Step 52 is "NO", the shift pattern before changed is restored (at Step 54), and the control routine is returned. The Step 51 corresponds to shift control means and road data detecting means of claim 5; Step 52 corresponds to road data detecting means; and Step 53 corresponds to shift pattern control means.

Thus, according to the control example of FIG. 7, the shift pattern for the urban areas has a control content, in which a gear stage on a higher speed side, i.e., at a lower gear ratio than the basic shift pattern is liable to use. When the vehicle runs in the urban area having a high residential density, the engine RPM can be suppressed to keep the quietness while preventing the noise and to improve the fuel economy.

When the vehicle is to run on a curved road, a gear stage for effecting the engine braking is desirably used to prevent a transverse acceleration (or transverse G) from becoming excessive and to improve the accelerability at the instant when the curved road is passed. This control can be executed by controlling the shift by using a shift diagram having a wide low speed range for effecting the engine braking, for example. This is a control for inhibiting or suppressing an upshift to a gear stage on a higher speed side such as an overdrive stage and is similar to that for the upslope/downslope. Therefore, when a curved road and an upslope/downslope are mixed, the control system of the present invention performs the control in the following manner.

Figure 8:
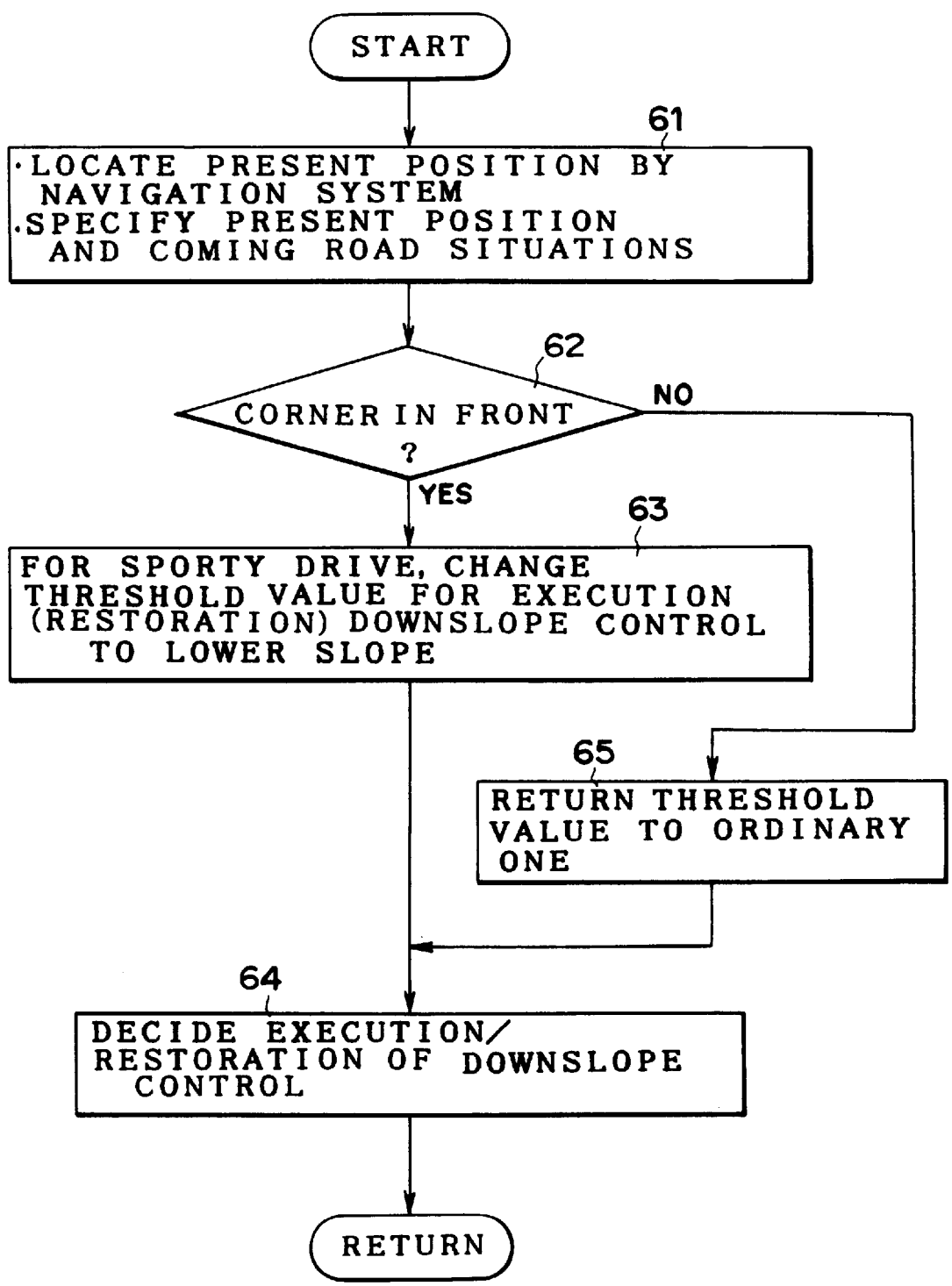
FIG. 8 is a flow chart showing an example of the control to be executed by the control system of the present invention.

In FIG. 8, the location of the present position and the situation of the present position and the coming road situations are executed by the navigation system 20 (at Step 61). These controls are similar to the aforementioned ones of Step 1 shown in FIG. 3. Here, the coming road is either a route to be followed to the destination, as inputted to the navigation system 20, or a forward road to be estimated on the basis of the running history to that point.

When the coming road situations are thus specified, it is decided (at Step 62) whether or not a corner (or a curved road) is on a downslope in front of the vehicle. Here, the "front" covers the range which extends from the present position on the route to be followed, as detected by the navigation system 20. Moreover, the "curve" in the present invention covers both the case, in which the road itself is curved (as at an intersection or an ordinary curve), and the curving on the basis of the route to be followed.

If the answer of Step 62 is "YES", for the sporty driving tendency, the threshold value of execution or restoration of the downslope control is changed to a lower slope (at Step 63). In other words, the downslope control is executed even if the road slope is small. Here, the sporty driving tendency can be decided by the neural network in the electronic control unit 13 for an automatic transmission. Moreover, the downslope control is one for making it liable to use a gear stage at a high gear ratio by inhibiting the setting of the highest gear stage so as to make the engine braking effective when a downslope road is to be run. This shift control is effected on the basis of a shift diagram which has a large gear shift region at a low speed side for an effective engine braking.

The change in the threshold value at Step 63 may be likewise executed even in an ordinary case in which the driving tendency is not sporty. In this case, the changing range of the threshold value may be made different between the sporty tendency and the ordinary time.

When the vehicle advances to a downslope, the downslope control is executed. When a corner is passed or when the downslope ends, the downslope control is ended, and the basic shift pattern is restored (at Step 64). The decision for executing these controls of Step 64 can be made with either the road data, as achieved by the navigation system 20, or the acceleration/or deceleration as detected on the basis of the vehicle speed.

If no corner is detected in front so that the answer of Step 62 is "NO", on the other hand, the threshold value is returned to an ordinary value (at Step 65), and the control routine advances to Step 64. As a result, for a downslope and a curved road, the downslope control is liable to execute.

The aforementioned Step 61 corresponds to shift control means and road data detecting means of claim 6; Step 62 corresponds to road data detecting means; Step 64 corresponds to shift pattern control means; and Steps 63 and 65 correspond to downslope decision means. Incidentally, this control example can be applied to the case in which the vehicle ascends or descends a slope.

Thus, according to the control example of FIG. 8, the vehicle can smoothly run even on a gentle slope while effecting the engine braking when the slope is curved. In the case of an upslope, on the other hand, a sufficient ascending force can be generated while preventing or suppressing the upshift. In either event, a sufficient engine braking force or driving force is generated to improve the riding comfort and the drivability. When the end of a downslope is detected, the downslope control is ended to allow an upshift. As a result, the engine RPM can be lowered, at the entrance into a straight road after the end of the curved downslope, to improve the quietness and the fuel economy.

Figure 9:
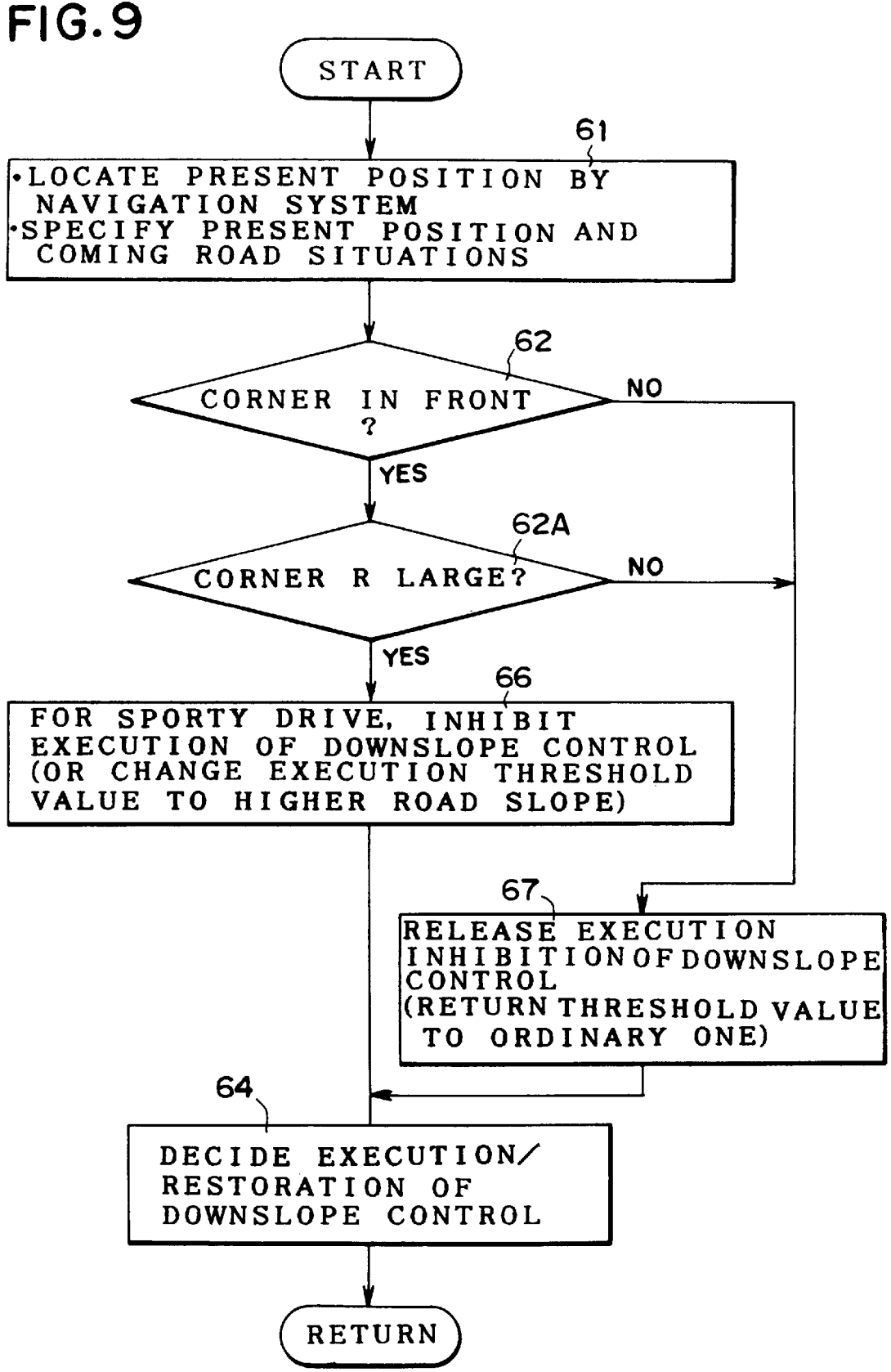
FIG. 9 is a flow chart showing an example of the control to be executed by the control system of the present invention.

In the present invention, on the other hand, the control content can be changed depending upon the value of the radius of turning a corner. This example is shown in FIG. 9. This example of FIG. 9 is made by adding a step of deciding a corner radius to the aforementioned control example of FIG. 8. Specifically, the operations of Step 61 and Step 62 are executed as in the control example of FIG. 8, and, if it is decided at Step 62 that a corner is in a coming downslope, it is decided (at Step 62A) whether or not the radius R of the corner is larger than a preset reference value.

If the answer of Step 62A is "YES", for a sporty driving tendency, the downslope control is inhibited, or a threshold value for deciding execution of the downslope control is changed to a higher slope (at Step 66). Specifically, if the corner has a large radius R, the transverse acceleration at the running time is not so high so that the vehicle can pass the corner at a considerably high speed. Therefore, the downslope control for setting a high gear ratio is not executed. Alternatively, the downslope control at the corner is not executed if the downslope has a small gradient. Incidentally, the shift pattern of the case, in which the downslope control is to be executed on a downslope including a corner, can be exemplified either by a shift pattern which is liable to use a higher gear ratio than that of the shift pattern adopted in the ordinary downslope control or by a shift pattern in which the setting of a gear stage on a higher speed side is further suppressed.

On the basis of the decision reference set at Step 62A, the execution (or operation) or restoration of the downslope control is decided (at Step 64).

If the answer of Step 62 is "NO" because of absence of any corner in front, on the other hand, the routine advances to Step 67, at which the inhibition of execution of the downslope control is released. Alternatively, the aforementioned threshold value is returned to an ordinary one. Incidentally, the shift pattern in the downslope control to be executed in this case can be exemplified either by a lower gear ratio than that of the shift pattern for a corner, or by a pattern which is liable to use a gear stage on a higher speed side. Then, the routine advances to Step 64 at which the execution or restoration of the downslope control is decided.

If the radius R of the corner is smaller than the reference value so that the transverse acceleration increases, the routine advances to Step 67, at which the execution inhibition of the downslope control is released, or the aforementioned threshold value is returned to the ordinary one. In other words, the shift control can be executed with the shift pattern for setting a high gear ratio easily. Incidentally, this control shown in FIG. 9 can be executed not only for the downslope but also an upslope.

As a result, Steps 62 and 62A correspond to road data detecting means in claim 6, and Steps 66 and 67 correspond to downslope decision changing means.

Thus, according to the control example of FIG. 9, in addition to effects similar to those of the control example of FIG. 8, for a small curve radius, the downslope control is executed, or the control is executed with a shift pattern for easily setting a higher gear ratio, so that the driving force can be increased according to the running resistance. In the case of a curve having a relatively low running resistance, on the contrary, the engine RPM can be brought close to that on a straight road thereby to improve the quietness and the fuel economy. As a result, the drivability can be improved better by the control shown in FIG. 9.

Figure 10:
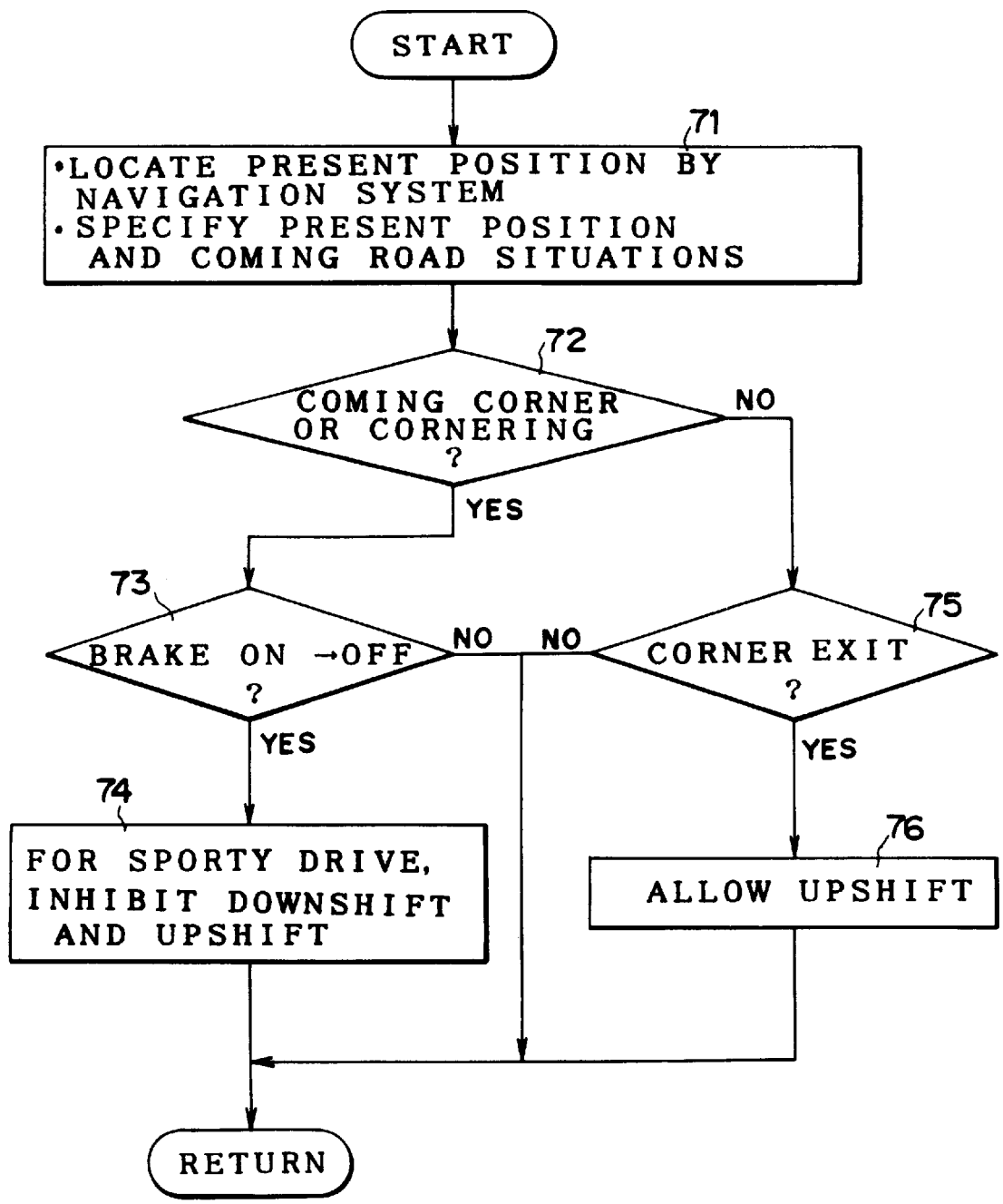
FIG. 10 is a flow chart showing an example of the control to be executed by the control system of the present invention.

Here will be described another example of the shift control at a corner on an upslope/downslope. FIG. 10 shows an example containing the presence/absence of braking at the corner and the control at the corner exit. At first Step 71, the present position is located, and the road situations ahead of the present position are specified. These operations can be executed as in the aforementioned control of Step 61 of FIG. 8 or 9.

It is then decided whether or not a corner is ahead of the vehicle or whether or not the vehicle is cornering (at Step 72). This decision can be made by the navigation system 20, and the present cornering can be decided on the basis of the input signal coming from the yawing rate sensor or the steering sensor. If this answer of Step 72 is "YES", it is decided (at Step 73) whether or not the brake switch has been turned ON from OFF, that is, whether or not a braking has been executed. This decision can be made on the basis of the signal coming from the brake switch, as inputted to the automatic transmission electronic control unit 13, for example.

If this answer of Step 73 is "YES", the coming corner is one having a turning radius requiring a deceleration. If the driving tendency is sporty in this case, any shift is inhibited (at Step 74). Specifically, both the downshift and the upslope are inhibited. Incidentally, the shift pattern may be one for further more easily setting a higher gear ratio than that for the ordinary downslope control.

If the answer of Step 72 is "NO", on the other hand, it is decided (at Step 75) whether or not the vehicle is at the corner exit. This decision can be made by the navigation system 20. If the answer of Step 75 is "YES", the running resistance is reduced to allow an upshift (at Step 76). This control can be executed either by changing the shift diagram or resetting a control flag for inhibiting the shift. The control routine is then returned. If the answer of Step 73 or Step 75 is "NO", the control by the unchanged shift pattern (i.e., the shift pattern for the downslope control) is executed, and the control routine is returned. Incidentally, the control, as shown in FIG. 10, can be executed not only on a downslope but also on an upslope.

The aforementioned Steps 71, 72 and 75 correspond to road data detecting means in claim 7; Step 73 corresponds to brake detecting means; Step 74 corresponds to shift inhibition means; and Step 76 corresponds to shift inhibition release means.

Thus, according to the control example of FIG. 10, if a braking is effected at a corner of an upslope/downslope, the shift is inhibited to keep the present gear stage so that a smooth or stable run can be retained while preventing any change in the driving force at the corner. With the downslope control, on the other hand, the gear stage is kept on a low speed side so that the engine braking can be effected. At the corner exit, the upslope can be allowed to lower the engine RPM thereby to improve the quietness. If the shift pattern is changed to one for easily setting a gear stage having a larger gear ratio when the braking is detected, the vehicle can pass the corner on the upslope/downslope more smoothly.

In the control system of the present invention, as has been described hereinbefore, a control using a gear stage at a higher gear ratio positively is executed at an upslope/downslope having a corner. On the other hand, an actual road has a complicated structure in which curved roads continue across a straight road or in which upslopes/downslopes continue across a flat road. As a result, if the shift pattern is changed at each end of a curving road or if the upslope/downslope control is ended at each end of the upslope/downslope, a shift may frequently occur each time the shift pattern is changed. In order to avoid this disadvantage, the control system of the present invention executes the controls to be described in the following.

Figure 11:
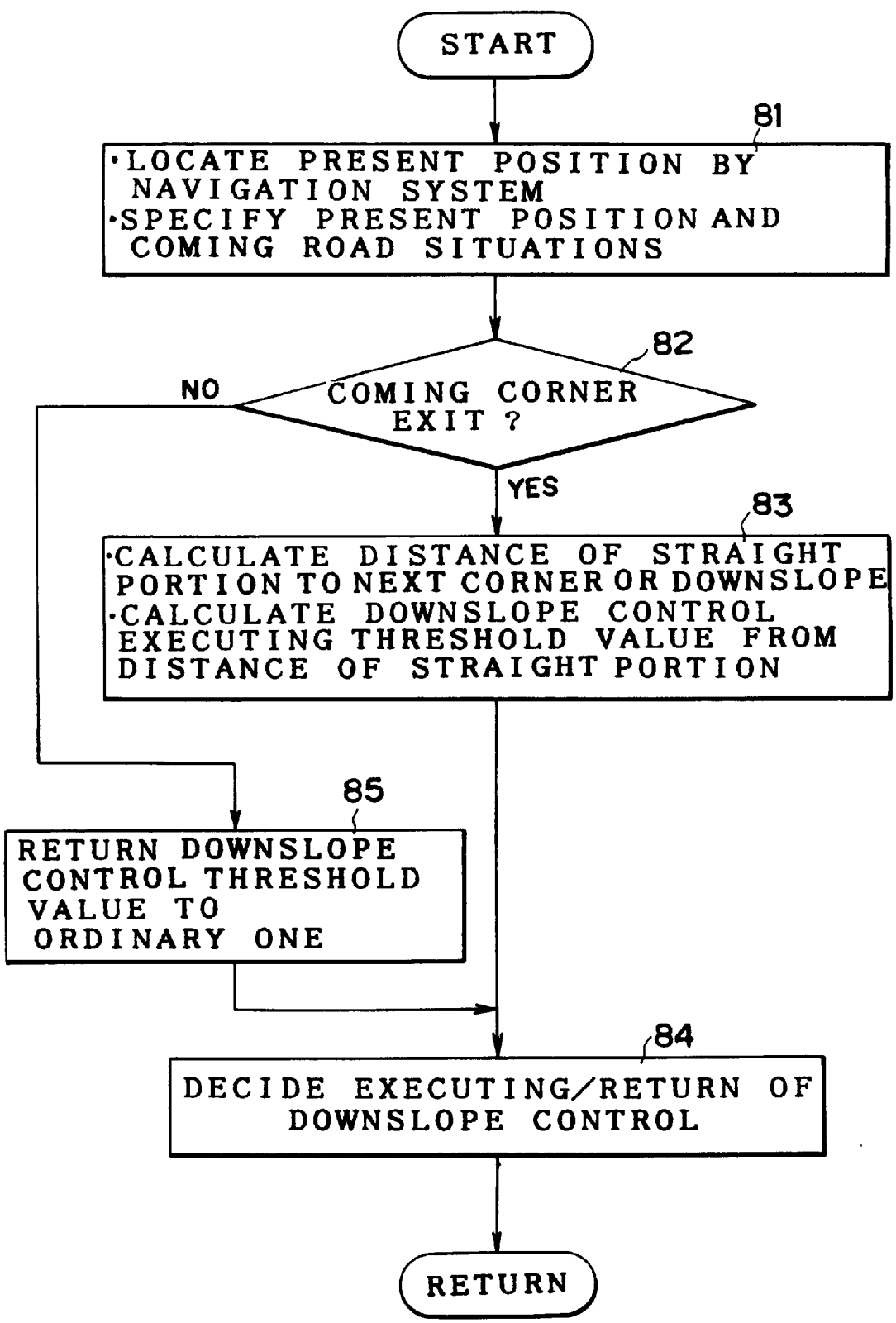
FIG. 11 is a flow chart showing an example of the control to be executed by the control system of the present invention.

FIG. 11 shows a control example for changing a downslope control in accordance with a straight road between corners or downslopes. At first Step 81, the present position is located, and the road situations ahead of the present position are specified. These operations can be performed as at Step 61 shown in FIG. 8. Next, on the basis of the road situations specified at Step 81, it is decided (at Step 82) whether or not a corner exit is ahead of the vehicle. If the answer of Step 82 is "YES", the distance to a straight road to a next corner or a next downslope is calculated, and a threshold value for deciding the execution of the downslope control on the basis of the distance of the straight road is calculated (at Step 83). The distance of the straight road can be calculated on the basis of the road data stored in the navigation system 20. Moreover, the calculation of the threshold value, as based upon the former calculation, can be executed by storing the relation of the two in advance as a map and by reading the threshold value corresponding to the calculated distance of the straight road. Incidentally, the threshold value is set, for example, to the higher value (or gradient) for the longer distance of the straight road. In short, the gradient for the downslope control to be executed becomes the larger for the longer straight road.

After the decision reference for executing the downslope control has been set, as described above, the operation (executing) or return (or quit) of the downslope control is executed on the basis of the decision reference (at Step 84).

On the other hand, if no corner is present ahead of the vehicle so that the answer of Step 82 is "NO", the threshold value for deciding the execution of the downslope control is set to an ordinary one (at Step 85). After this, the control routine advances to Step 84.

The aforementioned Step 81 corresponds to road data detecting means in claim 8; Step 83 corresponds to straight road run detecting means and shift pattern control means; and Step 84 corresponds to means for setting an intermediate straight road shift pattern in claim 8.

According to the control shown in FIG. 11, therefore, if the straight road is short, the execution of the downslope control is executed even with a small gradient so that the preceding downslope control is continued. This makes it possible to prevent the troublesome change in the shift pattern and the according troublesome shift (or the hunting or busy shifting).

Figure 12:
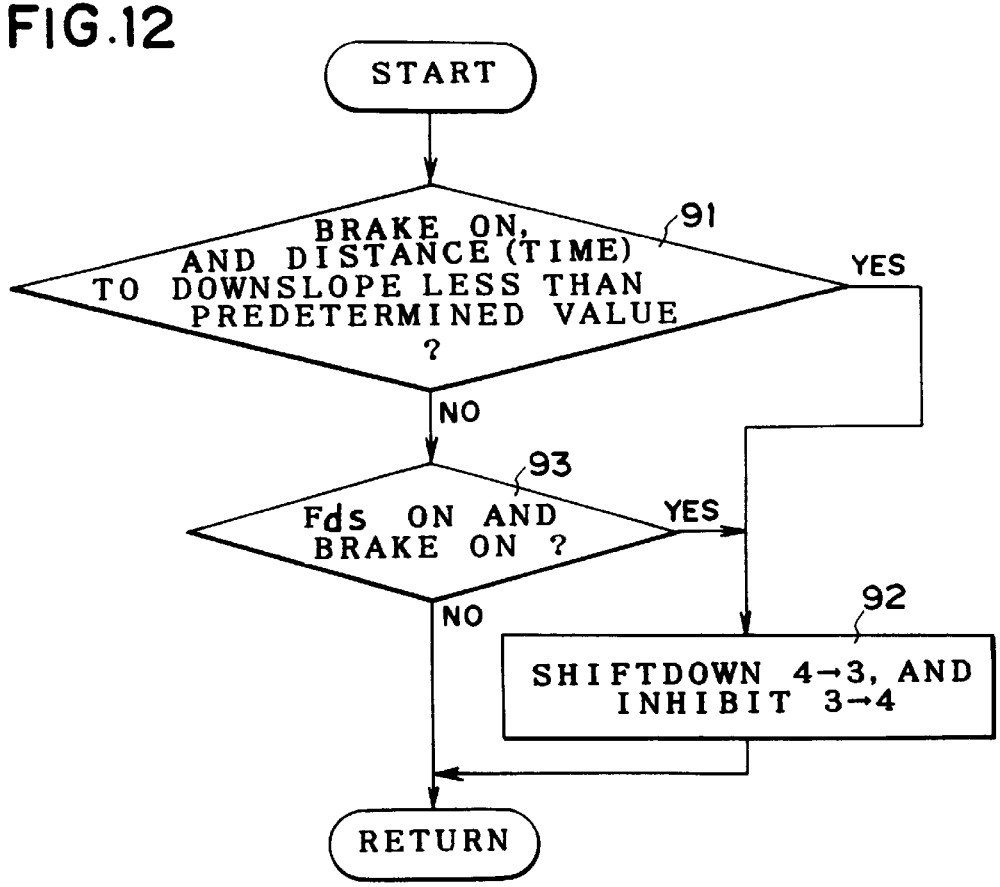
FIG. 12 is a flow chart showing an example of the control to be executed by the control system of the present invention.

Here will be described a control example in which the continuation or return (or quit) of the upslope/downslope control is decided on the basis of the time or distance from the present position in place of the control for deciding the execution/inexecution of the downslope control from the distance from the aforementioned corner exit to the next corner or the downslope. FIG. 12 shows a control example on a downslope. First of all, the vehicle is braked, and it is decided (at Step 91) whether or not the distance or time to the downslope is less than a reference value. This decision can be made on the basis of the signal coming from the brake switch, as inputted to the automatic transmission electronic control unit 13, and the road data obtained by the navigation system 20.

If this answer of Step 91 is "YES", a downshift from the highest 4th speed to the 3rd speed is executed, but the upshift to the 4th speed is inhibited (at Step 92). This control can be executed, for example, by changing the shift pattern from the basic one to a shift pattern for the downslope control. On the other hand, the control of Step 92 is one for effecting the engine braking. It is, therefore, preferable to apply the lockup clutch or to control the lockup clutch in a slipping manner. On the other hand, the downshift should not be limited to the 3rd speed but may be extended to the 2nd speed.

If the answer of Step 91 is "NO", on the other hand, it is decided (at Step 93) whether or not a downslope flag Fds is ON and whether or not the brake is ON. This downslope flag Fds is turned ON if the decision of the downslope holds, as will be described in detail hereinafter. If the answer of Step 93 is "YES", the control routine advances to Step 92, at which the substantial downslope control is executed. If the answer is "NO", the routine is returned.

In the control example shown in FIG. 12, therefore, the downslope control can be started not only by braking on a downslope but also by changing the shift pattern before the downslope is actually entered, so that it can be executed without delay. If the answer of Step 91 on a flat road between downslopes is "YES", on the other hand, the downshift control can be continued to prevent the busy shifting or hunting.

Figure 13:
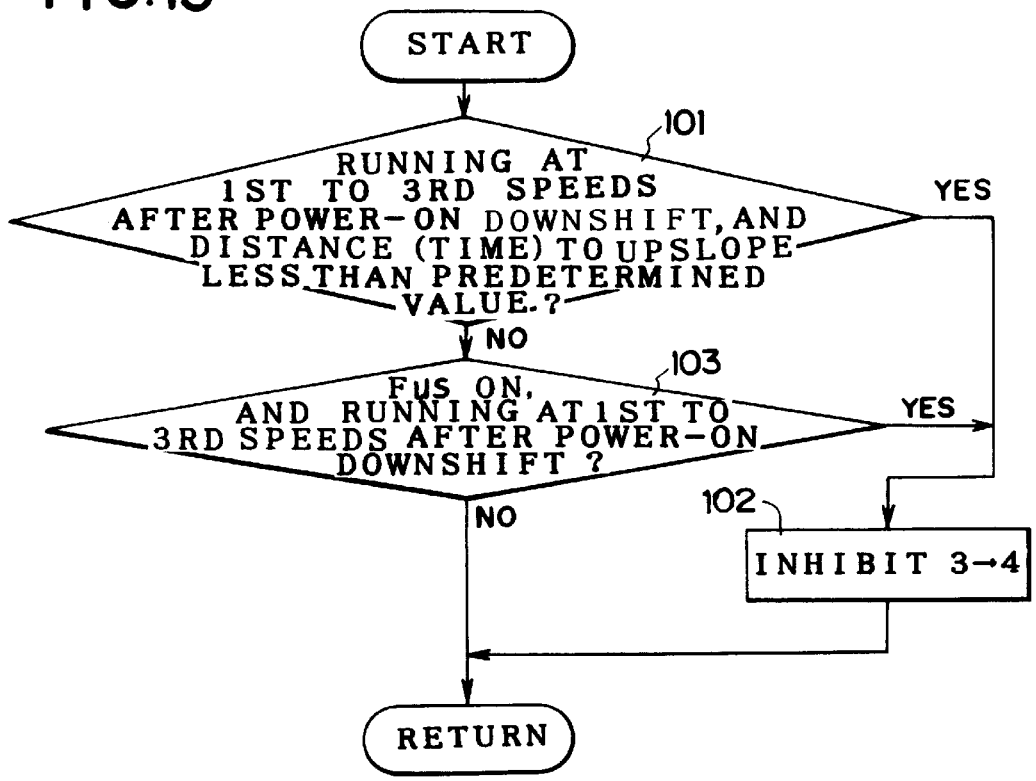
FIG. 13 is a flow chart showing an example of the control to be executed by the control system of the present invention.

The aforementioned control shown in FIG. 12 can also be applied to a control on an upslope, as exemplified in FIG. 13. First of all, it is decided (at Step 101) whether or not the vehicle is running at the 1st to 3rd speeds after the power-ON downshift and whether or not the time or distance to the upslope is less than a predetermined value. These decisions can be done as at Step 91 of FIG. 12 by the navigation system 20 and the automatic transmission electronic control unit 13.

If the answer of Step 101 is "YES", an upshift to the 4th speed is inhibited (at Step 102). This inhibition can be executed either by setting the inhibition flag of the 4th speed or by changing the shift pattern to one for the upslope/downslope.

If the answer of Step 101 is "NO", on the other hand, it is decided (at Step 103) whether or not an upslope control flag Fus is ON and whether or not the vehicle is running at the 1st to 3rd speeds after the power-ON downshift. This upslope flag Fus is turned ON if the decision of the upslope holds, as will be described in detail hereinafter. If the answer of Step 103 is "YES", moreover, the control routine advances to Step 102, at which a substantial upslope control is executed. If the answer is "NO", on the other hand, the routine is returned.

In the control example shown in FIG. 13, therefore, while the vehicle is running with the power-ON downshift on a flat road between upslopes, the upshift is inhibited if just before a coming upslope. As a result, the upslope control can be executed without delay while preventing the busy shifting and hunting.

Figure 14:
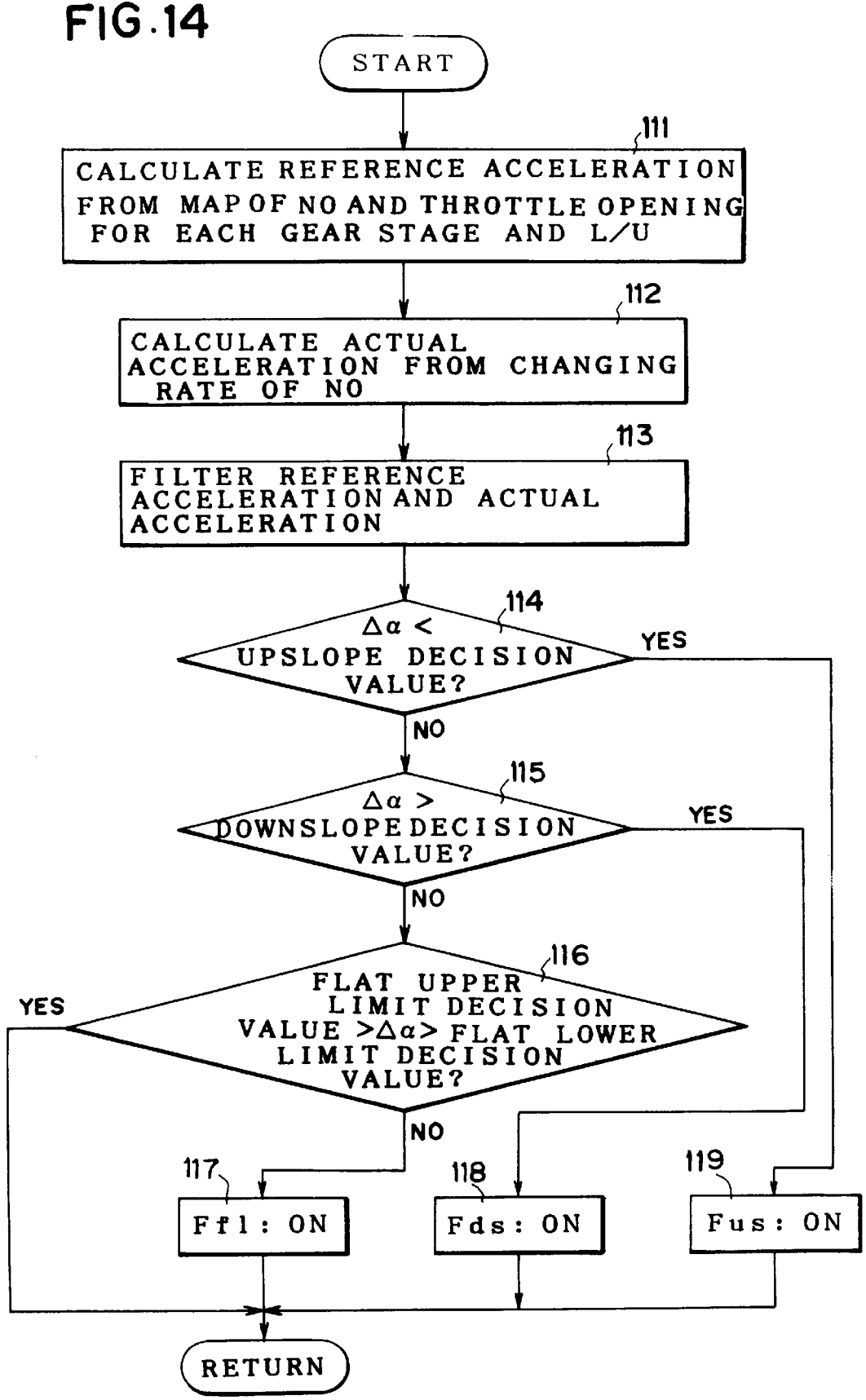
FIG. 14 is a flow chart showing an example of the control to be executed by the control system of the present invention.

With reference to FIG. 14, here will be described a control for setting the downslope flag Fds and the upslope flag Fus. FIG. 14 shows a control routine for deciding the upslope/downslope on the basis of the acceleration. First of all, a reference acceleration is calculated (at Step 111) on the basis of a map in which the output shaft No and the throttle opening are used as parameters for each gear stage and each application/release of the lockup clutch. This map can be prepared on the basis of experiments and stored as electronic data.

Next, an actual acceleration is calculated (at Step 112) on the basis of the changing rate of the output shaft RPM No. Specifically, the output RPM No can be sampled at a constant time interval to calculate the actual acceleration on the basis of the difference of the sampled values. The aforementioned reference acceleration and the actual accelerations are filtered (at Step 113) to remove transiently unstable data or data resulting from disturbances.

It is decided (at Step 114) whether or not the difference $\Delta\alpha$ between the reference and actual accelerations thus obtained is less than an upslope decision value. Since the acceleration is decreased on an upslope by the gravity, the actual acceleration is exceeded by the reference acceleration. Therefore, it can be decided in dependence upon the magnitude of the difference $\Delta\alpha$ whether or not the slope is ascending. If the answer of Step 114 is "NO", the routine advances to Step 115, at which it is decided whether or not the difference $\Delta\alpha$ is more than a downslope decision value. While the vehicle is running on a downslope, the vehicle speed is raised by the gravity so that the acceleration is increased. Thus, the downslope can be decided from that difference $\Delta\alpha$.

If the answer of Step 115 is "NO", it is decided (at Step 116) whether or not the aforementioned acceleration difference $\Delta\alpha$ is within the upper limit and the lower limit for deciding a flat road. If this answer of Step 116 is "YES", a flat road flag Ffl is set ON (at Step 117). Incidentally, if the answer of Step 116 is "NO", the upslope/downslope road and the flat road cannot be decided, and the routine is instantly returned.

If the answer of Step 115 is "YES", on the other hand, the actual acceleration is far higher than the reference acceleration, and the downslope flag Fds is then set ON (at Step 118). If the answer of Step 114 is "YES", on the other hand, the actual acceleration is far lower than the reference acceleration, and the upslope flag Fus is then set ON (at Step 119).

Figure 15:
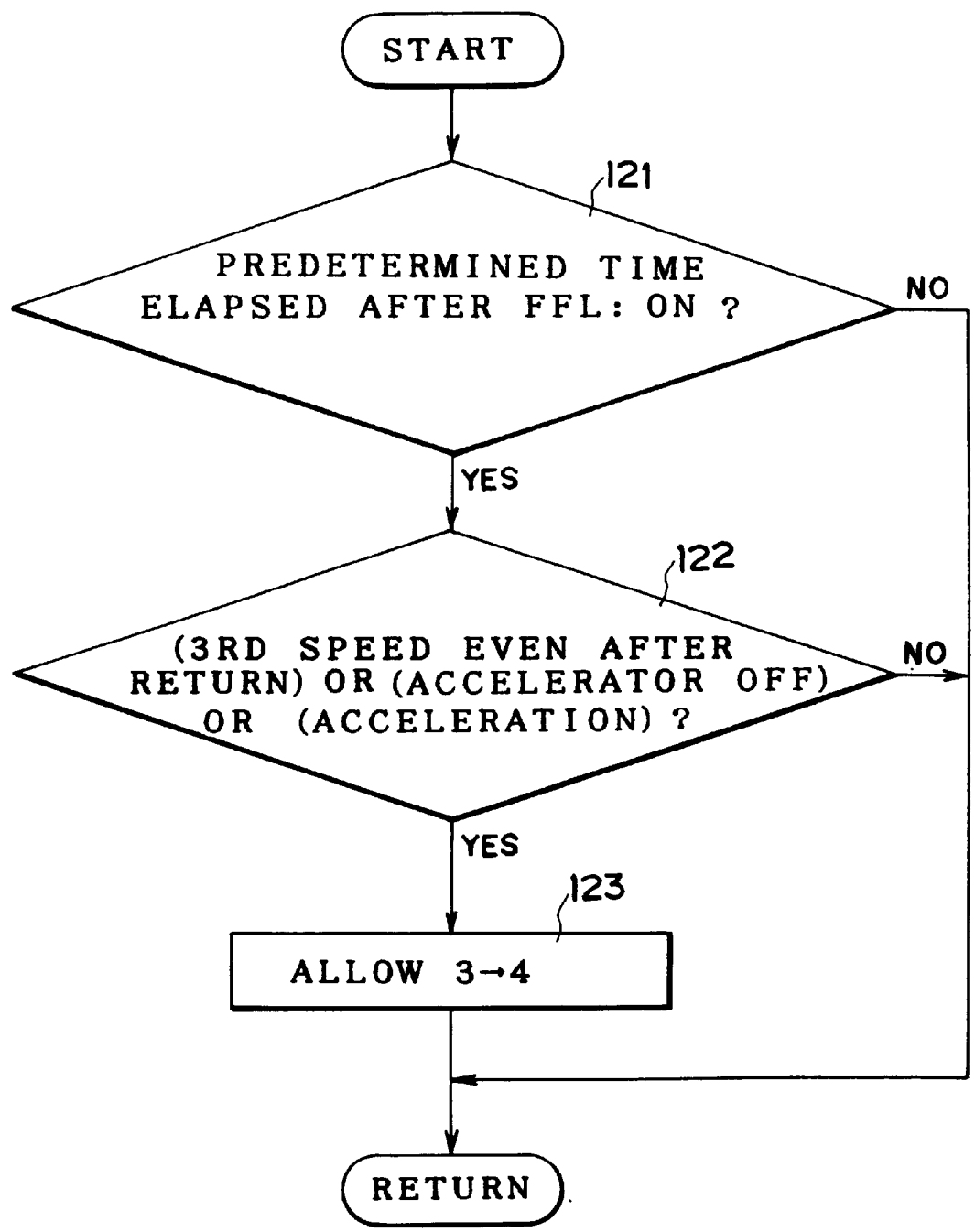
FIG. 15 is a flow chart showing an example of the control to be executed by the control system of the present invention.

These downslope flag Fds and upslope flag Fus are used for deciding the execution of the downslope control or the upslope control, as described above. Moreover, the flat road flag Ffl is used for controlling the return from the upslope/downslope control. FIG. 15 shows an example.

In FIG. 15, it is decided (at Step 121) whether or not a predetermined time is elapsed after the flat road flag Ffl has been set ON. If this answer of Step 121 is "NO", the routine is instantly returned. If the answer is "YES", on the contrary, the routine advances to Step 122.

At Step 122, it is decided whether or not the 3rd speed is kept even the shift pattern is returned to the basic one, whether or not the accelerator pedal has been returned, or whether or not the vehicle has been accelerated. If any of these decisions is affirmed, that is, if the answer of Step 122 is "YES", an upshift from the 3rd speed to the 4th speed is allowed (at Step 123) because no discomfort arises even if the upslope/downslope control is interrupted to restore the basic shift pattern. Incidentally, if the answer of Step 122 is "NO", the routine is returned.

The controls thus far described with reference to FIGS. 11 to 13 are control examples for each coming upslope/downslope. In the control system of the present invention, the continuations or repetitions of curved roads over a predetermined section are detected to decide a winding road on the basis of the detection so that a higher gear stage is restricted or allowed by the upslope/downslope on the basis of the answer, as will be described in the following.

Figure 16:
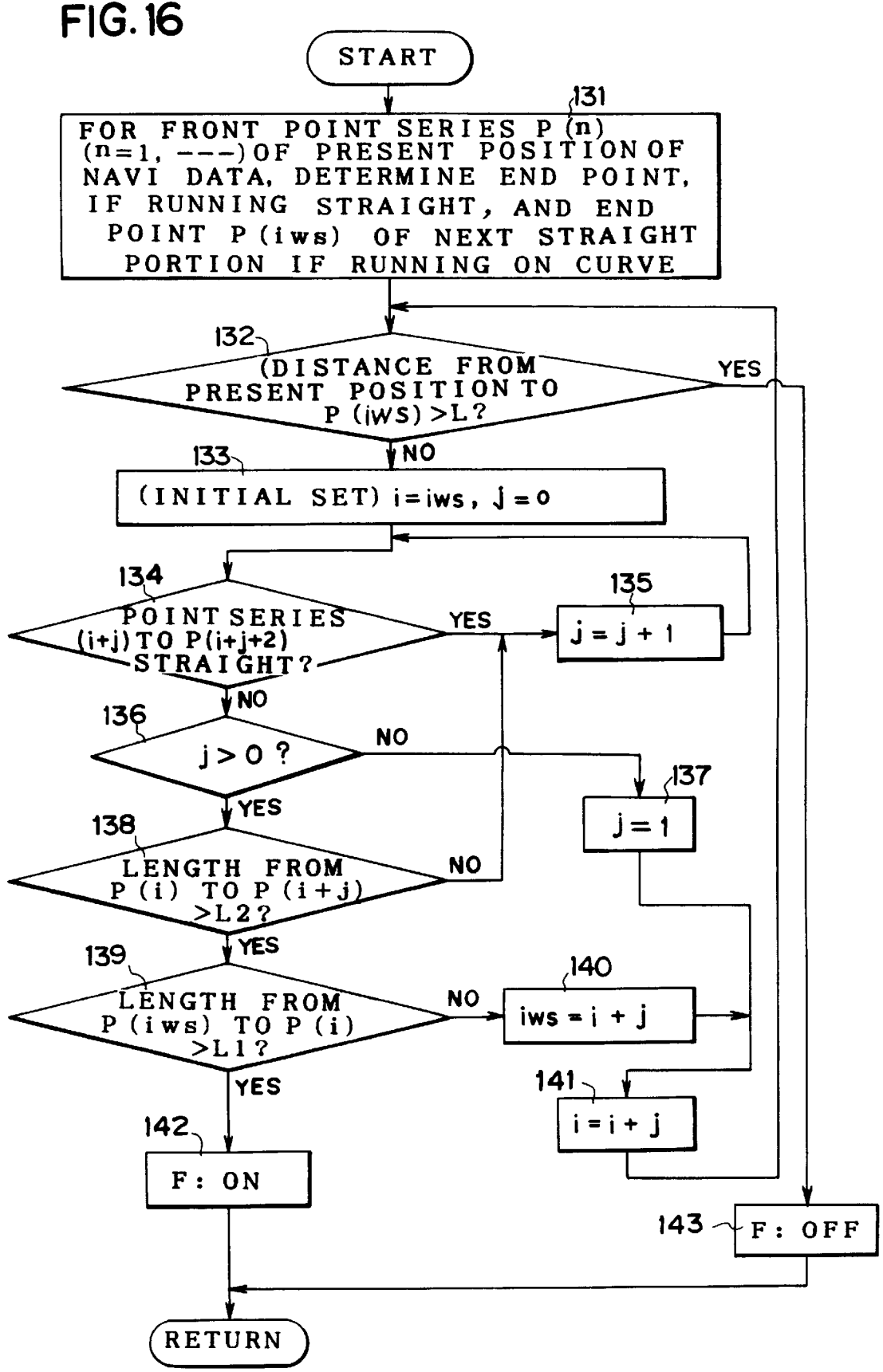
FIG. 16 is a flow chart showing an example of the control to be executed by the control system of the present invention.

First of all, an decision control of a winding road will be described with reference to FIG. 16. If the road being followed is not a winding road, the terminal point of a straight portion, from which the winding road is possibly begun, that is, the starting point of a curved portion is set as the initial point for searching the winding road. Specifically, for a point P(n) (n=1, 2, - - - ) ahead of the present position on the basis of the road data of the navigation system 20, the end point P(iws) is determined as iws if the vehicle is running straight. If the vehicle is running on a curve, the end point of a next straight portion P(iws) is determined as iws (at Step 131).

It is then decided (at Step 132) whether or not the distance between the present position to the searched initial point P(iws) of the winding road exceeds a preset value L. If this answer of Step 132 is "YES", no winding road is present within the distance L. Therefore, the flag F is turned OFF (at Step 143), and the control routine is returned. If the answer of Step 132 is "NO", on the contrary, the searched initial point of the winding road is approaching, so that the loop variables i and j are initialized (at Step 133).

Next, it is decided (at Step 134) whether or not the three points P(i+j) to P(i+j+2) make a straight line. This decision can be made depending upon whether or not the radius of the road jointing those three points is more than a predetermined value, whether or not the angle made by the straight line joining the three points is less than a predetermined value, or whether or not the distance between the straight line joining the first and final points of the three and the middle point is less than a predetermined value.

If this answer of Step 134 is "YES", one loop variable j is incremented to determined the number of points on a straight line (at Step 135). If the answer of Step 134 is "NO", on the contrary, it is decided (at Step 136) whether or not the one loop variable j is more than "1".

If this answer of Step 136 is "NO", that is, if j=0, there is no straight portion. One loop variable j is incremented (at Step 137) whereas the other loop function i is updated to (i+j) (at Step 141), and the routine is returned to Step 132. In short, a further front straight portion is searched.

If the answer of Step 136 is "YES", on the contrary, a j-number of points are arranged straight, and the length of this straight line is decided (at Step 138). In other words, it is decided whether or not the length of the point series P(i) to P(i+j) is larger than a preset value (L2).

If this answer of Step 138 is "NO", the point series can be deemed as a short straight road belonging to the winding road, and the routine advances to Step 135. If the answer of Step 138 is "YES", on the contrary, the straight road is so long that it cannot be deemed as the winding road. Therefore, the routine advances to Step 139, at which it is decided whether or not the distance from the aforementioned searched initial point P(iws) to the point P(i+j) is longer than a preset reference value L1. This reference value L1 is such a distance (or journey) as can be deemed as the winding road. Therefore, if the answer of Step 139 is "YES", the flag F is set ON. If the answer of Step 139 is "NO", on the contrary, the curved portion, if any, is so short in distance (or journey) so that it is not deemed as the winding road. In this case, therefore, the searched initial point is updated (at Step 140), and the routine advances to Step 141.

Incidentally, the winding road is decided either as a section, which has a larger ratio between the straight distance of two points on a map and the distance (or journey) on the map between the two points than a predetermined magnification, or as a section which has a larger deviation of the distance between the straight line between the two points and the point series between the two points than a predetermined magnification with respect to the straight distance between the two points.

Figure 17:
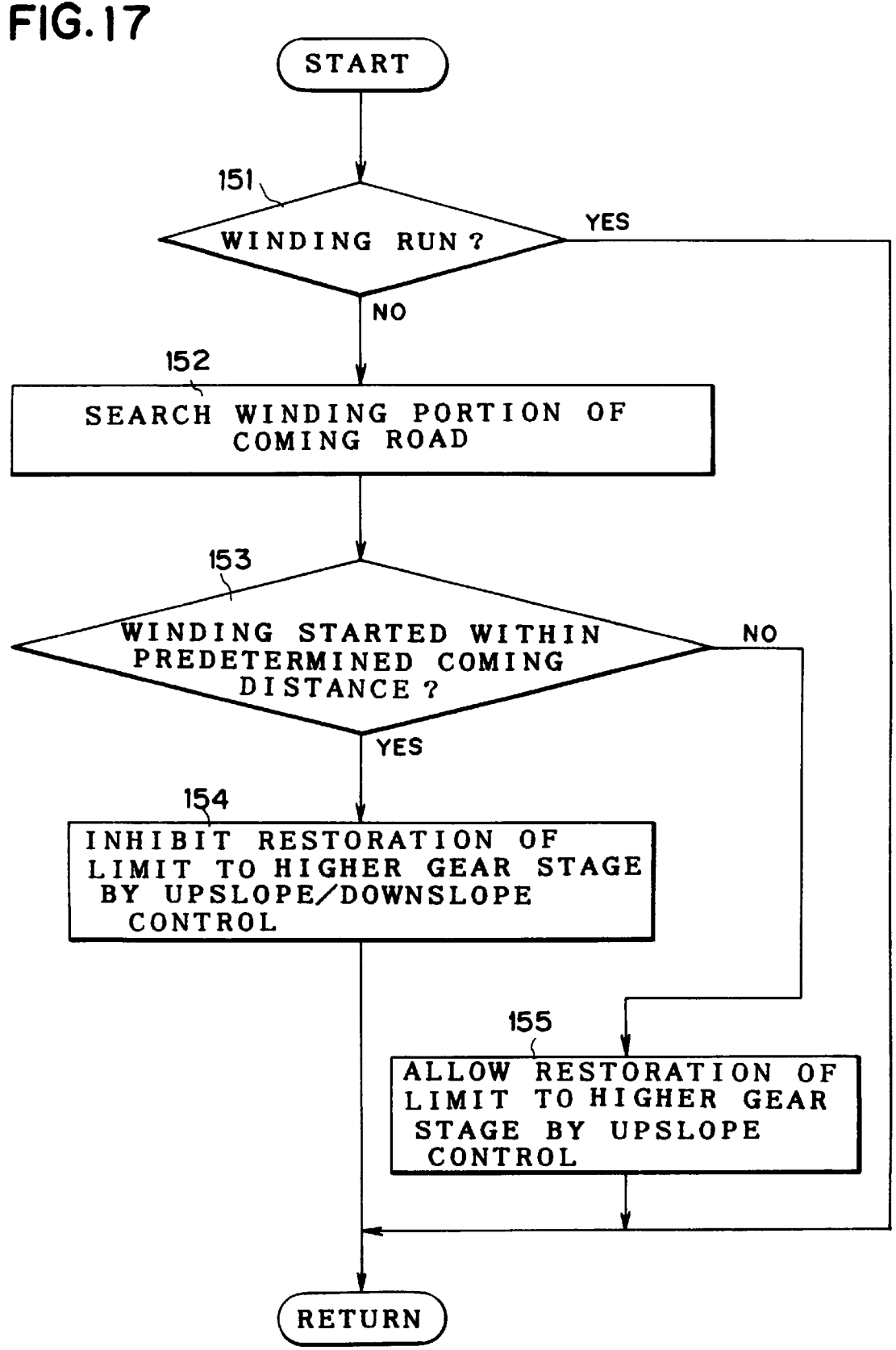
FIG. 17 is a flow chart showing an example of the control to be executed by the control system of the present invention.

FIG. 17 shows an example of the shift control on the winding road thus searched. First of all, it is decided (at Step 151) whether or not the vehicle is running on the winding road. For this, whether or not the vehicle is located in the winding section on the map, as decided as above, may be decided by the navigation system 20. If this answer of Step 151 is "YES", this routine is returned. If the answer is "NO", on the contrary, a coming winding road is searched (at Step 152). This is executed by the aforementioned routine shown in FIG. 16.

Next, it is decided (at Step 153) whether or not the searched winding road is started within a preset distance. If this answer is "YES", the restoration of the control of restricting a higher gear stage by the upslope/downslope control is inhibited (at Step 154). Specifically, the setting of the higher gear stage is restricted, and the shift control by a shift pattern for setting a gear stage easily at a higher gear ratio is continued. If the answer of Step 153 is "NO", on the contrary, the restoration of the control of limiting the higher gear stage by the upslope/downslope control is allowed (at Step 155).

Therefore, when the vehicle is to run on a winding road in which corners having high running resistances continue, a higher gear stage is restricted just before the winding road so that the vehicle will run at a gear stage of a high gear ratio. As a result, the vehicle can smoothly run on the winding road without any shortage of the driving force. When the upslope/downslope merges into a winding road, neither an upshift to a higher gear stage is effected instantly after the end of the upslope/downslope nor effected a downshift at a corner so that the drivability is improved.

In place of the aforementioned shift control which is executed by grasping a predetermined section as the winding road, the shift pattern can exchanged depending upon the road situations before and after an upslope/downslope or a flat road, as will be described in the following.

Figure 18:
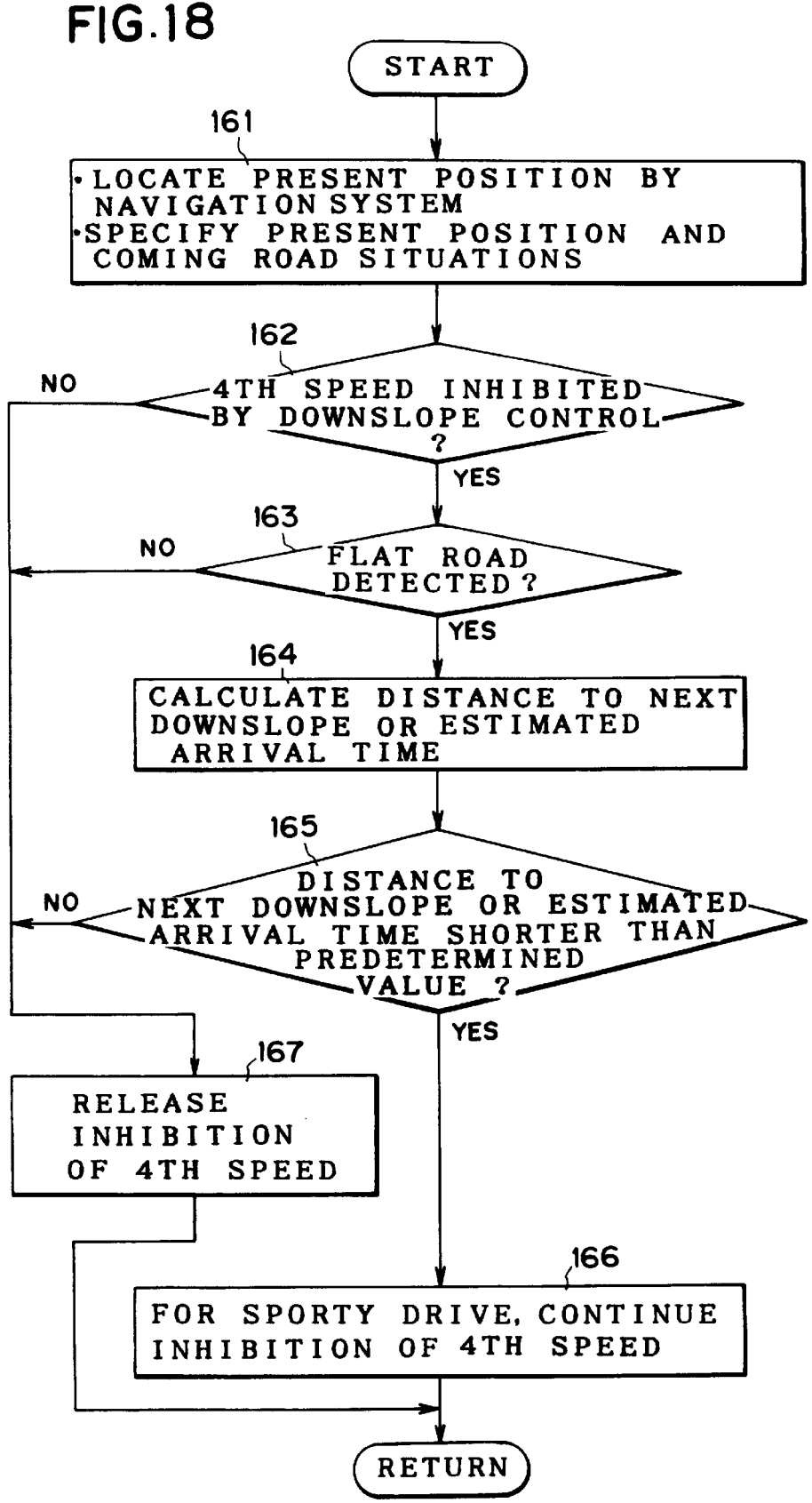
FIG. 18 is a flow chart showing an example of the control to be executed by the control system of the present invention.

FIG. 18 shows a control example, in which the present position is located, and coming road situations are specified (at Step 161). These operations can be executed as at Step 61 in FIG. 8. Next, it is decided (at Step 162) whether or not the 4th speed (i.e., the highest gear stage or the overdrive stage) by the downslope control is inhibited (at Step 162). In this downslope control, when a downslope is detected by the navigation system 20, the shift pattern is changed to one for the downslope so that shift is executed on the basis of the downslope shift pattern. Alternatively, a downslope is detected on the basis of the acceleration to change the shift pattern to one for the downslope so that the shift is executed on the basis of the downslope shift pattern. This downslope shift pattern has a content to inhibit the highest gear stage so that a gear stage on a lower speed side for effecting the engine brake may be set easily.

If the answer of Step 162 is "YES", it is decided (at Step 163) whether or not a flat road is in front. This decision can be made on the basis of the road data of the navigation system 20. If the answer of Step 163 is "YES", the running distance or time from the present downslope to a next downslope is calculated (at Step 164), and it is decided (at Step 165) whether or not the calculation result is less than a predetermined value stored in advance.

If the answer of Step 165 is "YES", the flat road is so short that the vehicle advances again into a downslope. Therefore, the downslope control is continued (at Step 166), and the routine is returned. Incidentally, this control can be done only when the driving tendency is sporty or when the sporty mode is elected. If the answers of Step 162, Step 163 and Step 165 are "NO", on the other hand, the inhibition of the 4th speed is released (at Step 167), and the routine is returned. In other words, the downslope control is released, and the shift control by the basic shift pattern is executed. Incidentally, this control example can also be applied to the control on a downslope.

The aforementioned Step 161 corresponds to road data detecting means in claim 9; Step 165 corresponds to upslope/downslope run detecting means; and Steps 166 and 167 correspond to shift pattern control means and upslope/downslope control decision means.

Thus, according to the control example of FIG. 18, when the vehicle runs on a road having a short flat portion between upslopes, it is controlled by the downslope shift pattern or the upslope shift pattern so that the repetition of speed changes at every pass of the flat road is prevented. Moreover, it is possible to generate an engine braking force required at a next downslope leading to a flat road and a sufficient driving force on an upslope, so that the drivability can be improved.

When the vehicle runs on a road having a long flat road between slopes, on the other hand, it is controlled on the flat road by the basic shift pattern so that the engine RPM can be lowered during the run on the flat road to improve the quietness and the fuel economy.

Figure 19:
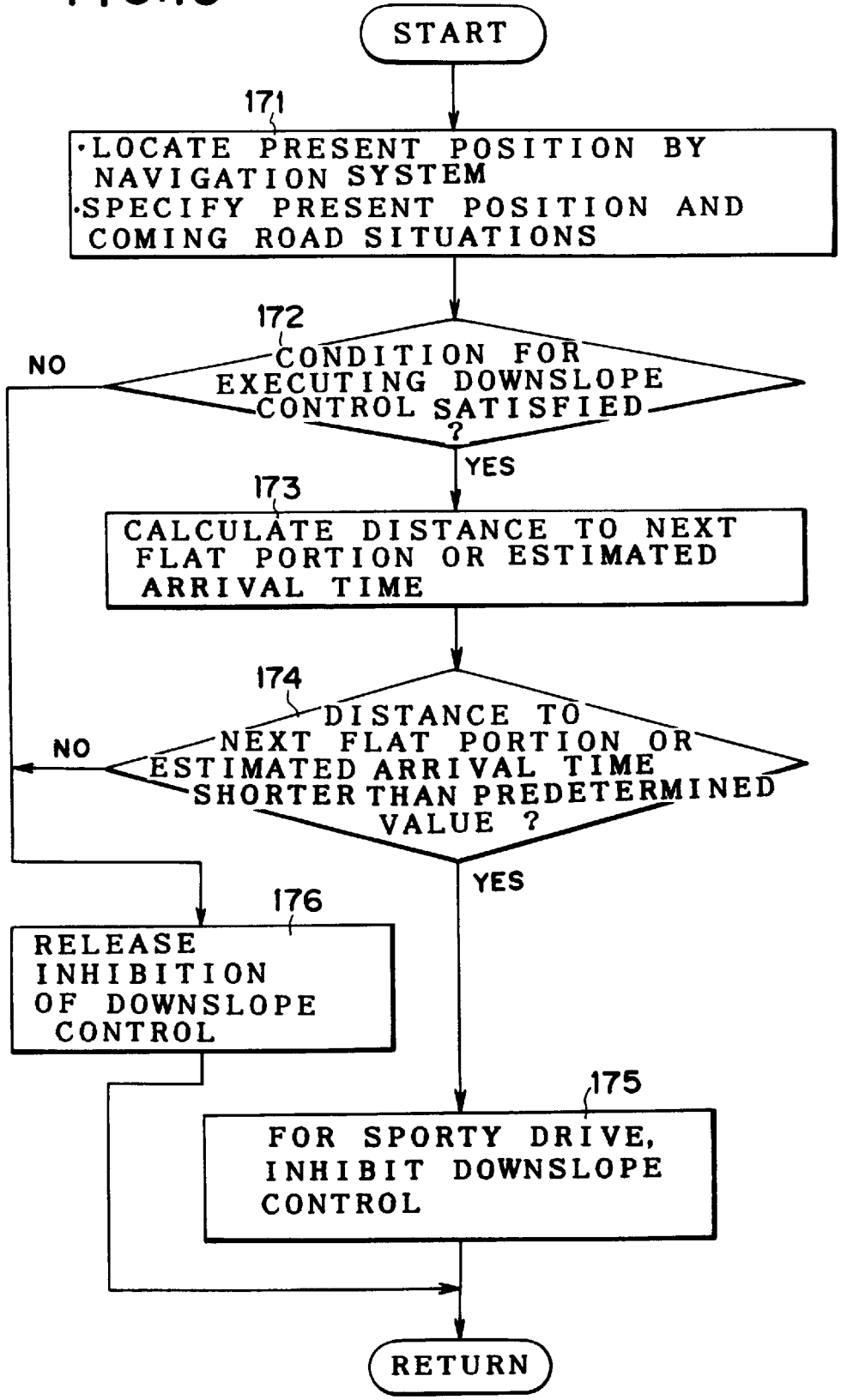
FIG. 19 is a flow chart showing an example of the control to be executed by the control system of the present invention.

FIG. 19 shows a control example when a downslope is sandwiched between flat roads. At Step 171, a control similar to that of Step 161 of FIG. 18 is executed. It is then decided (at Step 172) whether or not the condition for beginning the downslope control is satisfied. This condition can be exemplified by the facts that a downward gradient higher than a predetermined reference value is detected, that the throttle opening is zero, and that the brake switch is ON.

If the answer of Step 172 is "YES", the running distance or time to a next flat road is calculated (at Step 173), and it is decided (at Step 174) whether or not the calculation result is less than a predetermined value stored in advance. If the answer of Step 174 is "YES", the downslope is so short that it is passed for a short time and that the vehicle advances into a next flat road. Even if the condition for beginning the downslope control is satisfied, the downslope control is inhibited (at Step 175). After this, the control routine is returned. This inhibition of the downslope control may be executed only when the driving tendency is sporty. If the answers of Step 172 and Step 174 are "NO", on the contrary, the inhibition of the downslope control is released so that the downslope control can be executed.

The aforementioned Step 171 corresponds to road data detecting means in claim 9; Step 174 corresponds to upslope/downslope running detection means; and Steps 175 and 176 correspond to shift pattern control means and upslope/downslope control decision means. Thus, according to the control example of FIG. 19, when a long downslope is between flat roads, the downslope control is executed so that a gear stage on a lower speed side for effecting the engine braking is liable to set. As a result, an engine braking force to be generated is just enough to improve the drivability. When a short downslope is between flat roads, on the other hand, the downslope control is inhibited so that the vehicle is controlled by the basic shift pattern so that the engine RPM can be lowered to improve the quietness and the fuel economy. Moreover, a shift to be caused by a temporary change in the road situations can be suppressed to prevent the hunting and the busy shifting.

Figure 20:
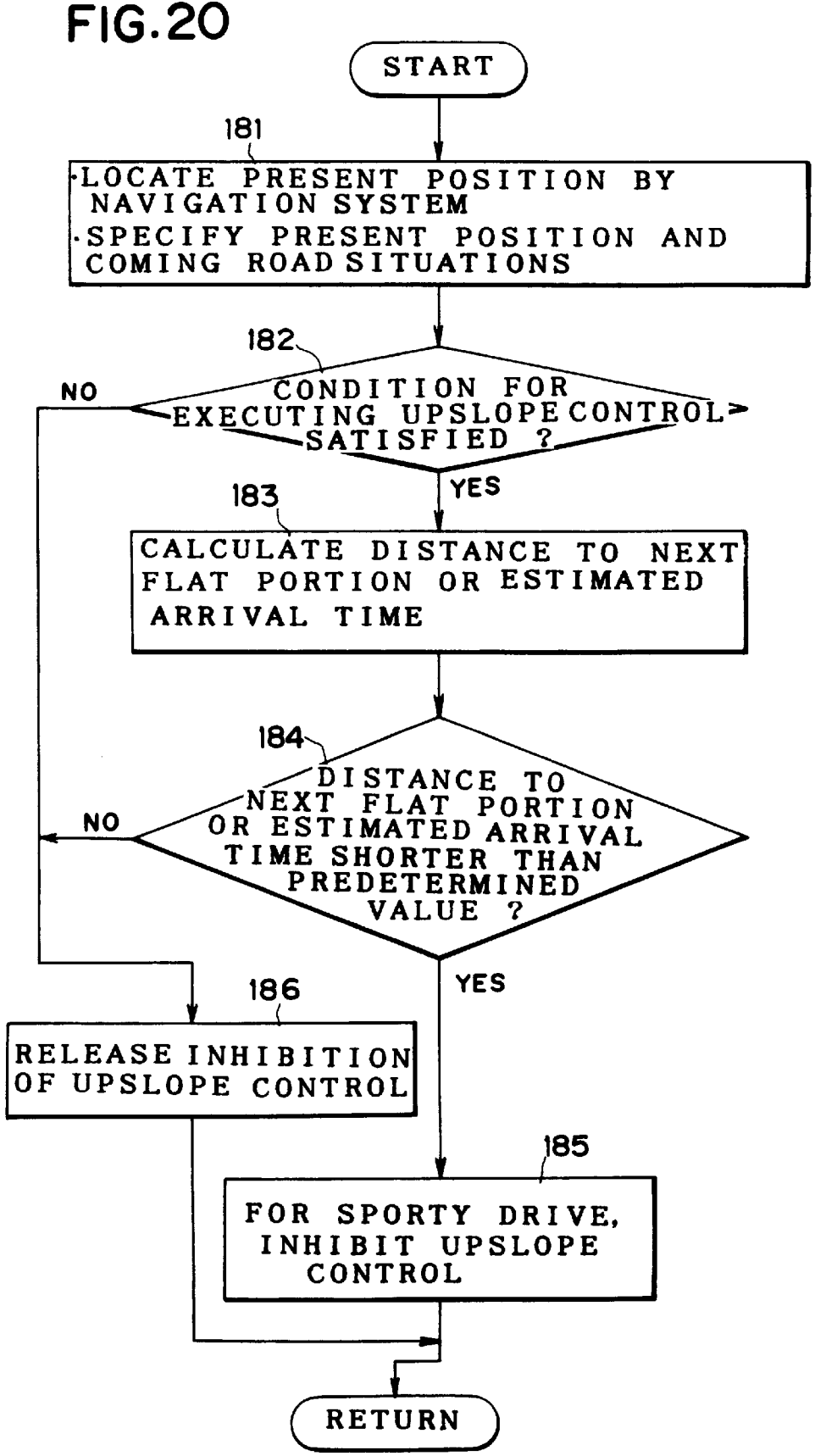
FIG. 20 is a flow chart showing an example of the control to be executed by the control system of the present invention.

Here will be described an example of the upslope control. In FIG. 20 (at Step 181), the location of the present position is executed, and the situations of a road ahead of the present position are specified as at Step 161 of FIG. 18. Next, it is decided (at Step 182 whether or not the conditions for beginning the upslope control is satisfied. This condition can be exemplified by the fact that an ascending gradient higher than a predetermined reference value is detected. Incidentally, this upslope control inhibits an upshift to a gear stage on a higher speed side such as the 4th speed thereby to keep a high driving force. This shift pattern controls the shift by either a shift diagram having no gear stage region of the 4th speed or a shift diagram in which the gear stage on a lower speed side is extended to a higher speed side.

If the answer of Step 182 is "YES", the running distance or time to a next flat road is calculated (at Step 183), and it is decided (at Step 184) whether or not the calculation result is less than a predetermined value stored in advance. If the answer of Step 184 is "YES", the upslope is so short that the vehicle can pass shortly to enter a next flat road. Therefore, the upslope control is inhibited (at Step 185) even if the condition for beginning the upslope control is satisfied. After this, the control routine is returned. This inhibition of the upslope control may be executed only when the driving tendency is sporty. If the answers of Step 182 and Step 184 are "NO", on the other hand, the inhibition of the upslope control is released (at Step 186) so that the upslope control can be executed.

The aforementioned Step 181 corresponds to road data detecting means in claim 9; Step 184 corresponds to upslope running detecting means; and Steps 185 and 186 correspond to shift pattern control means and upslope/downslope control decision means. Thus, according to the control example of FIG. 20, when a long upslope is between flat roads, the upslope control is executed so that a gear stage on a lower speed side having a large gear ratio is liable to set. As a result a sufficient driving force is generated to improve the drivability. When a short upslope is between flat roads, on the other hand, the upslope control is inhibited, and the control is executed by the basic shift pattern so that the engine RPM can be lowered to improve the quietness and the fuel economy. Moreover, the shift by a temporary change in the road situations is suppressed so that the hunting and the busy shifting can be prevented.

Figure 21:
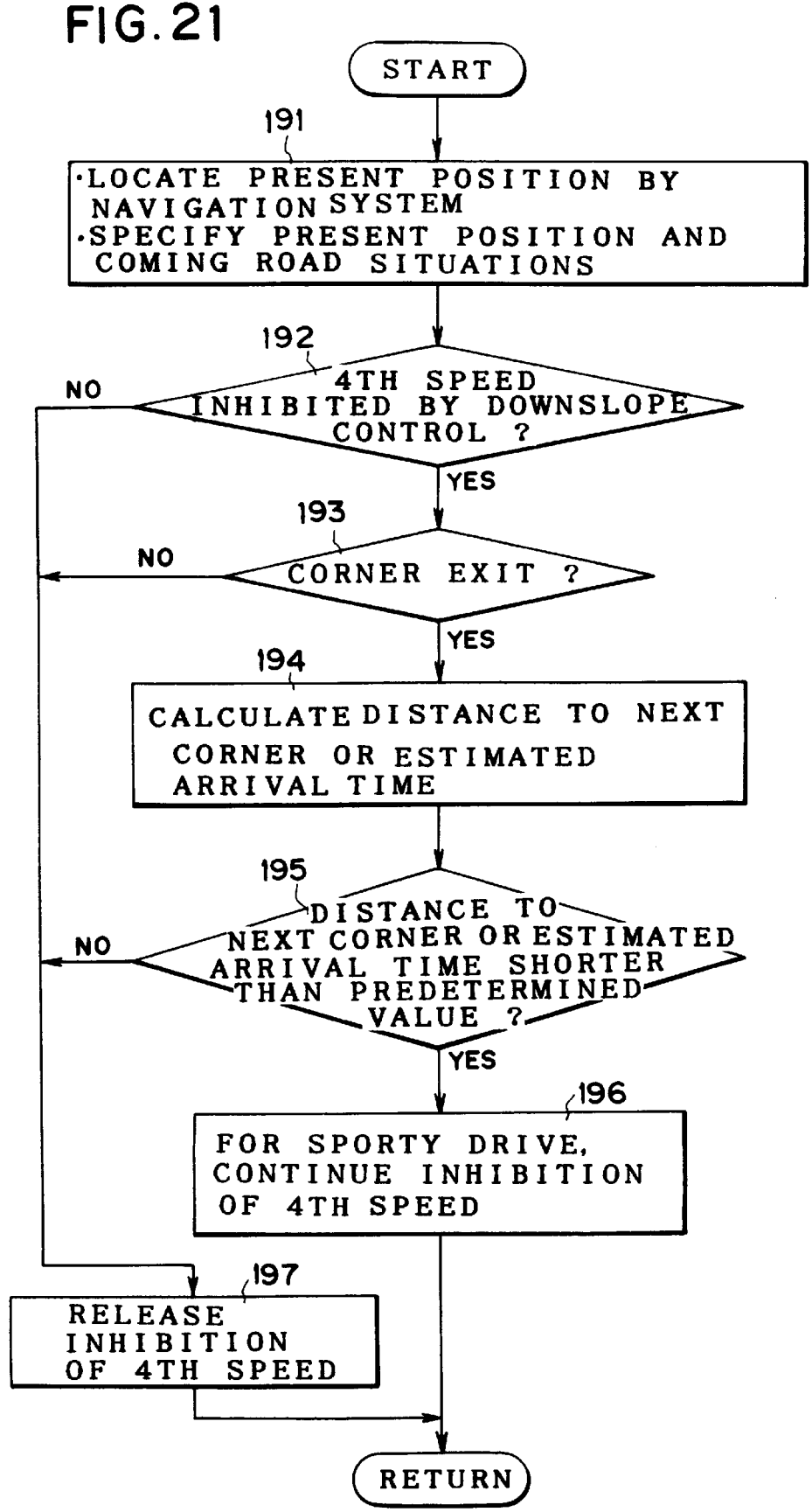
FIG. 21 is a flow chart showing an example of the control to be executed by the control system of the present invention.

FIG. 21 shows a control example for the case in which a corner is in place of the aforementioned upslope/downslope for the road situations required for a special control inhibiting the 4th speed. In FIG. 21, the location of the present position and the specification of the road situations ahead of the present position are executed (at Step 191) as at Step 61 of FIG. 8. If a downslope is detected in this case, the shift is executed by a shift pattern for setting a higher gear ratio easily, i.e., a shift pattern for setting a lower gear stage easily. If a corner is additionally detected, on the other hand, the shift is controlled by a shift pattern for setting a gear stage on a lower speed side more easily.

Next, it is decided (at Step 192) whether or not the 4th speed is inhibited by the downslope control. If this answer of Step 192 is "YES", it is decided (at Step 193) whether or not a corner exit is approaching. This decision can be made by the navigation system 20.

If the answer of Step 193 is "YES", the running distance to or the estimated arrival time at a next corner is calculated (at Step 194), and it is decided (at Step 195) whether or not the calculation result is less than a predetermined value stored in advance. If the answer of Step 195 is "YES", the corner is so short that the vehicle passes it for a short time and advances into the next corner. Even if the corner is once passed, the inhibition control of the 4th speed, if so, is continued (at Step 196). Incidentally, this continuation of the inhibition control of the 4th speed may be executed only if the driving tendency is sporty.

If the answer of Step 192, Step 193 or Step 195 is "NO", on the other hand, the inhibition of the 4th speed is released to execute an upslope on the basis of the running state.

As a result, the aforementioned Step 191 corresponds to road data detecting means in claim 8; Step 195 corresponds to straight road running detecting means; Steps 196 and 197 correspond to shift pattern control means; and Step 196 corresponds to means for setting a shift pattern for an intermediate straight road.

Thus, according to the control example of FIG. 21, if the distance between corners is long, the inhibition of the 4th speed is released to make an upshift possible. As a result, the engine RPM can be lowered to improve the quietness and the fuel economy. If the corners are close to each other, on the contrary, the inhibition of the 4th speed in the downslope control is continued to prevent the sequential shifts at the termination of corners, that is, the hunting and the busy shifting. Moreover, the driving force, as required at the next corner, can be retained to improve the drivability.

The road data can also be achieved either by the navigation system 20, as described hereinbefore, or from the actual running state, as described with reference to FIG. 14. As a result, while both the shift controls, as based upon the data achieved by the navigation system 20 and upon the actual run, are being executed, either of them is adopted according to the difference between the gear stages decided by the individual controls.

Figure 22:
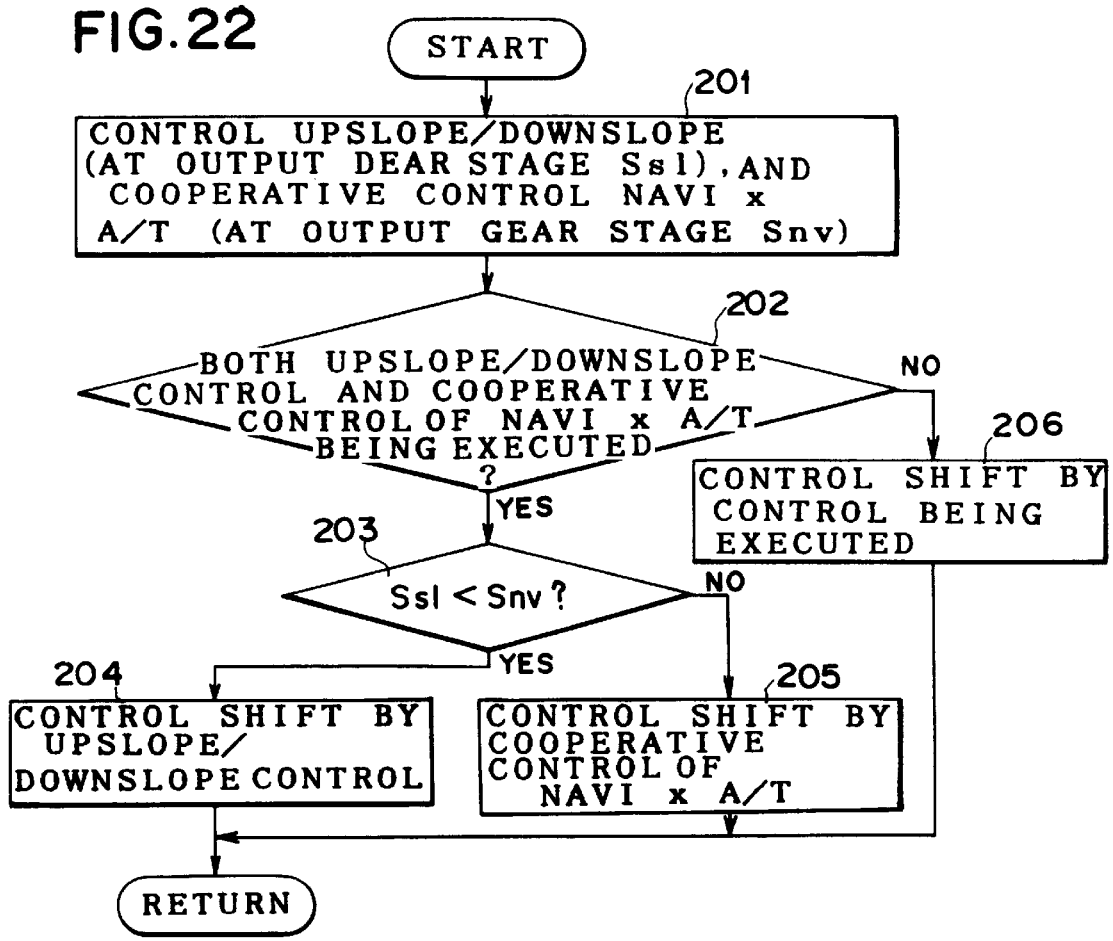
FIG. 22 is a flow chart showing an example of the control to be executed by the control system of the present invention.

FIG. 22 shows an example of the control. The upslope/downslope control is executed on the basis of the running state such as the actual acceleration, and the shift control of the automatic transmission 2 is executed (at Step 201) on the basis of the road data achieved by the navigation system 20. The latter control is a cooperative control between the navigation system 20 and the automatic transmission 2.

It is decided at Step 202 whether or not both the controls are being executed. If this answer of Step 202 is "YES", it is decided (at Step 203) whether or not a gear stage Ssl by the upslope/downslope control is at a lower speed than the gear stage Snv, as decided by the cooperative control between the navigation system 20 and the automatic transmission 2.

If this answer of Step 203 is "YES", the shift control by the upslope/downslope control is executed. Specifically, the upslope/downslope is detected on the actual running state so that a shift, as based on a shift pattern for accordingly easily setting a gear stage on a lower speed side, is executed (at Step 204). On the contrary, if the answer of Step 203 is "NO", that is, if the gear stages by the two controls are identical or if the gear stage by the shift control by the navigation system 20 is on a lower speed side, the shift control by the cooperative control between the navigation system 20 and the automatic transmission 2 is executed (at Step 205). Incidentally, if the answer of Step 202 is "NO", the shift control being executed at that instant is executed as it is (at Step 206). Thanks to this control, the gear stage on a lower speed side is preferentially selected so that the running can be effected with an excellent power performance. As a result, the aforementioned Step 203 corresponds to comparison means in claim 10, and Steps 204 and 205 correspond to shift instructing means.

Figure 23:
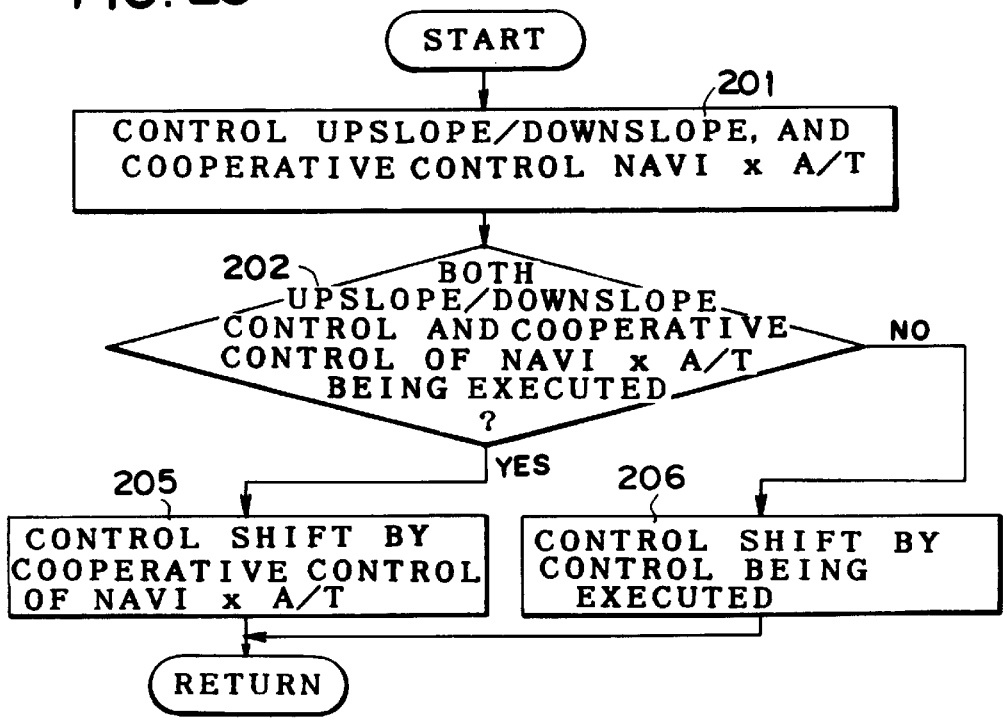
FIG. 23 is a flow chart showing an example of the control to be executed by the control system of the present invention.

Incidentally, while both the shift control for determining the gear stage by the actual running state and the road data obtained by the running and the cooperative control of the navigation system 20 and the automatic transmission 2 are being executed, it is arbitrary to additionally select either of the shift controls simply. FIG. 23 shows this example, in which if the aforementioned answer of Step 202 of FIG. 22 is "YES", the routine instantly advances to Step 205 to execute the shift control by the cooperative control of the navigation system 20 and the automatic transmission 2. If the answer of Step 202 is "NO", on the contrary, the routine advances to Step 206, at which the shift control being executed at that instant is continued.

According to this control shown in FIG. 23, therefore, the gear stage is determined on the basis of the road data obtained by the navigation system 20. Specifically, the gear stage is set according to the road situations ahead of the route to be followed, so that the delay in the shift control is avoided to improve the drivability.

Here will be described another example of the shift control which can be executed by the control system of the present invention. The aforementioned navigation system 20 can be stored in advance with data other than those such as the slope and curve of a road or a discrimination between an expressway or an ordinary way and can also be supplied from the outside by a communication system. The control, as shown in FIG. 24, is exemplified by the shift control which is based on such various road data.

Figure 24:
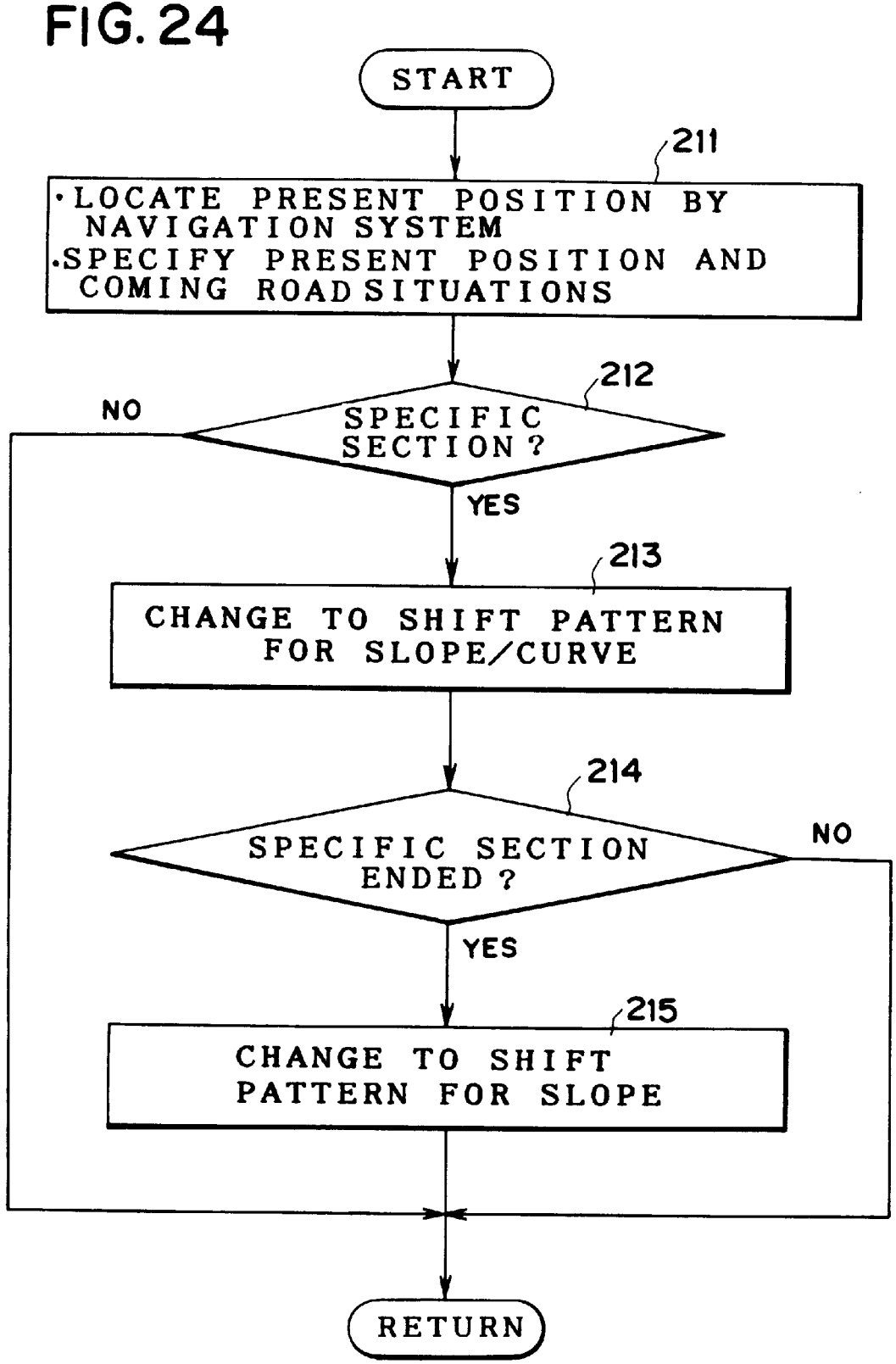
FIG. 24 is a flow chart showing an example of the control to be executed by the control system of the present invention.

In FIG. 24, control operations similar to those of Step 61 of FIG. 8 are executed at Step 211. On the basis of the road data by the navigation system 20, moreover, it is decided (at Step 212) whether or not the route to be followed by the vehicle contains a specific area such as the entrance/exit of an expressway, a junction of the expressway, a mountainous region, an unpaved road a farm road, a forestry road, a riverbed road or a gravel road. If the answer of Step 212 is "YES", the shift pattern is changed (at Step 213) to one for the slope/curve, which is liable to use a gear stage on a lower speed side than that of the slope shift pattern.

Next, it is decided (at Step 214) whether or not a specific section terminates. If the answer of Step 214 is "YES", the shift pattern for the slope/curve is changed to one for the slope (at Step 215), and the control routine is then returned. If the answer of Step 212 or Step 214 is "NO", on the other hand, the routine is instantly returned. Incidentally, this control example can be applied to either the upslope or the downslope.

Thus, according to the control example of FIG. 24, the necessary engine braking force or ascending force can be achieved as in the ordinary upslope/downslope control. Since the shift patterns to be set in a specific section or in another are different, moreover, a sufficient driving force or a just enough engine braking force can be achieved when the vehicle runs in the specific section, but the engine RPM can be lowered to improve the quietness and the fuel economy when the vehicle runs in an area other than the specific section.

Figure 25:
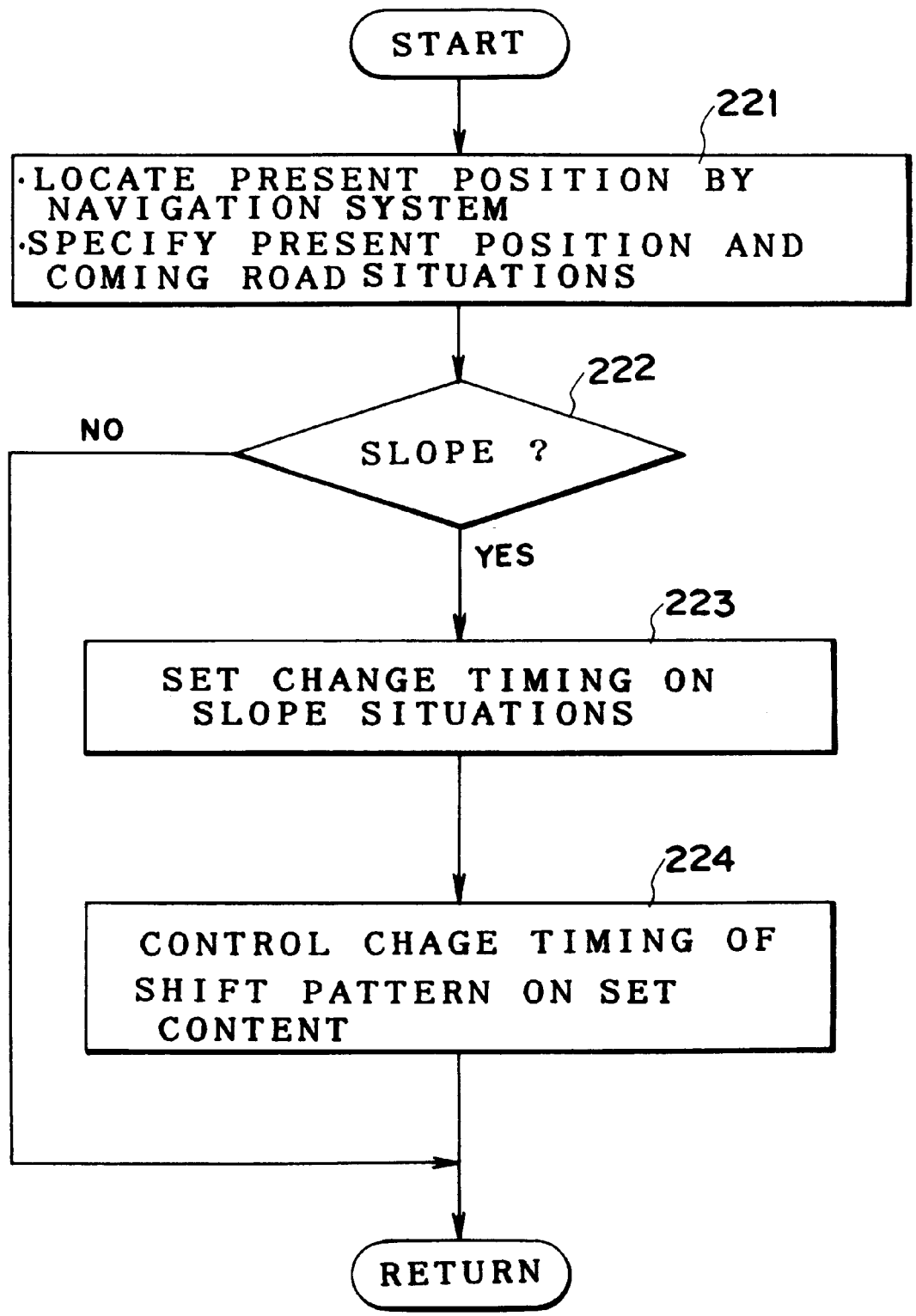
FIG. 25 is a flow chart showing an example of the control to be executed by the control system of the present invention.

FIG. 25 shows a control example for setting the timing for changing the shift pattern. Specifically, at Step 221, control operations similar to those of Step 61 of FIG. 8 are executed, and the automatic transmission 2 is controlled by the basic shift pattern. It is then decided (at Step 222) whether or not a slope is in the route to be followed. If the answer of Step 222 is "YES", there are set the timings for changing the basic shift pattern to the slope shift pattern and vice versa on the basis of the slope situations, as detected by the navigation system 20, i.e., the gradient of the slope. Even in a series of slopes, the section, in which the slope gradient is larger than a predetermined value stored in advance in the navigation system 20, is controlled by the slope shift pattern, and the section having a smaller gradient than a predetermined value is controlled by the basic shift pattern.

After this, (at Step 224) when the vehicle runs on the entrance side of a slope, the basic shift pattern is changed to the slope one on the basis of the timing which is set at Step 223, whereas when the vehicle runs on the exit side of a slope, the slope shift pattern is changed to the basic one on the basis of the timing set at Step 223. After this, the control routine is returned. If the answer of Step 222 is "NO", on the contrary, the routine is returned. Incidentally, this control example can be applied to either an upslope or a downslope.

Thus, according to the control example of FIG. 25, there are divided according to the gradient of a slope a running section to be controlled by the slope shift pattern and a running section to be controlled by the basic shift pattern. As a result, when the vehicle ascends or descends a slope having a relatively small gradient, the engine RPM is lowered to improve the quietness and the fuel economy. When the vehicle ascends or descends a slope having a relatively large gradient, on the other hand, a sufficient driving force or engine braking force is easily achieved to improve the drivability independently of the magnitude of the gradient.

Figure 26:
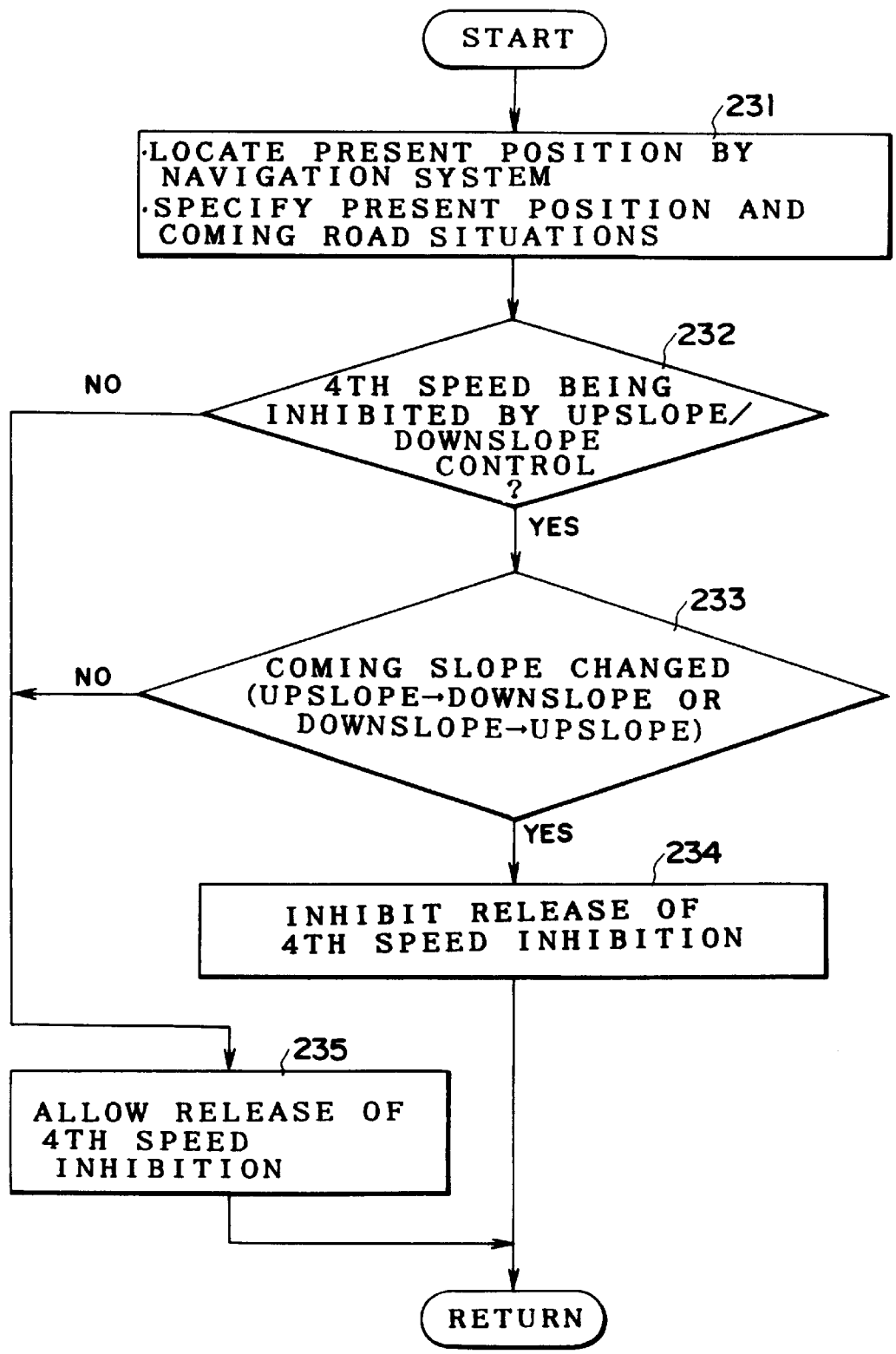
FIG. 26 is a flow chart showing an example of the control to be executed by the control system of the present invention.

FIG. 26 shows a control example of the case in which a change in the slope of a coming road is detected. In FIG. 26, control operations similar to those of Step 61 of FIG. 8 are executed at Step 231. When a slope is detected at this Step 231, the basic shift pattern is changed to the slope shift pattern. This slope shift pattern has a control content in which a gear stage on a lower speed side is liable to use than the basic shift pattern, such as a control content in which the 4th speed is inhibited.

Next, the present position is located by the navigation system 20, and it is decided (at Step 232) whether or not the vehicle is ascending or descending a slope with the 4th speed being inhibited. If the answer of Step 232 is "YES", it is decided (at Step 233) whether or not a change is in the gradient direction of a slope in front, such as a change from an upslope to a downslope or a change from a downslope to an upslope. If the answer of Step 233 is "YES", the slope shift pattern is retained as it is, and the control for inhibiting the 4th speed is continued (at Step 234). After this, the control routine is returned.

If the answer of Step 232 or Step 233 is "NO", on the contrary, the release of inhibition of the 4th speed is allowed (at Step 235), and the control routine is returned. In other words, the 4th speed can be set.

Thus, according to the control example of FIG. 26, if there is a change in the gradient direction of the slope, the control is executed by the slope shift pattern so that the driving force and engine braking force necessary for ascending and descending the slope are retained to improve the drivability. For a slope having no direction change in the gradient, on the other hand, the control is executed by the basis shift pattern so that the engine RPM can be lowered to improve the quietness and the fuel economy.

Figure 27:
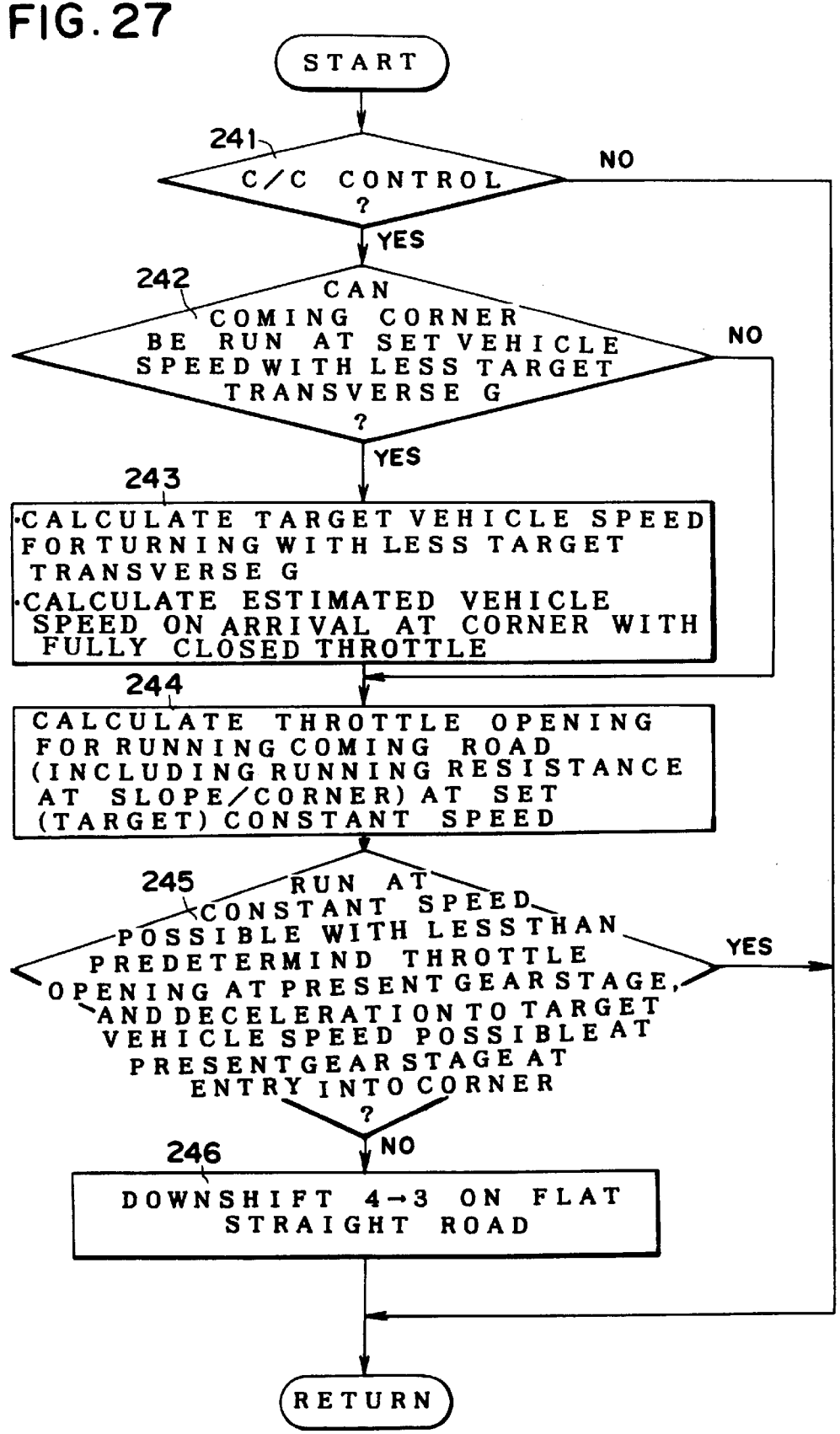
FIG. 27 is a flow chart showing an example of the control to be executed by the control system of the present invention.

The control system of the present invention can perform controls in cooperation with a cruise control system for keeping a preset vehicle speed. This cruise control system sets the vehicle speed, when the switch is operated while the vehicle is running, so that the engine electronic control unit 10 controls the opening of the electronic throttle valve 7 so as to keep the vehicle speed. This control is effected by detecting the actual vehicle speed and by controlling the throttle opening to eliminate the difference from the set vehicle speed, and it may be delayed. If the running resistance is high at a corner, for example, the opening of the electronic throttle valve 7 is increased after the vehicle speed goes down, or the downshift of the automatic transmission 2 is instructed. In the case of a corner on a downslope, alternatively, the vehicle speed exceeds the preset value so that the vehicle is decelerated after the transverse acceleration (or transverse G) has considerably risen. According to the navigation system 20, on the contrary, the coming road situations can be detected so that the vehicle speed by the cruise control can be changed according to the road situations, as detected by the navigation system 20, to improve the drivability. An example is shown in FIG. 27, in which it is decided at first at Step 241 whether or not the vehicle is under a cruise control (C/C control). If this answer of Step 241 is "NO", the control is skipped out from this routine. If the vehicle is under the cruise control, on the other hand, the routine advances to Step 242, at which it is decided whether or not the travers acceleration (transverse G) is less than a target valueother hand, the routine advances to Step 242, a when the vehicle runs at the preset speed around the coming corner.

If the excess of the transverse G over the target value in the case of running the coming corner at a set vehicle speed is decided so that the answer of Step 242 is "NO", the target vehicle speed for turning with less than the target transverse G is calculated, and an estimated vehicle speed upon arrival at the coming corner with the throttle opening being fully closed is calculated (at Step 243).

Moreover, the throttle opening for cruising the coming road at the target vehicle speed is calculated (at Step 244). In this case, the slope of the coming road and the running resistance at the corner are also considered for calculating the throttle opening. When a cruising run is executed with a predetermined throttle opening or less while keeping the present gear stage, it is decided (at Step 245) whether or not the target vehicle speed can be lowered to that of Step 243 and whether or not the vehicle speed can be lowered to the aforementioned target value by the run having the throttle opening fully closed. If this answer of Step 245 is "YES", the control is skipped out from this routine. After this, the cruise control is continued as it is. If the answer of Step 245 is "NO", on the contrary, a downshift from the 4th speed to the 3rd speed is executed on a flat straight road just before the corner. Incidentally, if the answer of Step 242 is "YES", the routine instantly advances to Step 244.

According to the aforementioned control shown in FIG. 27, therefore, a shift is executed before a corner is entered, so that the driving force during the cornering can be prevented from changing to improve the behavior stability of the vehicle thereby to improve the drivability. If the control shown in FIG. 27 is effected during the ascending in the power ON state, the downshift during the ascending can be prevented to eliminate a temporary drop in the torque, as might otherwise accompany the shift, and a feel of shortage in the driving force, as might otherwise be caused by the drop. Moreover, if the control shown in FIG. 27 is executed during a descending while effecting the engine braking, the temporary drop in the engine braking force, as might otherwise accompany the shift, and the resultant so-called "powerless run" can be prevented to improve the drivability.

Figure 28:
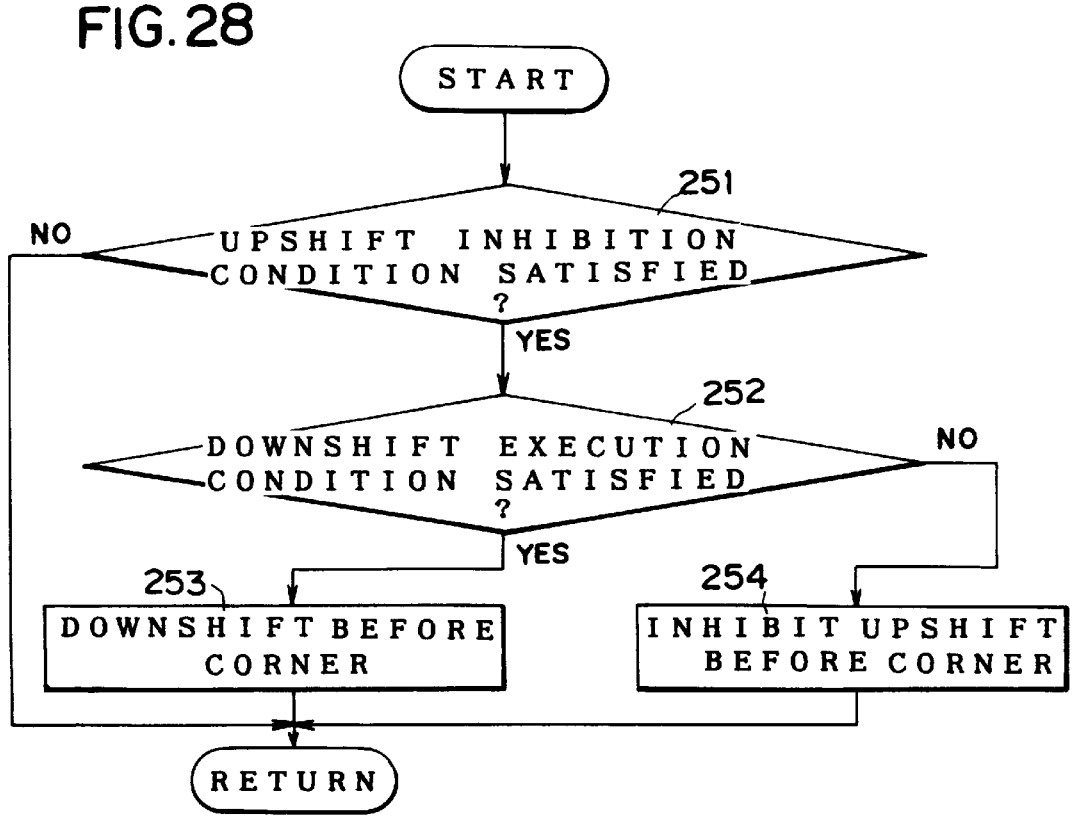
FIG. 28 is a flow chart showing an example of the control to be executed by the control system of the present invention.

Incidentally, here will be described a control example for preventing the busy shifting when the vehicle is running toward a corner. In FIG. 28, at first, it is decided at Step 251 whether or not the condition for inhibiting an upshift is satisfied. This is a step for deciding whether or not a condition similar to that for executing the upslope/downslope control is satisfied, and this decision is made on whether or not the condition for inhibiting the 4th speed, for example, is satisfied on the basis on the actual running state or the road data obtained from the navigation system 20. If this answer of Step 251 is "NO", the control is skipped out from this routine. If the answer is "YES", on the contrary, it is decided (at Step 252) whether or not the downshift executing condition is satisfied.

This downshift executing condition is exemplified by the facts that neither over-revolution nor over run of the engine 1 occurs and that an additional engine braking force or ascending force is necessary. If this answer of Step 252 is "YES", a downshift before entering a corner is executed (at Step 253). If the answer of Step 252 is "NO", on the contrary, only the condition for inhibiting the upshift is satisfied, as decided at Step 251, the inhibition of the upshift before entrance into the corner is executed (at Step 254).

According to the control shown in FIG. 28, therefore, no upshift is executed before entrance into the corner so that a downshift occurs by itself even if it is to be executed for turning the corner. In other words, no upshift occurs just before the downshift so that the busy shifting or the hunting is prevented to improve the drivability.

Figure 29:
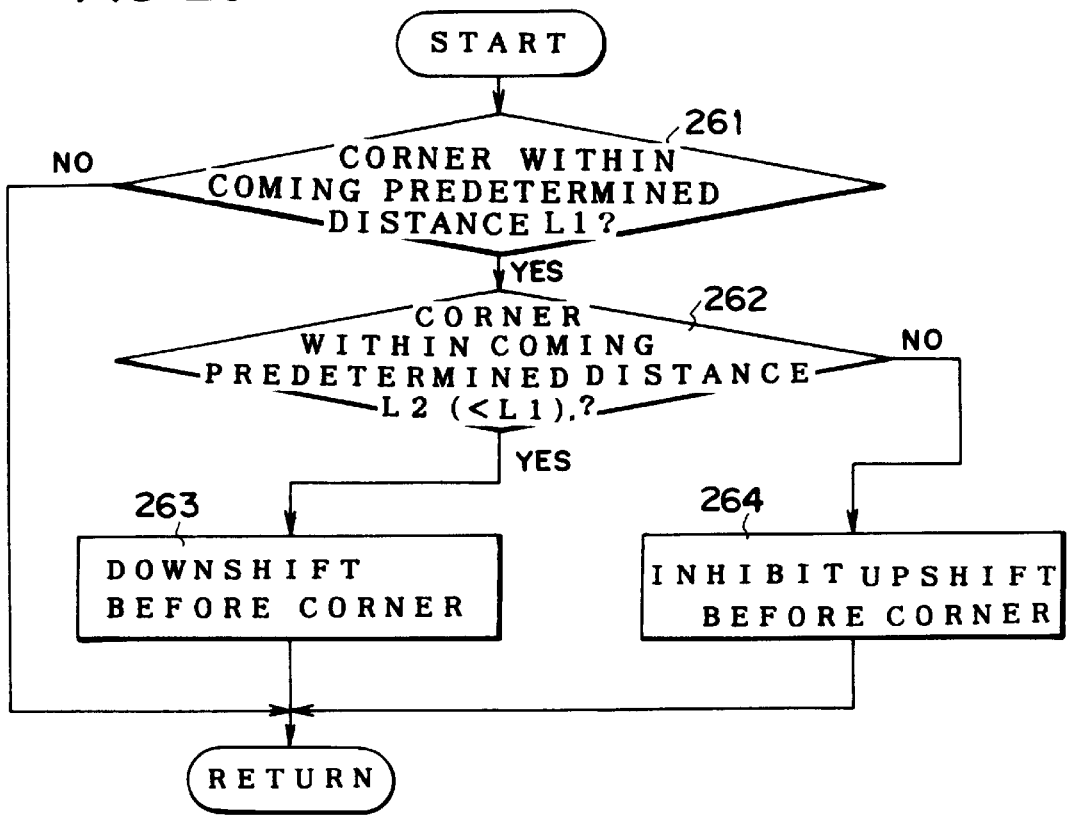
FIG. 29 is a flow chart showing an example of the control to be executed by the control system of the present invention.

In the control shown in FIG. 29, the distance to a corner is used as a parameter. Specifically, it is decided at Step 261 whether or not a corner is within a predetermined distance L1 ahead of the vehicle. If this answer of Step 261 is "NO", the control is skipped out from this routine. If "YES", on the contrary, it is decided (at Step 262) whether or not a corner is within a predetermined distance L2 shorter than the aforementioned predetermined distance L1.

If this answer of Step 262 is "YES", a downshift before the corner is executed (at Step 263). If the answer of Step 262 is "NO", on the contrary, the inhibition of an upshift before the corner is executed (at Step 264).

Figure 30:
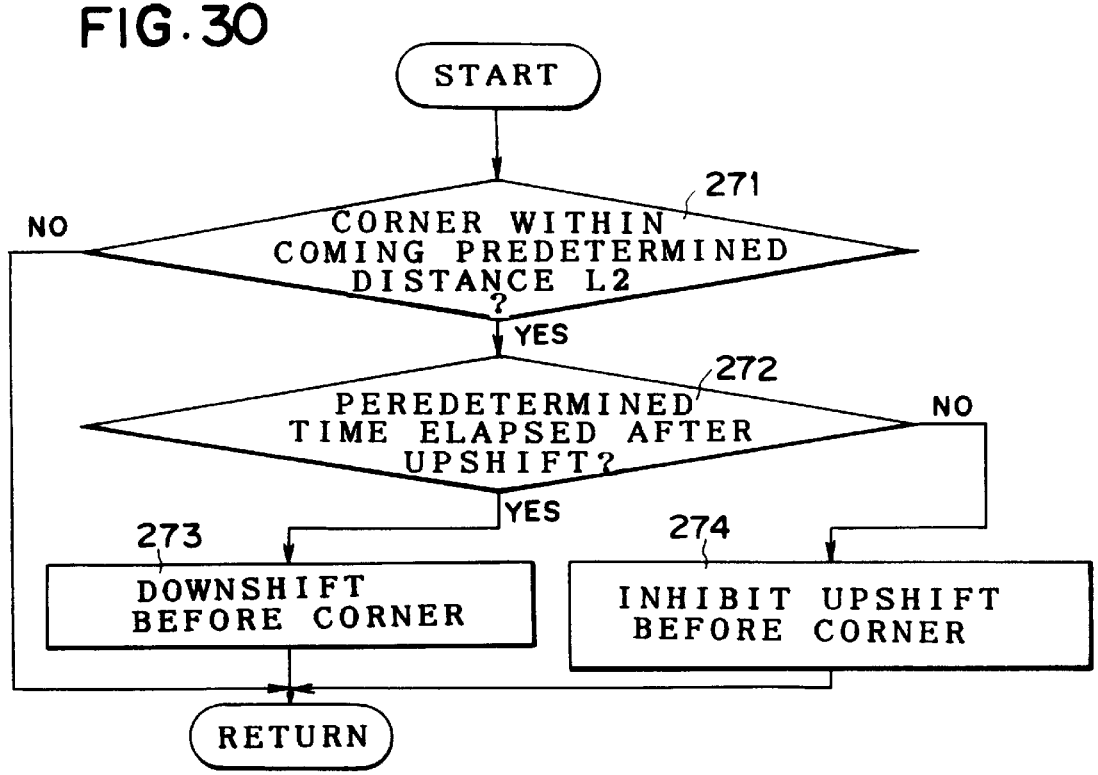
FIG. 30 is a flow chart showing an example of the control to be executed by the control system of the present invention.

Moreover, FIG. 30 shows a control example in which a lapse time after a shift is used as a parameter. At first Step 271, it is decided whether or not a corner is within the predetermined forward distance L2. If this answer of Step 271 is "NO", the control is skipped out from this routine. If "YES", on the contrary, it is decided (at Step 272) whether or not the lapse time after an upshift exceeds a predetermined time.

If the answer of Step 272 is "YES", a downshift just before a corner is executed (at Step 273). If the answer of Step 272 is "NO", on the contrary, the inhibition of an upshift just before the corner is executed (at Step 274).

If the control of Step 273 or Step 274 is executed, therefore, an upshift just before the corner is inhibited when a downshift is to be executed for turning the corner, so that the downshift is prevented just after the upshift. Specifically, according to these controls, the busy shifting or the hunting is prevented to improve the drivability.

Here will be described a control example at a corner having a low coefficient ($\mu$) of friction of the road surface. At first in FIG. 31, it is decided (at Step 281) whether or not the vehicle is running in a cold district. Here, this cold district is a region, in which the friction coefficient of the road surface is lowered by the snowfall, and is exemplified by a road near a specific mountain or a specific district, as stored in advance as the road data of the navigation system 20. If this answer of Step 281 is "YES", it is decided (at Step 282) whether or not it is in a specific season such as winter. At this Step 282, it is decided on the basis of the calendar data stored in the navigation system 20 whether or not it is a snowing season or a snow lying season in the aforementioned cold district.

If this answer of Step 282 is "YES", it is decided (at Step 283) whether or not the decision of a low-$\mu$ road in the cold district has been made in the season to which the present time belongs. This decision can be made on the basis of the data which are obtained when the vehicle ran just before in this cold district, and by acquiring the data from the external road data source such as the VICS. Moreover, the decision can be made on the basis of the actual running state. In this case, the decision can be made by deciding the road surface friction coefficient by not only the VSC system but also a system such as ABS 50, TRC 60 or T-ECU 13 on the basis of the wheel speed, the G sensor or the RPM or the driving force of a predetermined rotary member.

If the answer of Step 283 is "YES", moreover, the downshift control just before a corner on a low-$\mu$ road is executed (at Step 284). At the corner, there is demanded a higher gear ratio for keeping a sufficient driving force against a running resistance. On the low-$\mu$ road, on the other hand, there is demanded a lower driving force for preventing the slip. At this Step 284, therefore, a downshift from the 4th speed to the 2nd speed is changed to a downshift from the 4th speed to the 3rd speed. Alternatively, this downshift is inhibited if the road has a steep downslope or an abnormally small road surface friction coefficient. Incidentally, if the answer of any of Step 281 to Step 283 is "NO", an ordinary downshift before a corner is executed (at Step 285). Specifically, there are executed a downshift for retaining a sufficient driving force against the running resistance at a corner, a downshift for achieving an engine braking force, and a downshift for retaining an accelerability at the time of turning the corner.

Figure 31:
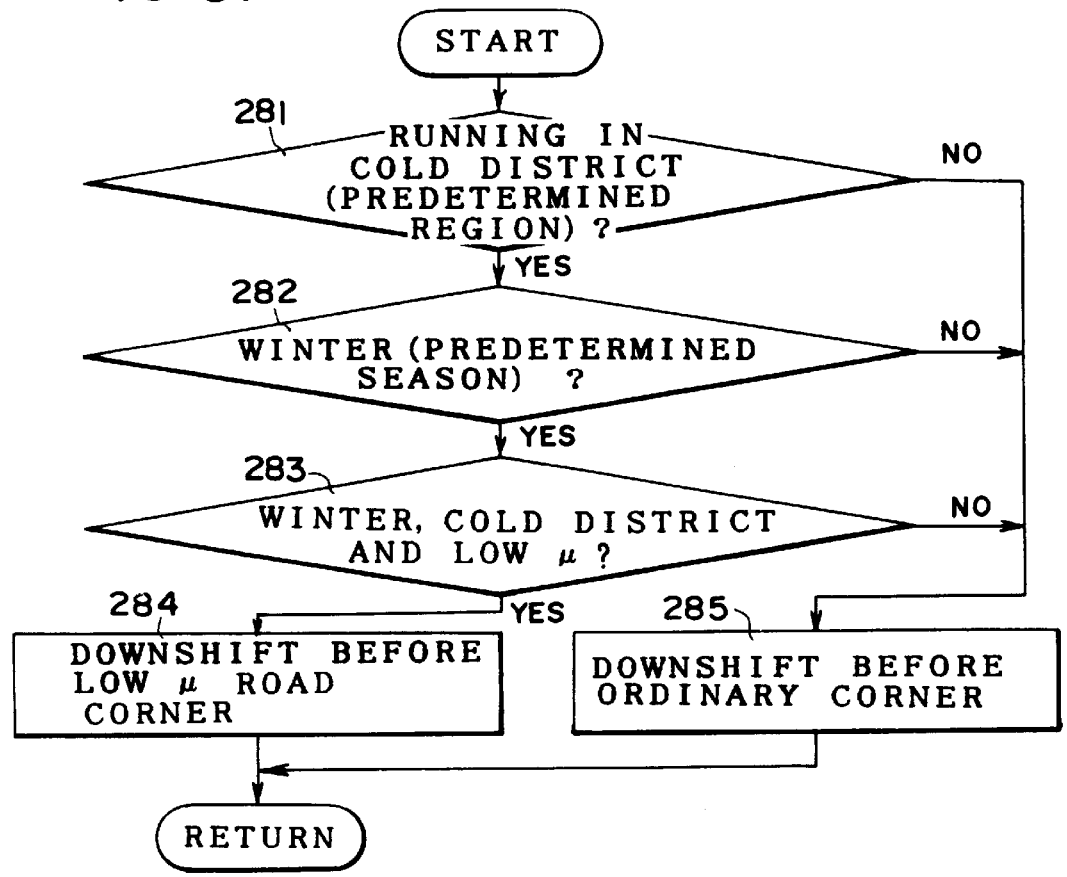
FIG. 31 is a flow chart showing an example of the control to be executed by the control system of the present invention.

According to the control shown in FIG. 31, therefore, when the vehicle is to run at a corner of a road having a low road surface friction coefficient (or low-$\mu$ road), the driving force is suppressed to prevent the slip of the tires so that a stable turn can be effected. In a summer having an increased road surface friction coefficient, on the other hand, the ordinary downshift at a corner can be executed to effect a sufficient driving force or engine braking force to improve the drivability.

As has been described hereinbefore, the cruise control system performs the control to keep the preset vehicle speed. If a device for detecting a vehicle ahead such as a laser radar is connected with the cruise control system, the vehicle can accompany a vehicle ahead while keeping the distance inbetween at a predetermined value. A control example for executing the so-called "inter-vehicle distance control" or "accompany control" and the shift control, as based on the road data obtained from the navigation system 20, together will be described with reference to FIG. 32.

First of all, it is decided at Step 291 whether or not the vehicle is under the cruise control (or C/C) for keeping the distance between vehicles. This decision can be made on the basis of an operation signal of the cruise control system. If this answer is "YES", the distance to a coming corner, a cornering radius R and a target cornering speed are calculated (at Step 292) on the basis of the road data which are obtained by the navigation system 20. Next, a target deceleration is calculated (at Step 293) from the vehicle speed at present and the target cornering speed (or the cornering radius R) at the corner. In this case, the target deceleration may be calculated by using the set vehicle speed in the cruise control in place of the present vehicle speed.

It is decided (at Step 294) whether or not the calculated target deceleration is more than a predetermined value. If this answer of Step 294 is "NO", the calculated target deceleration is less than the predetermined value. In this case, a gear stage capable of achieving the target deceleration is calculated (at Step 295) from the slope to the corner and the driven force of the vehicle with the fully closed throttle opening. In short, the gear ratio for achieving the demanded engine braking force is determined. It is then decided (at Step 296) whether or not the deceleration starting point has been reached. If the arrival at the shift starting point is detected, a downshift to a necessary gear stage is executed according to the aforementioned target deceleration opening of the electronic throttle valve 7 is decreased, and the vehicle is decelerated (at Step 297) by controlling the brake. Here: the shift control is executed by the automatic transmission electronic control unit 13; the electronic throttle valve 7 is controlled by the engine electronic control unit 10; and the brake is can be controlled by the control systems 50, 60 and 70 such as the ABS, TRC or VSC.

Incidentally, if the answer of Step 291 is "NO", the routine advances to Step 298, at which the ordinary control is executed. If the answer of Step 294 is "YES", on the other hand, the calculated target deceleration is high, and the routine advances to Step 298, at which the ordinary control is executed. Alternatively, the control of the distance between vehicles by the cruise control system is interrupted to inform the driver of the interruption. Moreover, if the answer of Step 296 is "NO", the routine advances to Step 298, at which the ordinary control is executed.

Figure 32:
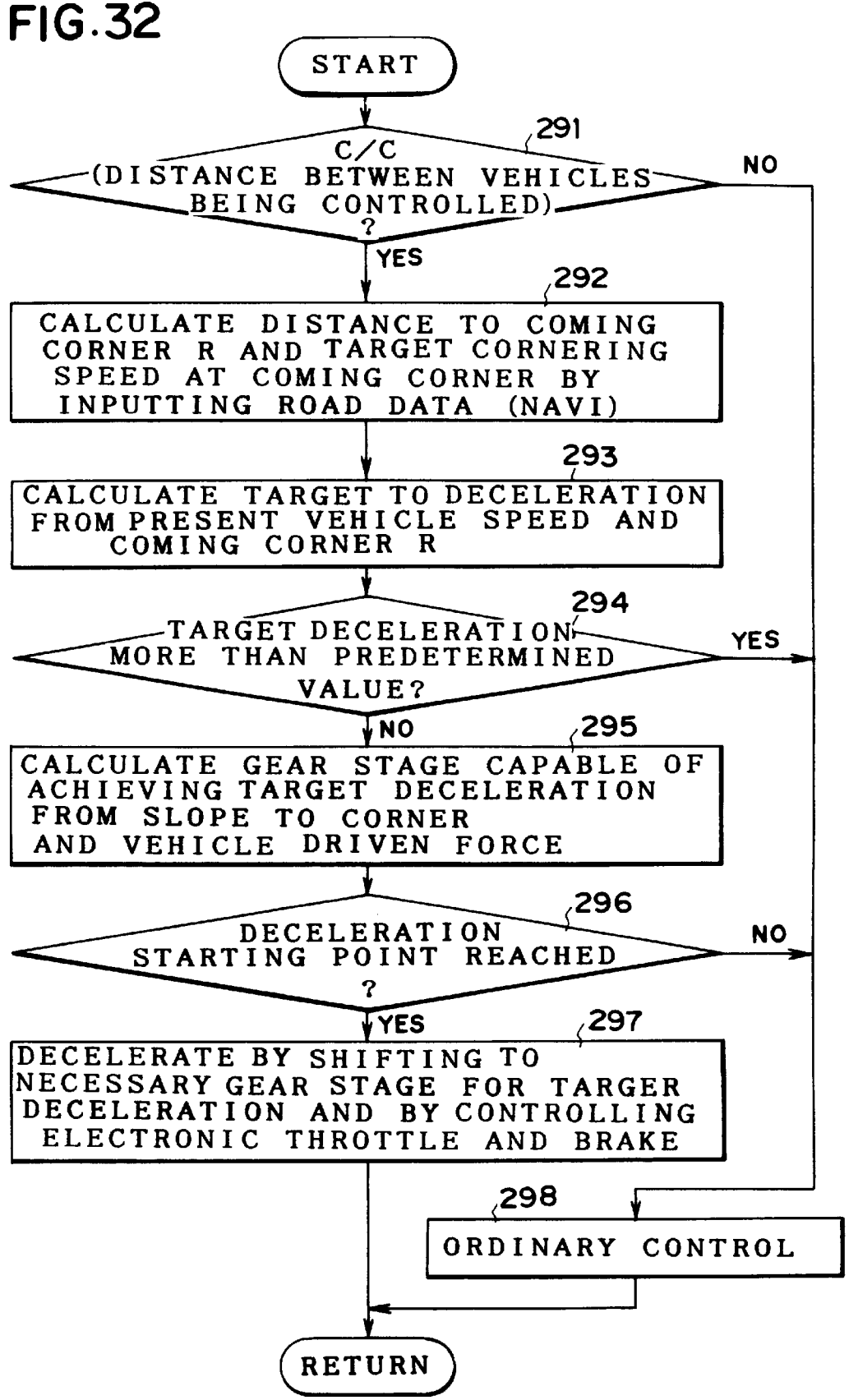
FIG. 32 is a flow chart showing an example of the control to be executed by the control system of the present invention.

According to the control shown in FIG. 32, therefore, even while the control for keeping constant the distance from the preceding vehicle is being executed, the control of the vehicle, as based on the road data, is executed independently of the cruise control system if there is a corner in front, so that the cornering can be smoothly carried out. Incidentally, in the control example shown in FIG. 32, the deceleration is determined so that the vehicle is controlled to that deceleration. At the time of leaving the corner, the vehicle has to be accelerated, and this necessity can be decided on the basis of the road data of the corner and the succeeding road. As a result, prior to resuming the control for keeping constant the distance between vehicles by the cruise control, a transitional acceleration can be calculated to control the vehicle to that acceleration. Thus, the escape from the corner can be smoothed to transfer the control to that for the distance between vehicles.

Figure 33:
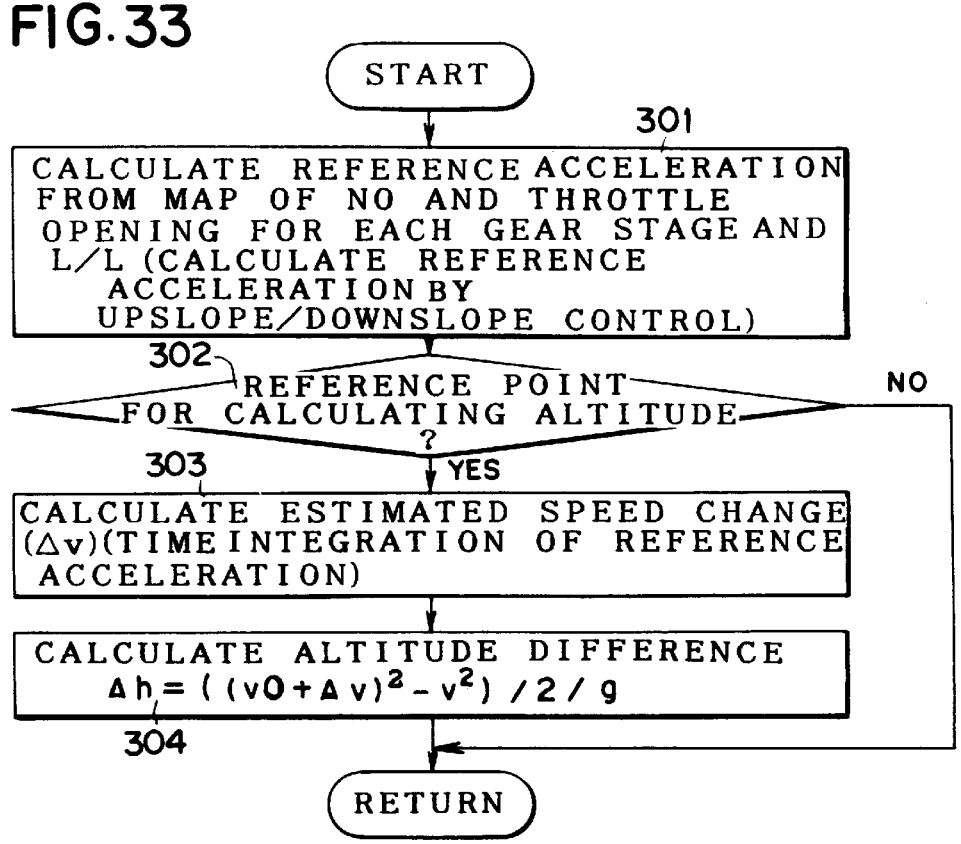
FIG. 33 is a flow chart showing an example of the control to be executed by the control system of the present invention.

Here will be described a calculation of an altitude in accordance with the present invention. FIG. 33 shows a routine for calculating the altitude. At Step 301, the reference acceleration is calculated on the basis of a map in which the output shaft RPM No and the throttle opening for each gear stage and each application/release of the lockup clutch are used as parameters. This control of Step 301 is similar to the aforementioned one of Step 111 of FIG. 14. In short, the reference acceleration by the upslope/downslope control is calculated.

Next, it is decided (at Step 302) whether or not a reference point for calculating the altitude has been passed. This reference point is a point within a predetermined distance before a high-level branching point, if the level of a high-level road such as an urban motorway is to be decided, and a point at a definite level if the altitude is to be simply calculated. Here, the point having a definite level is exemplified by a very coarse altitude point in the navigation system 20 or an OFF point of the ignition switch, as located at an altitude calculated on the basis of the data set by a car dealer.

If the answer of Step 302 is "YES", an estimated speed change ($\Delta v$) from the reference point to the present point is calculated (at Step 303). This calculation can be executed by integrating the reference acceleration. Next, the altitude difference is calculated from the following formula:

$$\Delta h = ((v0 + \Delta v)^2 - v^2)/2/g.$$

Here: $\Delta h$: the altitude difference; $v0$: a vehicle speed at the reference point; $v$: a vehicle speed at present; $\Delta v$: a speed difference between the vehicle speed, which should be reached if the road from the reference point to the present point is flat, and the value $v0$; and $g$: an acceleration of gravity. In short, the altitude difference is calculated on the basis of the change in the kinetic energy. Incidentally, if the answer of Step 302 is "NO", the routine is returned.

According to the control shown in FIG. 33, therefore, the altitude difference can be determined from the map stored in advance and the vehicle speed so that no special sensor is required.

Figure 34:
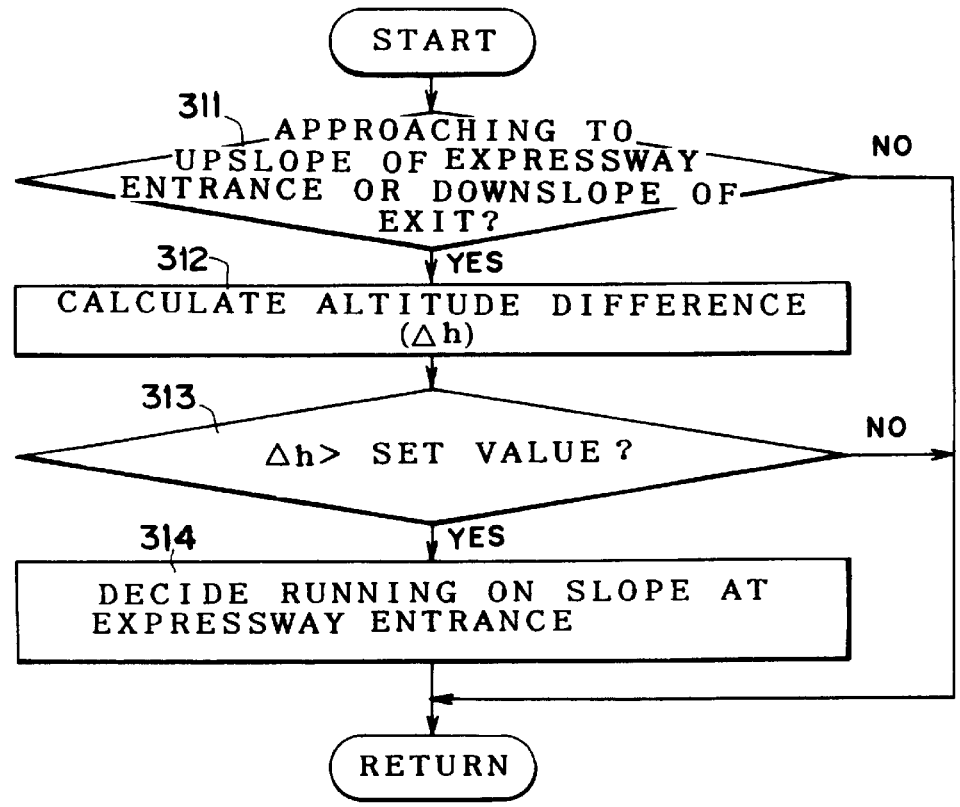
FIG. 34 is a flow chart showing an example of the control to be executed by the control system of the present invention.

Here will be described an example of the control for discriminating the high level road such as of an urban motorway by making use of the altitude difference $\Delta h$ thus determined. First of all, as shown in FIG. 34, it is decided (at Step 311) whether or not the vehicle has approached to the upslope at the entrance or the downslope at the exit of an motorway. This decision can be made on the basis of the road data of the navigation system 20. The control is skipped out from this routine, if the answer of Step 311 is "NO", but the altitude difference $\Delta h$ is calculated (at Step 312) if the answer is "YES". The routine for calculating the altitude difference $\Delta h$ has already been described with reference to FIG. 33.

It is decided (at Step 313) whether or not the altitude difference $\Delta h$, as calculated at Step 312, is more than a preset value. This decision may be replaced by a decision of whether or not the ratio between the altitude difference $\Delta h$ and the high level exceeds a present value. The routine is returned, if the answer of Step 313 is "NO", but it is decided (at Step 314) that the vehicle is running on a slope at the entrance/exit of the motorway, if the answer is "YES". In other words, it can be decided that a sufficient altitude difference prevails from a point near the entrance/exit of the motorway, and the decision is made as at Step 314.

According to this control shown in FIG. 34, not only the road data by the navigation system 20 but also the road data as a result of the actual run can be achieved so that the shift control of the automatic transmission 2, as based on the road data, can be more accurately executed. In other words, the upslope/downslope at the entrance/exit of the high level road can be executed without any delay to improve the acceleration at the time of entering into the motorway or high-level road and the deceleration at the time of leaving the motorway.

Figure 35:
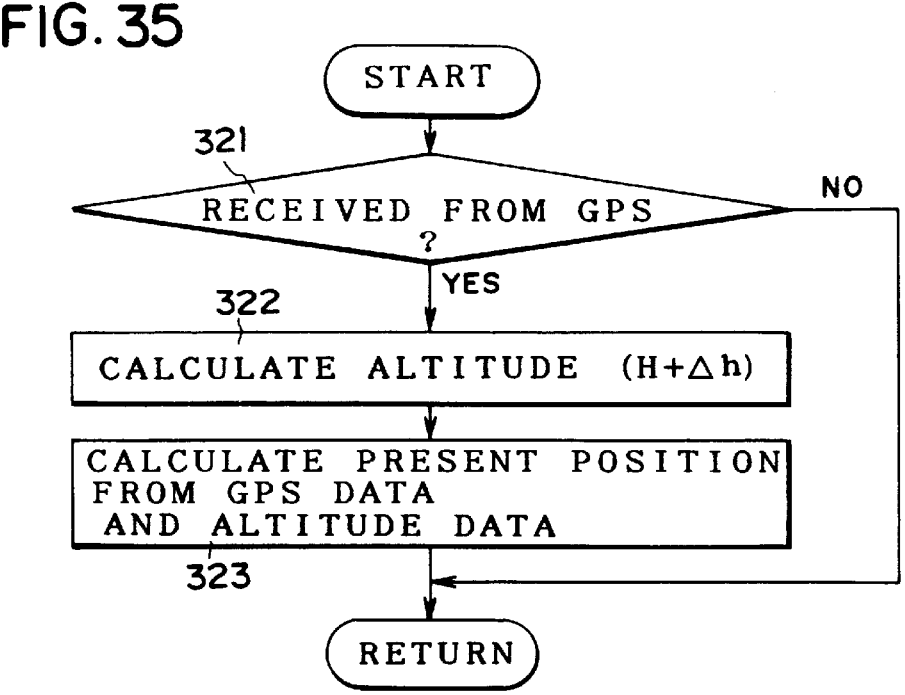
FIG. 35 is a flow chart showing an example of the control to be executed by the control system of the present invention.

FIG. 35 shows a control routine for calculating the altitude of the present position. In FIG. 35, at first, it is decided (at Step 321) whether or not a reception is made from the GPS (Global Positioning System). If this answer of Step 321 is "NO", the control is skipped out from this routine. If the answer of Step 321 is "YES", on the contrary, the altitude is calculated (at Step 322). Specifically, the altitude is calculated by adding the altitude difference $\Delta h$, as calculated in the aforementioned control of FIG. 33, to the altitude h of the reference point. Next, the present position is calculated (at Step 323) from the data of GPS and the altitude data, as calculated at Step 322.

According to the control of FIG. 35, therefore, the information content for calculating the present position increases to improve the calculation accuracy of the present position. By the altitude data thus obtained, moreover, the error of the present position by the navigation system 20 can also be corrected. In this case, the error correction may be made by detecting the point, in which the altitude or slope highly changes, and by comparing the detected point with the present position. Especially in the case of a map matching, the changing point can be detected even on a straight road so that the map matching can be easy and accurate. According to the control of FIG. 35, moreover, even if the receiving state from the GPS is poor or even if the number of receiving satellites is small, the present position is calculated from the data, as based on the actual run result, so that the reliability of the shift control, as based on the navigation system 20 and the road data, is improved better.

Figure 36:
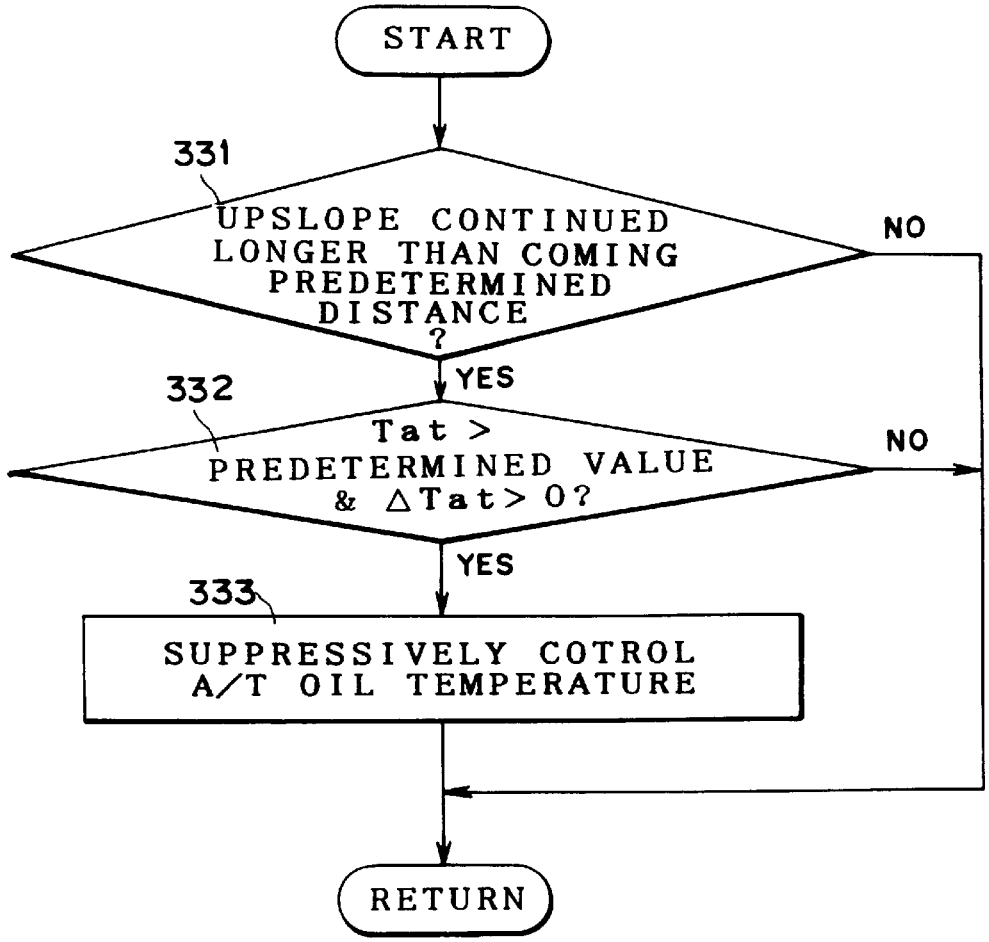
FIG. 36 is a flow chart showing an example of the control to be executed by the control system of the present invention.

Here will be described an example in which the road data obtained by the navigation system 20 are used for controlling the oil temperature of the automatic transmission 2. FIG. 36 shows one example, in which it is decided (at Step 331) on the basis of the road data of the navigation system 20 whether or not an upslope is continued in front longer than a predetermined distance. If this answer of Step 331 is "NO", the control is skipped out from this routine. If the answer is "YES", on the contrary, it is decided (at Step 332) whether or not the oil temperature Tat of the automatic transmission 2 is higher than a predetermined value and has a tendency to rise ($\Delta$Tat>0). The control is skipped out from this routine, if the answer of Step 332 is "NO", but the suppressive control of the oil temperature of the automatic transmission 2 is executed (at Step 333) if the answer is "YES".

This oil temperature suppressing control of Step 333 is specifically exemplified by the control for lowering the engine RPM by changing the shift point to a lower speed side to make it liable to use a lower gear ratio, the control for increasing the circulating oil flow by raising the line pressure of the automatic transmission 2 to raise the charge oil pressure to the torque converter, or the control for reducing the deviation of an oil temperature distribution to damp the influences by a high oil temperature by raising the lubricating oil pressure to increase the lubricating oil flow. Independently of or together with these controls, on the other hand, there may be executed a control for lowering the engine RPM and reducing the input torque to the automatic transmission 2 by reducing the opening of the electronic throttle valve 7. This control of the opening of the electronic throttle valve 7 is effective for the case in which the oil temperature is so further raised that a thermal influence upon the resin members is worried.

According to the control shown in FIG. 36, therefore, when the rise in the oil temperature is worried, the oil temperature suppressing control can be executed before the oil temperature actually rises, so that the control of the oil temperature of the automatic transmission 2 can be more reliable and accurate to improve its reliability.

Figure 37:
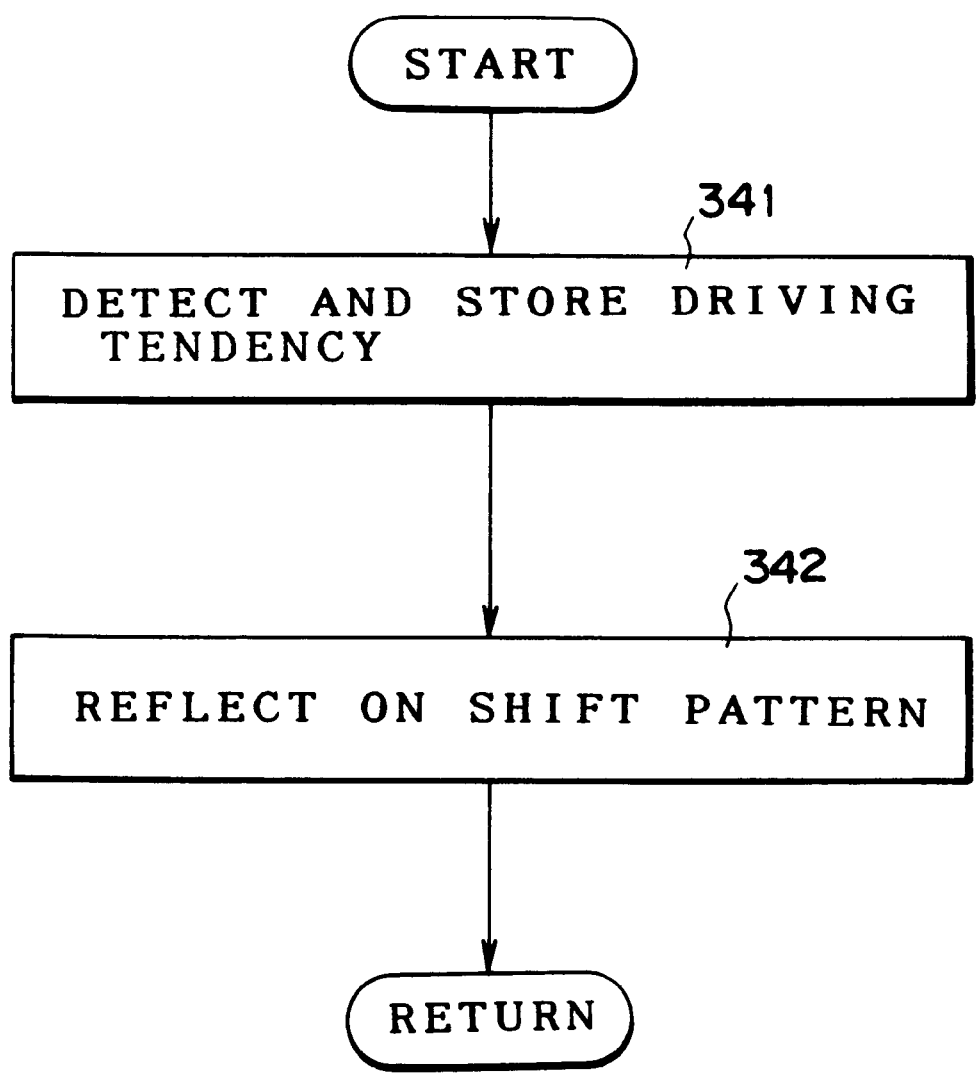
FIG. 37 is a flow chart showing an example of the control to be executed by the control system of the present invention.

Incidentally, for a more comfortable run, the accelerating and braking characteristics of the vehicle are preferred to match the driving tendency of the driver. For this matching, it is preferable to reflect the driving tendency of the driver upon the control for the upslope/downslope, the shift control at a corner or the control on the low-$\mu$ road, as described hereinbefore. For these controls, as shown in FIG. 37, the driving tendency of the driver is detected from the data signals, as obtained from the various sensors, and is stored (at Step 341). Moreover, the stored driving tendency is synthetically judged and evaluated so that it may be reflected on the various shift patterns (at Step 342). Therefore, this Step 341 corresponds to driving tendency judging means in claim 11. Moreover, Step 342 corresponds to shift correction control means. This control shown in FIG. 37 is executed in suitable combination with the aforementioned individual control examples.

As a result, the driving tendency of the driver under the various road situations including a slope, a curved slope, an expressway, a mountainous region or urban areas, such as the driving tendency stressing the driving force or the improvement in the fuel economy, that is, the past driving tendency is reflected on the control content of the shift pattern to be used in the future run so that a more comfortable drive is possible to make a contribution to a safe run.

Figure 38:
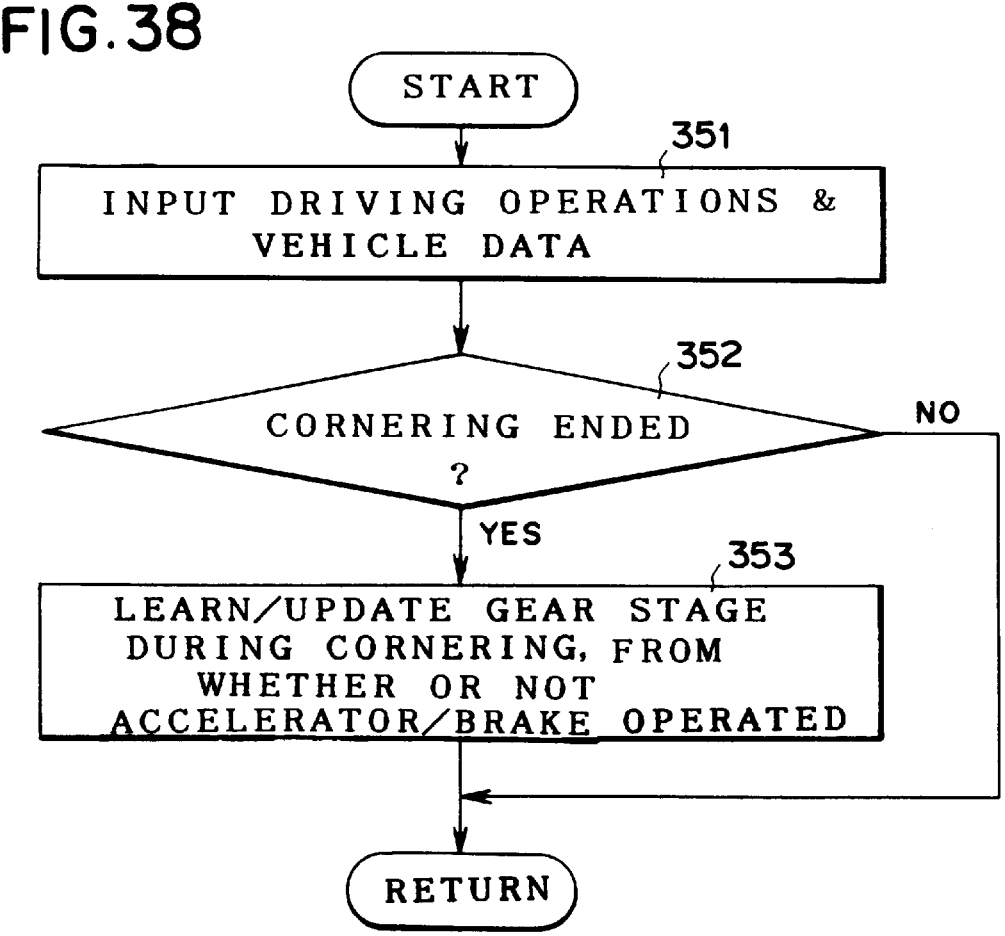
FIG. 38 is a flow chart showing an example of the control to be executed by the control system of the present invention.

Here will be described a specific example for reflecting the driving tendency on the control content. In FIG. 38, first of all, the driving operations and the vehicle data are inputted (at Step 351). Next, it is decided (at Step 352) whether or not the cornering is ended. The control routine is returned, if the answer of Step 352 is "NO", but the gear stage during the cornering is learned/updated independence upon whether or not the accelerator pedal or the brake has been operated (at Step 353), if the answer is "YES".

Specifically, the shift point is changed on the basis of a vehicle speed increase ($\Delta$Va) with the accelerator ON from the vehicle speed at the time of entering a corner and the speed reduction ($\Delta$Vb) with the braking. For example, the turning radius or its correction $\Delta$R54 is corrected on the basis of the following formula:

$$\Delta R54 = \Delta R54 + \gamma \times (\Delta Va - \Delta Vb) \text{ ($\gamma$: a constant)}.$$

Figure 39:
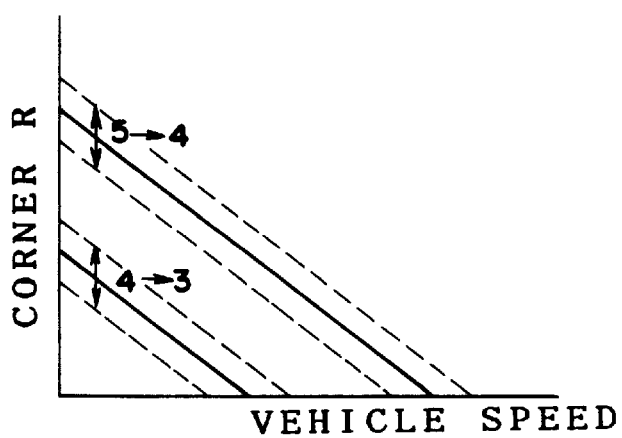
FIG. 39 is a diagram illustrating a map for setting a gear stage during cornering.

On the basis of the map shown in FIG. 39, moreover, the shift point is changed to a higher or lower speed side. Incidentally, broken lines in FIG. 39 plot the upper and lower limit guard values.

As a result, when the accelerator pedal or the brake pedal is depressed after entrance into a corner, the driver feels a shortage of the driving force or braking force during the cornering. By reflecting this shortage upon the correction of the shift point in a predetermined shift pattern, the gear stage during the cornering run matches the intention of the driver so that the drivability is improved.

Figure 40:
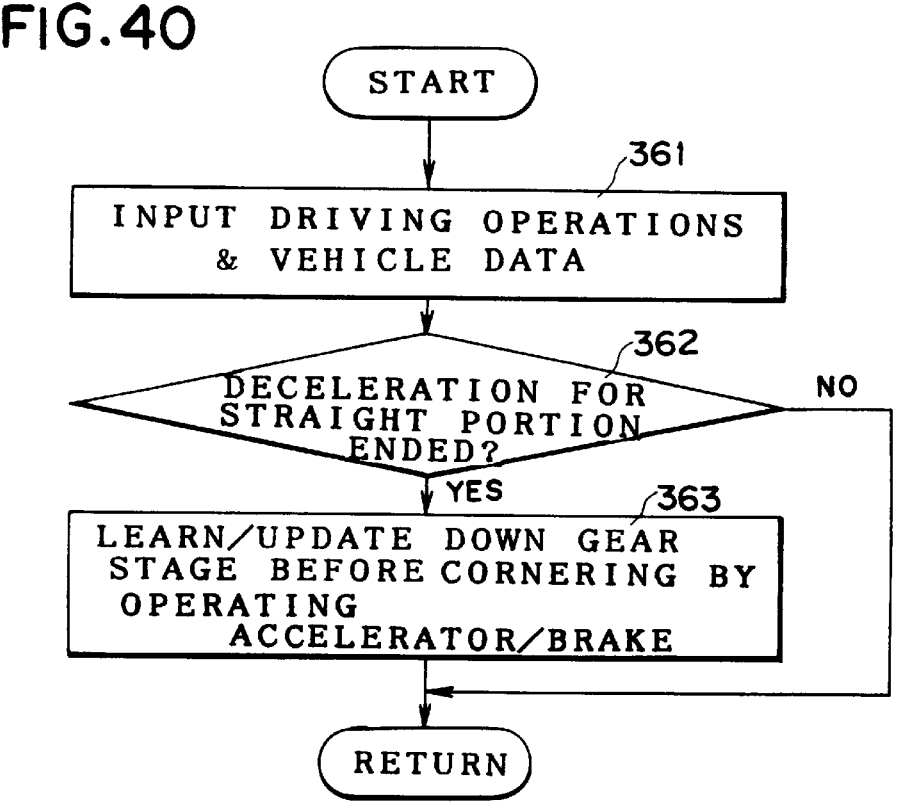
FIG. 40 is a flow chart showing an example of the control to be executed by the control system of the present invention.

FIG. 40 shows an example of the learning control just before a corner. As in the control shown in FIG. 38, first of all, the driving operations and the vehicle data are inputted (at Step 361). It is then decided (at Step 362) whether or not the deceleration on a straight portion is ended. The control routine is returned, if this answer of Step 362 is "NO", and the downshift just before the corner is learned/updated (at Step 363) on the basis of the operating stroke of the accelerator pedal or the brake if the answer is "YES".

Specifically, the shift point is corrected on the basis of the speed increase ($\Delta$Va) with the accelerator ON and the speed decrease ($\Delta$Vb) with the braking after the deceleration at the straight portion is ended and after the downshift before the corner is executed. This correction can be executed like the control, as has been described with reference to FIGS. 38 and 39.

By the control shown in FIG. 40, therefore, the gear stage to be set by the deceleration before entrance into a corner matches the intention of the driver so that the drivability is improved.

Figure 41:
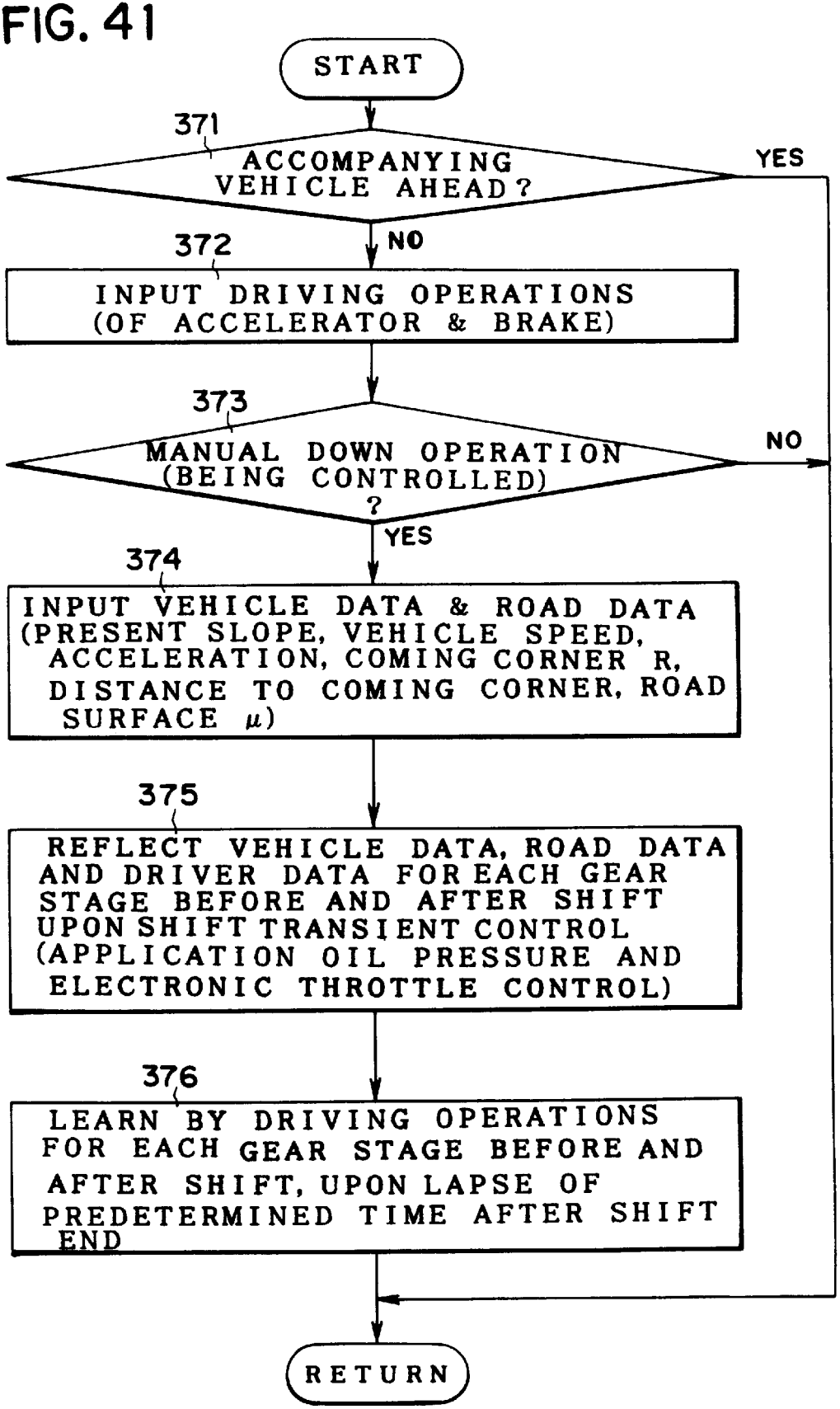
FIG. 41 is a flow chart showing an example of the control to be executed by the control system of the present invention.

Here will be described a learning control of the application pressure and the opening of the electronic throttle valve 7. In FIG. 41, first of all, it is decided (at Step 371) whether or not the vehicle accompanies a vehicle ahead. This is a decision on whether or not the so-called "laser cruise control" is being executed. If this answer of Step 371 is "NO", the driving operations such as the operations of the accelerator or brake are inputted (at Step 372). Then, the manual downshift operation is executed, and it is decided (at Step 373) whether or not the downshift is being controlled. At Step 372, more specifically, the driving operation before the manual downshift operation is stored.

If the answer of Step 373 is "YES", the vehicle data and the road data are inputted and stored (at Step 374). These data are specified by the present gradient, vehicle speed and acceleration, the radius of a coming corner, the distance to coming corner or the road surface friction coefficient. Next, the vehicle data, the road data and the driver data for each gear stage before and after the shift are reflected on the shift transitional control (e.g., the application pressure or the electronic throttle control) (at Step 375). Here will be described the application pressure P, for example, which is set on the basis of the following formula:

$$P=P(v)+k1\cdot(-\delta)+k2\cdot(R0-R)+k3\cdot(L0-L)+Pd.$$

Here: k: a correction coefficient for each gear stage before and after the shift; P(v): an application pressure (or base pressure) according to the vehicle speed V; δ: a gradient; R: the radius of the corner; R0: the radius of the base corner; L: the distance to the next corner; L0: the length of the base straight line; and Pd: a correction oil pressure value for each gear stage before and after the shift, as reflecting the driving tendency. Specifically, the application pressure is raised to the higher level for the higher vehicle speed, the larger downward gradient, the smaller turning radius, and the shorter straight distance. On the other hand, the opening of the electronic throttle valve is likewise corrected so that the engine braking may become effective.

Next, upon lapse of a predetermined time after the shift end, the aforementioned correction oil pressure Pd is learned on the basis of the driving operation after the shift for each gear stage before and after the shift. Specifically, when the accelerator pedal is depressed, it can be decided that the engine braking is excessively strong. As a result, the application pressure is lowered, and the opening of the electronic throttle valve is enlarged. If the braking operation is executed, on the contrary, it can be decided that the engine braking is excessively weak. As a result, the application pressure is raised, and the opening of the electronic throttle valve is reduced.

In the former example, the correction oil pressure is set by Pd=Pd−ΔPd1. In the latter case, on the other hand, the correction oil pressure is increased by Pd=Pd+ΔPd2. Simultaneously with this, the opening of the electronic throttle valve is also set.

Incidentally, the routine advances to Step 376 if the answer of Step 371 is "YES" and if the answer Step 373 is "NO".

Figure 42:
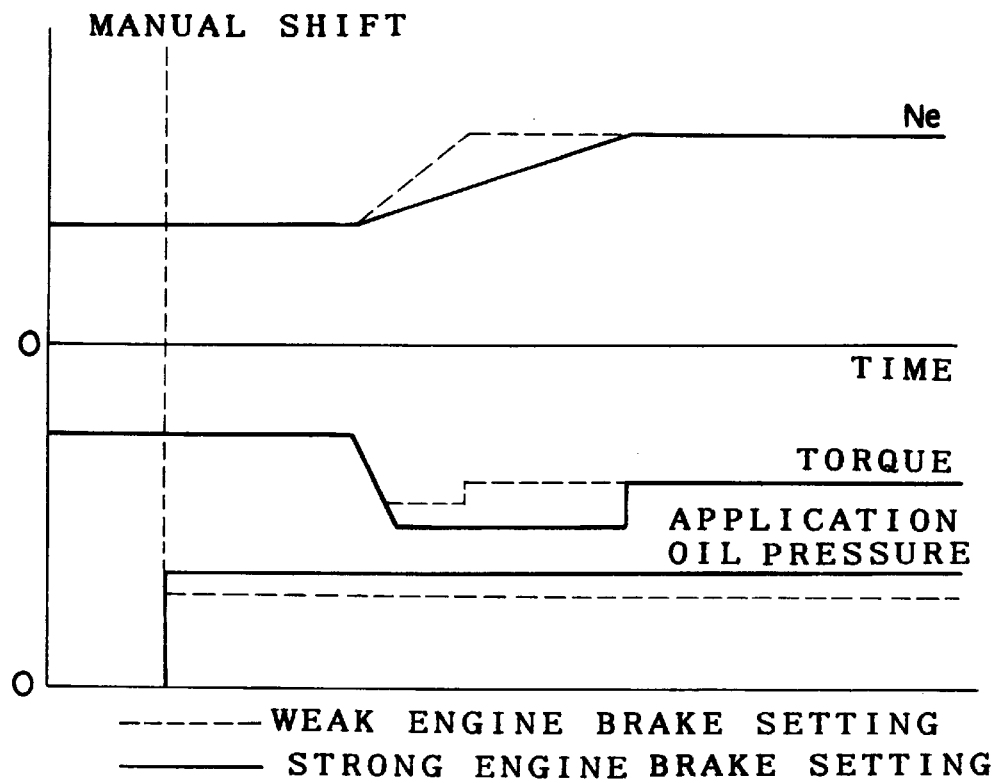
FIG. 42 is a time chart illustrating changes in an engine RPM, an engine torque and an application oil pressure when the application oil pressure and a throttle opening are changed on the basis of a learning control for driving.

In the case of the learning control shown in FIG. 41, the changes in the engine RPM Ne, the engine torque and the application pressure are plotted in FIG. 42. In FIG. 42, solid lines plot the case, in which the engine brake is strengthened, and broken lines plot the case in which the engine brake is weakened.

According to the control shown in FIG. 41, therefore, the application pressure and the opening of the electronic throttle valve during the shifting are corrected on the basis of the road situations and the driver's operations so that the driving tendency is more reflected upon the shift transitional characteristics. As a result, the highly accurate corrections can be achieved, and the shift can be effected according to the driving tendency to improve the drivability.

Here will be exemplified another mode of embodiment or additional construction, as including the individual features of the present invention. The control system, as including the first and second featuring constructions of the present invention, can include means for changing a shift pattern for the upslope/downslope to a shift pattern for a curve, as liable to set a lower gear stage than the former. These control systems can further include means for setting the shift pattern for the curve when it is decided that the driving tendency is sporty. The control system, as including the first and second featuring constructions, can be constructed to detect an intersection as a curved road when the route to be followed is turned at the intersection. The control system, as including the first and second featuring constructions, can execute the change of the shift pattern not only by the means for effecting the change by changing the shift diagram but also by moving the shift point substantially by adding/subtracting a correction value to and from the detected data such as the vehicle speed or the throttle opening.

In the control system including the second featuring construction, the shift pattern control means can include either the means for determining the gear stage on the basis of the vehicle speed and the turning radius or the means for restricting the downshift or the upshift.

The shift pattern control means of the control system including the third featuring construction of the present invention can further include the means for changing the shift pattern to a shift pattern for entrance after the downshift has been executed. The control system including this third featuring construction can be constructed to change the shift pattern into the shift pattern for entrance when the driving tendency is sporty. The control system including this third featuring construction can be constructed such that the shift pattern control means changes the shift pattern when the start from the facilities belonging to an expressway is detected by the road data detecting means. The control system including the third featuring construction can further include the means for returning the shift pattern for entrance to the shift pattern before changed to the entrance shift pattern when joining to a main line of the expressway is detected. The control system including the third featuring construction can further include the means for returning the entrance shift pattern to the shift pattern before changed to the entrance one, when a cruising speed run having little change in the vehicle speed is detected.

The shift pattern control means of the control system including the fourth featuring construction of the present invention can be the means for changing the shift pattern inhibiting the setting of the lowest gear stage to the shift pattern for a low-$\mu$ road. The shift pattern control means of the control system including the fourth featuring construction can be the means adopting the shift pattern, in which the downshift point is set at a lower speed side, as the shift pattern for the low-$\mu$ road. The control system including the fourth featuring construction can include the means for keeping the low-$\mu$ road shift pattern even when the main switch or the ignition switch of the vehicle is turned OFF. The road data detecting means in the control system including the fourth featuring construction can include the means for deciding it on the basis of the cold area data, as stored in advance, the ambient temperature or the calendar data that the coefficient of road surface friction is small. The control system including the fourth featuring construction can further include the means for changing the slip region, in which the lockup clutch is controlled to slip at the time of a deceleration, to a higher speed side when the shift pattern is changed to the low, road shift pattern.

In addition to the means for changing the shift pattern by changing the shift diagram, the control system including the fifth featuring construction of the present invention can move the shift substantially by adding/subtracting a correction value to and from the detected data such as the vehicle speed or the throttle opening.

The control system including the sixth featuring construction of the present invention can be constructed such that the downslope decision changing means changes the reference value for deciding the downslope when the driving tendency is sporty. The shift pattern control means of the control system including the sixth featuring construction can include the means for changing the shift pattern for the downslope to the shift pattern for the corner/downslope, as liable to use a larger gear ratio. The downslope decision changing means in the control system including the sixth featuring construction can include the means for changing the reference value for deciding the downslope while considering the radius of the corner.

The shift inhibition means in the control system including the seventh featuring construction of the present invention can include the means for inhibiting the shift on a curved road when the driving tendency is sporty.

The means for setting a shift pattern for an intermediate straight road in the control system including the eighth featuring construction of the present invention can be the means for releasing the downslope control temporarily. Moreover, the means for setting the intermediate straight road shift pattern in the control system including the eighth featuring construction can be the means for changing the threshold value for deciding the downslope.

The shift pattern control means of the control system including the ninth featuring construction of the present invention can include the means for changing the shift pattern for inhibiting the highest gear stage such as the 4th speed to the shift pattern for the upslope/downslope. The upslope/downslope control decision means in the control system including the ninth featuring construction can include the means for executing the shift instruction with the upslope/downslope shift pattern when it is decided that the driving tendency is sporty. The upslope/downslope control decision means in the control system including the ninth featuring construction can include the means for continuing the control inhibiting the highest gear stage such as the 4th speed.

The shift instructing means in the control system including the tenth featuring construction of the present invention can include the means for the shifting output at the higher gear ratio which has been compared by the comparison means. The control system including the tenth featuring construction can include the means for executing the shift control, as based on the road data obtained by the road data detecting means, in preference to the shift control based on the data obtained by the actual run. In this case, the comparison means need not be included.

The driving tendency deciding means in the control system including the eleventh featuring construction of the present invention can include the means for deciding the driving tendency on the basis of the accelerating operation or the braking operation during the cornering or just before the entrance into the corner. The shift correcting means in the control system including the eleventh featuring construction can include the means for changing the shift point on the basis of the detected driving tendency. The shift correcting means in the control system including the eleventh featuring construction can include the means for changing the application oil pressure and/or the throttle opening at a transient shift time, on the basis of the detected driving tendency.

Moreover, the present invention can be applied for controlling not only an automatic transmission having the gear stages but also another transmission such as a continuously variable transmission.

Here will be synthetically described the advantages which are obtained by the control system including the individual featuring constructions of the present invention. According to the control system including the first featuring construction of the present invention, when the vehicle is to be started on the curved road, a high gear ratio is liable to set so that the transmission is reluctant to be shifted to a low gear ratio even if the output is lowered by returning the accelerator pedal after the start. In other words, the run is continued at a relatively high gear ratio so that the driving force can be sufficiently kept on the curved road having a high running resistance and so that the frequent downshifting or upshifting, as might otherwise be caused by depressing or returning the accelerator pedal, can be prevented to improve the riding comfort and the drivability.

According to the control system including the second featuring construction of the present invention, for a curved road having such a large curvature as is entered or passed by effecting the braking operation, a higher gear ratio is liable to set so that the engine braking for the deceleration is liable to be effective, and a sufficient driving force can be achieved for an acceleration against the running resistance.

According to the control system including the third featuring construction of the present invention, a higher gear ratio is liable to set when the vehicle runs to the motorway, so that the accelerability is improved. As a result, the vehicle can smoothly enter the motorway and merge into the traffic flow.

According to the control system including the fourth featuring construction of the present invention, when the vehicle is to run on the so-called "low-$\mu$ road", the gear ratio is reluctant to be raised to the maximum even if the output is augmented by depressing the accelerator pedal. As a result, the slip of the wheels can be prevented by suppressing the driving force to be generated in the wheels, so that the running stability of the vehicle can be retained even if the coefficient of road surface friction is low.

According to the control system including the fifth featuring construction of the present invention, when the vehicle is to run in urban areas, the gear ratio is set to a relatively low value so that the RPM of a power source such as the engine can be suppressed to keep the quietness and improve the fuel economy.

According to the control system including the sixth featuring construction of the present invention, when the vehicle is to run on a downslope, the shift pattern is changed just before the downslope so that a higher gear ratio is liable to set. In other words, the run with an effective engine braking can be easily effected without any manual operation. For the downslope and the curved road, moreover, the reference for deciding the downslope is changed so that the downslope is decided even for a small gradient thereby to make it liable to set a higher gear ratio. As a result, the vehicle runs on the downslope with the effective engine braking so that the frequencies of the manual shifting operations and the braking operations are reduced to improve the drivability.

According to the control system including the seventh featuring construction of the present invention, for a curved road required to run with the braking operation, the change in the driving force following the shift is prevented, and the reduction in the engine braking force by an upshift can be prevented to retain the stability at the time of running on the curved road. When the termination of the curved wall is detected, on the other hand, the shift can be effected so that the downshift can be effected by depressing the accelerator pedal, for example, to provide a sufficient accelerability. On the contrary, the upshift is effected to lower the RPM of the power source such as the engine thereby to improve the quietness and the fuel economy.

According to the control system including the eighth featuring construction of the present invention, while the vehicle is running on a curved road by controlling the shift on the basis of the shift pattern which is liable to set a higher gear ratio, the higher gear ratio becomes liable to set on the basis of the shift pattern for the intermediate straight road if the distance of the straight road between curved roads is short or if the straight road is passed for a short time. As a result, the shift pattern becomes reluctant to change between the curved roads, so that the so-called "hunting" or "busy shifting" to cause frequent shifts is prevented. When the vehicle passes the intermediate straight road and enters again the curved road, it runs at a relatively high gear ratio so that a sufficient driving force can be achieved for the curved road having a high running resistance thereby to improve the riding comfort and the drivability.

According to the control system including the ninth featuring construction of the present invention, when the vehicle runs on an upslope or downslope, the transmission can be controlled on the basis of the shift pattern which is liable to set a higher gear ratio. Moreover, when the flat road existing in an intermediate portion between the upslope/downslope is short or when the time required for passing the flat road is short, the shift control, as based on the shift pattern for the upslope/downslope, is not interrupted but continued. If the distance or time is long, on the contrary, the shift control by the shift pattern for the upslope/downslope is once interrupted during the run on the flat road. Moreover, if an upslope/downslope is detected between flat roads and if its distance or time required for passing it is short, the shift control by the shift pattern for the upslope/downslope is not executed. If the same is long, on the contrary, the shift control, as based on the upslope/downslope shift pattern, is executed. Therefore, if the shift pattern is changed and if the running distance or time of the changed shift pattern is decided to be short, the shift pattern is not changed. As a result, the frequency of the shifts, as accompanying the change in the shift pattern, is lowered to improve the drivability.

According to the control system including the tenth featuring construction of the present invention, such one of the gear ratio determined on the basis of the road data of the route to be followed and the gear ratio determined on the basis of the running state or the road situations of the actual run as will match the decision reference is outputted as the shift instruction signal. By adopting the decision reference making a preference to a higher gear ratio, for example, the driving force is increased to improve the accelerability. By adopting the decision reference making a preference to a lower gear ratio, on the other hand, the run can be effected with the excellent quietness and fuel economy.

According to the control system including the eleventh featuring construction of the present invention, the way and taste of the driver are reflected upon the shift control so that the overall characteristics of the vehicle such as the shift timing, the driving force or the braking characteristics can be coincide or approximate to those expected by the driver. As a result, the riding comfort and the drivability are improved.

What is claimed is:

1. A control system for a transmission, comprising:
   shift control means for outputting a shift instruction signal on the basis of a predetermined shift pattern;
   road data detecting means for detecting the road data of a route to be followed by a vehicle;
   start detecting means for detecting the start of said vehicle; and
   shift pattern control means for setting a shift pattern for a curve, as having a control content for making it ready to set a larger gear ratio, as said shift pattern when the vehicle start is detected by said start detecting means and when a curved road is detected in the route to be followed, by said road data detecting means.

2. A control system for a transmission according to claim 1, further comprising: driving tendency decision means for deciding the driving tendency of the driver of said vehicle; and shift correction control means for correcting the control content of said gear ratio on the basis of the driving tendency, as decided by said driving tendency decision means.

3. A control system for a transmission, comprising:
   shift control means for outputting a shift instruction signal on the basis of a predetermined shift pattern;
   road data detecting means for detecting the road data of a route to be followed by a vehicle;
   brake detecting means for detecting the execution of a wheel braking operation in said vehicle; and
   shift pattern control means for setting a shift pattern for a curve, as having a control content for making it ready to set a larger gear ratio, as said shift pattern when the execution of the wheel braking operation is detected by said brake detecting means and when a curved road is detected in the route to be followed, by said road data detecting means.

4. A control system for a transmission according to claim 3, further comprising: driving tendency decision means for deciding the driving tendency of the driver of said vehicle; and shift correction control means for correcting the control content of said gear ratio on the basis of the driving tendency, as decided by said driving tendency decision means.

5. A control system for a transmission, comprising:
   shift control means for outputting a shift instruction signal on the basis of a predetermined shift pattern;
   road data detecting means for detecting the road data of a route to be followed by a vehicle;
   shift pattern control means for setting a shift pattern for entering to a freeway, as having a control content for making it ready to set a larger gear ratio, as said shift pattern when it is detected by said road data detecting means that an actual position of the vehicle on the route to be followed by said vehicle is an entrance of the freeway.

6. A control system for a transmission according to claim 5, further comprising: driving tendency decision means for deciding the driving tendency of the driver of said vehicle; and shift correction control means for correcting the control content of said gear ratio on the basis of the driving tendency, as decided by said driving tendency decision means.

7. A control system for a transmission, comprising:
   shift control means for outputting a shift instruction signal on the basis of a predetermined shift pattern;
   road data detecting means for detecting the road data of a route to be followed by a vehicle;
   shift pattern control means for setting a shift pattern for a low-$\mu$ road, as having a control content for making it ready to set a gear ratio smaller than the highest gear ratio, as said shift pattern when it is detected by said road data detecting means that the route to be followed by said vehicle is a road having a low coefficient of road surface friction.

8. A control system for a transmission according to claim 7, further comprising: driving tendency decision means for deciding the driving tendency of the driver of said vehicle; and shift correction control means for correcting the control content of said gear ratio on the basis of the driving tendency, as decided by said driving tendency decision means.

9. A control system for a transmission, comprising:

shift control means for outputting a shift instruction signal on the basis of a predetermined shift pattern;

road data detecting means for detecting the road data of a route to be followed by a vehicle;

shift pattern control means for setting a shift pattern having a control content for making it ready to set a larger gear ratio, as said shift pattern when it is detected by said road data detecting means that the route to be followed by said vehicle is a downslope having a downward gradient larger than a reference value, and downslope decision changing means for changing said reference value when it is decided by said road data detecting means that said downslope is a curved road.

10. A control system for a transmission according to claim 9, further comprising: driving tendency decision means for deciding the driving tendency of the driver of said vehicle; and shift correction control means for correcting the control content of said gear ratio on the basis of the driving tendency, as decided by said driving tendency decision means.

11. A control system for a transmission, comprising:

shift control means for outputting a shift instruction on the basis of a predetermined shift pattern;

road data detecting means for detecting the road data of a route to be followed by a vehicle;

brake detecting means for detecting the execution of a wheel braking operation in said vehicle;

shift inhibiting means for inhibiting the shift in said transmission when it is detected by said brake detecting means that the route to be followed by said vehicle is a curved road and when the wheel braking operation is detected by said brake detecting means; and shift inhibition releasing means for allowing the shift in said transmission when the end of the curved road is detected by said road data detecting means.

12. A control system for a transmission according to claim 11, further comprising: driving tendency decision means for deciding the driving tendency of the driver of said vehicle; and shift correction control means for correcting the control content of said gear ratio on the basis of the driving tendency, as decided by said driving tendency decision means.

13. A control system for a transmission, comprising:

shift control means for outputting a shift instruction signal on the basis of a predetermined shift pattern;

road data detecting means for detecting the road data of a route to be followed by a vehicle;

shift pattern control means for setting a shift pattern having a control content for making it ready to set a larger gear ratio, as said shift pattern when it is detected by said road data detecting means that the route to be followed by said vehicle is a curved road, and straight road run detecting means for detecting at least one of the distance of a straight road between curved portions in the route to be followed by said vehicle and the time required for passing said straight road, wherein said shift pattern control means includes means for setting a shift pattern for an intermediate straight road, as having a control content for making it ready to set a higher gear ratio, as said shift pattern at the time of running said straight road when at least one of said distance and said required time, as detected by said straight road run detecting means, is less than a predetermined reference value.

14. A control system for a transmission according to claim 13, further comprising: driving tendency decision means for deciding the driving tendency of the driver of said vehicle; and shift correction control means for correcting the control content of said gear ratio on the basis of the driving tendency, as decided by said driving tendency decision means.

15. A control system for a transmission, comprising:

shift control means for outputting a shift instruction signal on the basis of a predetermined shift pattern;

road data detecting means for detecting the road data of a route to be followed by a vehicle;

shift pattern control means for setting a shift pattern for an upslope/downslope, as having a control content for making it ready to set a larger gear ratio, as said shift pattern when an upslope/downslope is detected in the route to be followed by said vehicle;

upslope/downslope run detecting means for detecting any one of the distance of a flat road between the upslopes/downslopes in the route to be followed, the time required for passing said flat road, the distance of an upslope/downslope between flat roads and the time required for passing said upslope/downslope, on the basis of at least one of the road data obtained by said road data detecting means and a running state; and upslope/downslope control decision means for deciding the beginning or end of the shift instruction control, as based on said upslope/downslope shift pattern, in accordance with at least one of the distance and the required time, as detected by said upslope/downslope run detecting means.

16. A control system for a transmission according to claim 15, further comprising: driving tendency decision means for deciding the driving tendency of the driver of said vehicle; and shift correction control means for correcting the control content of said gear ratio on the basis of the driving tendency, as decided by said driving tendency decision means.

17. A control for a transmission, comprising:

road data detecting means for detecting the road data of a route to be followed by a vehicle;

comparison means for comparing a first gear ratio which is determined by a first shift control based on the road data obtained by said road data detecting means, and a second gear ratio which is determined by a second shift control based on one of an actual running state and road situations; and shift instructing means for selecting one of said shift controls, which determines the higher gear ratio between the first gear ratio and the second gear ratio, on the basis of the comparison result and for instructing a shift output by the selected shift control.

18. A control system for a transmission according to claim 17, further comprising: driving tendency decision means for deciding the driving tendency of the driver of said vehicle; and shift correction control means for correcting the control content of said gear ratio on the basis of the driving tendency, as decided by said driving tendency decision means.

* * * * *

UNITED STATES PATENT AND TRADEMARK OFFICE
CERTIFICATE OF CORRECTION

PATENT NO. : 6,070,118
DATED : MAY 30, 2000
INVENTOR(S): TAKASHI OHTA ET AL

It is certified that an error appears in the above-identified patent and that said Letters Patent is hereby corrected as shown below:

Claim 11, line 2, after "a shift instruction" insert --signal--

Signed and Sealed this

Twenty-ninth Day of May, 2001

Attest:

NICHOLAS P. GODICI

Attesting Officer     Acting Director of the United States Patent and Trademark Office